(12) United States Patent
Kim et al.

(10) Patent No.: US 11,589,285 B2
(45) Date of Patent: *Feb. 21, 2023

(54) METHOD FOR CELL RESELECTION IN IDLE MODE FOR NEXT GENERATION MOBILE COMMUNICATION SYSTEMS

(71) Applicant: SAMSUNG ELECTRONICS CO., LTD., Suwon-si (KR)

(72) Inventors: Soenghun Kim, Suwon-si (KR); Sangbum Kim, Suwon-si (KR); Donggun Kim, Seoul (KR); Jaehyuk Jang, Suwon-si (KR); Seungri Jin, Suwon-si (KR); Alexander Sayenko, Seoul (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,533

(22) Filed: May 27, 2022

(65) Prior Publication Data

US 2022/0286933 A1 Sep. 8, 2022

Related U.S. Application Data

(63) Continuation of application No. 16/730,797, filed on Dec. 30, 2019, now Pat. No. 11,350,331, which is a
(Continued)

(30) Foreign Application Priority Data

Aug. 3, 2016 (KR) ........................ 10-2016-0098954
Aug. 2, 2017 (KR) ........................ 10-2017-0098074

(51) Int. Cl.
*H04W 36/30* (2009.01)
*H04W 28/02* (2009.01)
(Continued)

(52) U.S. Cl.
CPC .......... *H04W 36/30* (2013.01); *H04L 5/0053* (2013.01); *H04W 4/70* (2018.02); *H04W 48/12* (2013.01);
(Continued)

(58) Field of Classification Search
CPC ............ H04W 28/0263; H04W 36/30; H04W 28/0252; H04W 28/0268; H04W 28/0278;
(Continued)

(56) References Cited

U.S. PATENT DOCUMENTS

| | | | |
|---|---|---|---|
| 2008/0123660 | A1 | 5/2008 | Sammour et al. |
| 2010/0202351 | A1* | 8/2010 | Xi ...................... H04L 61/4588 370/328 |

(Continued)

FOREIGN PATENT DOCUMENTS

| | | |
|---|---|---|
| CN | 103716885 A | 4/2014 |
| CN | 104683956 A | 6/2015 |

(Continued)

OTHER PUBLICATIONS

European Patent Office, "Supplementary European Search Report," Application No. EP17837239.7, dated Jun. 26, 2019, 7 pages.
(Continued)

*Primary Examiner* — Awet Haile

(57) ABSTRACT

The present disclosure relates to a communication technique of fusing a 5G communication system for supporting higher data transmission rate beyond a 4G system with an IoT technology and a system thereof. The present disclosure may be applied to intelligent services (e.g., smart home, smart building, smart city, smart car or connected car, health care, digital education, retail business, security and safety related service, or the like) based on the 5G communication technology and the IoT related technology. A communication method of a base station, the method comprising: establish-
(Continued)

ing at least one bearer with a terminal; receiving a downlink packet being transmitted to the terminal; determining a bearer mapped to quality of service (QoS) information of the downlink packet; and transmitting, to the terminal, the downlink packet through the determined bearer.

20 Claims, 56 Drawing Sheets

Related U.S. Application Data continuation of application No. 15/668,571, filed on Aug. 3, 2017, now Pat. No. 10,524,181.

(51) Int. Cl.
| | |
|---|---|
| *H04W 72/04* | (2023.01) |
| *H04W 72/08* | (2009.01) |
| *H04W 4/70* | (2018.01) |
| *H04W 48/12* | (2009.01) |
| *H04L 5/00* | (2006.01) |
| *H04W 48/20* | (2009.01) |

(52) U.S. Cl.
CPC ....... *H04W 72/048* (2013.01); *H04W 72/085* (2013.01); *H04W 28/0252* (2013.01); *H04W 28/0263* (2013.01); *H04W 48/20* (2013.01); *Y02D 30/70* (2020.08)

(58) Field of Classification Search
CPC ............... H04W 28/065; H04W 28/08; H04W 36/0055; H04W 36/0066; H04W 36/22; H04W 4/70; H04W 72/04; H04W 72/0406; H04W 72/0453; H04W 72/048; H04W 72/085; H04W 72/1273; H04W 76/15
See application file for complete search history.

(56) References Cited

U.S. PATENT DOCUMENTS

| | | | |
|---|---|---|---|
| 2012/0092994 | A1 | 4/2012 | Wang et al. |
| 2012/0149386 | A1 | 6/2012 | Kumar et al. |
| 2014/0153398 | A1* | 6/2014 | Kotecha ............ H04W 28/0268 370/236 |
| 2015/0264631 | A1 | 9/2015 | Zhang et al. |
| 2016/0150439 | A1 | 5/2016 | Drevon et al. |
| 2017/0150393 | A1 | 5/2017 | Payer et al. |
| 2017/0324652 | A1 | 11/2017 | Lee et al. |
| 2017/0347307 | A1* | 11/2017 | Mehta ................... H04W 76/15 |
| 2017/0359749 | A1* | 12/2017 | Dao .................... H04L 47/2416 |
| 2017/0373728 | A1* | 12/2017 | Viering ................ H04B 7/0632 |
| 2018/0076879 | A1* | 3/2018 | Ouyang .................. H04W 8/26 |
| 2018/0310356 | A1* | 10/2018 | Futaki ............... H04W 72/0413 |
| 2018/0343701 | A1* | 11/2018 | Ma ........................ H04W 76/10 |
| 2019/0090257 | A1* | 3/2019 | Han .................. H04W 28/0268 |
| 2019/0261314 | A1* | 8/2019 | Byun ..................... H04W 8/10 |

FOREIGN PATENT DOCUMENTS

| | | | |
|---|---|---|---|
| KR | 10-2014-0041947 | A | 4/2014 |
| KR | 10-2016-0003807 | A | 1/2016 |
| WO | 2015188875 | A1 | 12/2015 |

OTHER PUBLICATIONS

Ekstrom, Hannes, "QoS Control in the 3GPP Evolved Packet System," LTE—3GPP Release 8, IEEE Communications Magazine, Feb. 2009, 8 pages.

ZTE Corporation, et al., "New QoS Architecture," S2-161755 (revision of S2-16xxxx), SA WG2 Temporary Document, SA WG2 Meeting #114, Sophia Antipolis, France, Apr. 11-15, 2016, 3 pages.

ISA/KR, International Search Report, International Application No. PCT/KR2017/008331, dated Nov. 21, 2017, 3 pages.

Qualcomm Incorporated, et al., "Principles for QoS in the RAN," R2-164119, 3GPP TSG-RAN WG2 Meeting #94, Nanjing, China, May 23-27, 2016, 5 pages.

Samsung, "NR user plane architecture for supporting multiple services," R2-163740, 3GPP TSG-RAN WG2 Meeting #94, Nanjing, China, May 23-27, 2016, 8 pages.

Office Action dated Aug. 30, 2021 in connection with India Patent Application No. 201937004156, 6 pages.

The First Office Action dated Nov. 17, 2021, in connection with Chinese Application No. 201780049041.1, 20 pages.

Decision of Patent dated Jan. 6, 2022, in connection with Korean Application No. 10-2017-0098074, 6 pages.

* cited by examiner

METHOD FOR CELL RESELECTION IN IDLE MODE FOR NEXT GENERATION MOBILE COMMUNICATION SYSTEMS

CROSS-REFERENCE TO RELATED APPLICATIONS

This application is a continuation of application Ser. No. 16/730,797, now U.S. Pat. No. 11,350,331 issued May 31, 2022, which is a continuation of application Ser. No. 15/668,571, now U.S. Pat. No. 10,524,181 issued Dec. 31, 2019, which claims priority to Korean Patent Application No. 10-2016-0098954 filed on Aug. 3, 2016, and Korean Patent Application No. 10-2017-0098074 filed on Aug. 2, 2017. The content of the above-identified patent documents is incorporated herein by reference.

BACKGROUND

1. Field

Various embodiments of the present disclosure relate to an operation of a terminal and a base station in a mobile communication system.

Various embodiments of the present disclosure relate to a method and an apparatus for setting up QoS and processing the same based on user traffic in a next generation mobile communication system.

Various embodiments of the present disclosure relate to a reselection of a serving beam of a terminal in an NR system operated based on a beam, and more particularly, to a method and an apparatus for measuring neighbor beams using differential thresholds.

Various embodiments of the present disclosure relate to a method for measuring a downlink reference signal in a wireless communication system performing beam based communication.

2. Description of Related Art

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolved from a human-centered connection network through which a human being generates and consumes information to an Internet of Things (IoT) network that transmits and receives information between distributed components such as things and processes the information. The Internet of Everything (IoE) technology in which the big data processing technology, etc. is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the machine to machine (M2M), and the machine type communication (MTC), have been implemented by techniques such as the beamforming, the MIMO, and the array antenna. The application of the cloud radio access network (cloud RAN) as the big data processing technology described above may also be considered as an example of the fusing of the 5G communication technology with the IoT technology.

SUMMARY

To address the above-discussed deficiencies, it is a primary object of the present disclosure of disclosure treating several groups of flows in a network with the same QoS when a method for setting up QoS based on a bearer like a current LTE system is applied. Therefore, it is impossible to more finely control QoS at an EPC stage and an E-UTRAN stage. Therefore, the present disclosure proposes a method for setting up QoS based on a flow in addition to a method for setting up bearer based QoS.

Further, in an NR system operated based on a beam, complexity and required costs for measurement on neighbor beams performed for a terminal to reselect a beam are different according to intra-TRP, inter-TRP, and inter-frequency. In addition, since all the beams have to be measured for a very large number of neighbor beams in order to measure all the beams, consumption expense is high. In the present disclosure, an efficient procedure for measuring neighbor beams is defined in consideration of the difference in complexity of the measurement methods as described above.

Accordingly, embodiments of the present disclosure are directed to reduction in power consumption of a terminal when the terminal intends to continuously search for an optimal beam combination in a wireless communication system performing beam-based communication.

Objects of the present disclosure are not limited to the above-mentioned objects. That is, other objects that are not mentioned may be obviously understood by those skilled in the art to which the present disclosure pertains from the following description.

In accordance with another aspect of the present disclosure, a communication method of a base station is provided. The method includes establishing at least one bearer with a terminal; receiving a downlink packet being transmitted to the terminal; determining a bearer mapped to QoS (quality of service) information of the downlink packet; and transmitting, to the terminal, the downlink packet through the determined bearer.

In the method, further comprises if a bearer mapped to the QoS information of the downlink packet is not existence, establishing a bearer mapped to the QoS information of the downlink packet with the terminal; and transmitting, to the terminal, the downlink packet through the established bearer mapped to the QoS information of the downlink packet.

In the method, further comprises if a bearer mapped to QoS information of an uplink packet is not existence, receiving, from the terminal, the uplink packet through a default bear, and wherein the uplink packet includes a QoS marking indicating the QoS information of the uplink packet.

In the method, further comprises establishing a bearer mapped to the QoS information of the uplink packet with the terminal.

In the method, the determining of the bearer mapped to the QoS information of the downlink packet is performed by a layer above a PDCP (packet data convergence protocol) layer.

In accordance with another aspect of the present disclosure, a communication method of a terminal is provided. The method includes information corresponding to the second uplink packet transmission in the first time slot of the other terminal comprises establishing at least one bearer with a base station; and receiving, from the base station, a downlink packet through a bearer mapped to QoS (quality of service) information of the downlink packet.

In the method, further comprises if a bearer mapped to the QoS information of the downlink packet is not existence, establishing a bearer mapped to the QoS information of the downlink packet with the base station; and receiving, from the base station, the downlink packet through the established bearer mapped to the QoS information of the downlink packet.

In the method, further comprises if a bearer mapped to QoS information of an uplink packet is not existence, transmitting, to the base station, the uplink packet through a default bear, and the uplink packet includes a QoS marking indicating the QoS information of the uplink packet.

In the method, further comprises establishing a bearer mapped to the QoS information of the uplink packet with the base station.

In the method, the transmitting of the uplink packet further comprises: determining a bearer mapped to the QoS information of the uplink packet, and marking the QoS information of the uplink packet in the uplink packet, and wherein the determining of the bearer mapped to the QoS information of the uplink packet and the marking of the QoS information of the uplink packet in the uplink packet is performed by a layer above a PDCP (packet data convergence protocol) layer In accordance with another aspect of the present disclosure abase station is provided. The base station includes a transceiver configured to transmit and receive signals; and a controller coupled with the transceiver and configured to establish at least one bearer with a terminal, receive a downlink packet being transmitted to the terminal, determine a bearer mapped to QoS (quality of service) information of the downlink packet, and transmit, to the terminal, the downlink packet through the determined bearer In accordance with another aspect of the present disclosure a terminal is provided. The terminal includes a transceiver configured to transmit and receive signals; and a controller coupled with the transceiver and configured to establish at least one bearer with a base station, and receive, from the base station, a downlink packet through a bearer mapped to QoS (quality of service) information of the downlink packet.

According to the present disclosure, if the method for setting up bearer-based QoS is applied as in the current LTE system, several groups of flows are dealt with as the same QoS in the network. Therefore, it is impossible to more finely control the QoS in the EPC stage and the E-UTRAN stage. However, if the method for setting up flow-based QoS proposed in the present disclosure is applied, it is possible to more finely control the QoS based on the flow and provide the systematized QoS for each service.

In addition, according to the present disclosure, if the method for measuring differential neighbor beams proposed in the present disclosure is applied to the beam-based NR system, all the neighbor beams are not measured, and therefore it is possible to reduce the time required for the neighbor beam measurement. That is, the procedure of measuring neighbor beams is simplified, which reduces the time for the terminal to reselect the serving beam.

In addition, according to the present disclosure, the terminal determines the appropriate transmission beam and reception beam and then may measure the strength and quality of the reference signal depending on the predetermined downlink received beam configuration in the predetermined cycle without continuously measuring all the beams, thereby reducing the power consumption of the terminal.

The effects that may be achieved by the embodiments of the present disclosure are not limited to the above-mentioned effects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
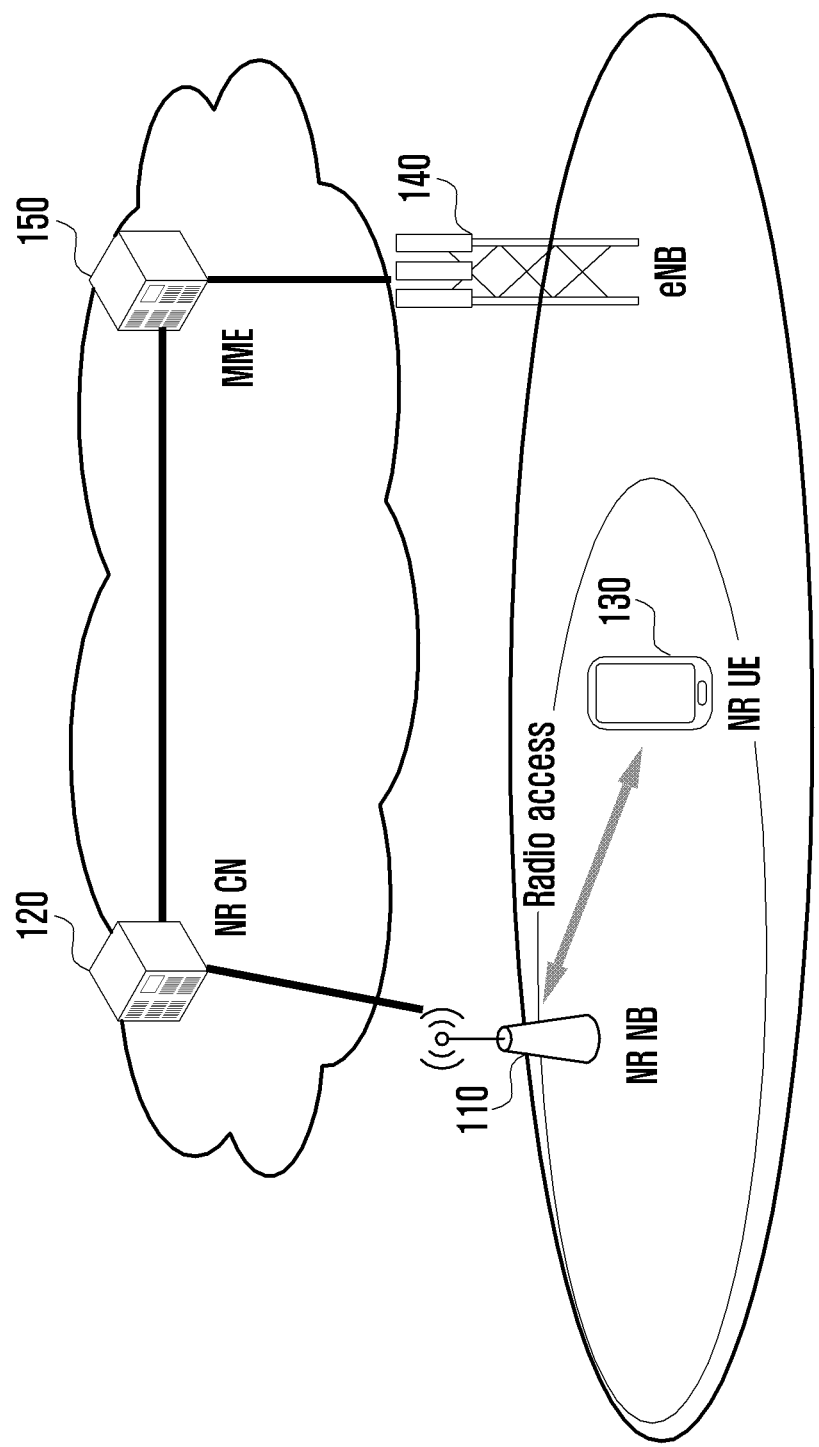
FIG. 1 illustrates a structure of a next generation mobile communication system according to an embodiment of the present disclosure.
Figure 55:
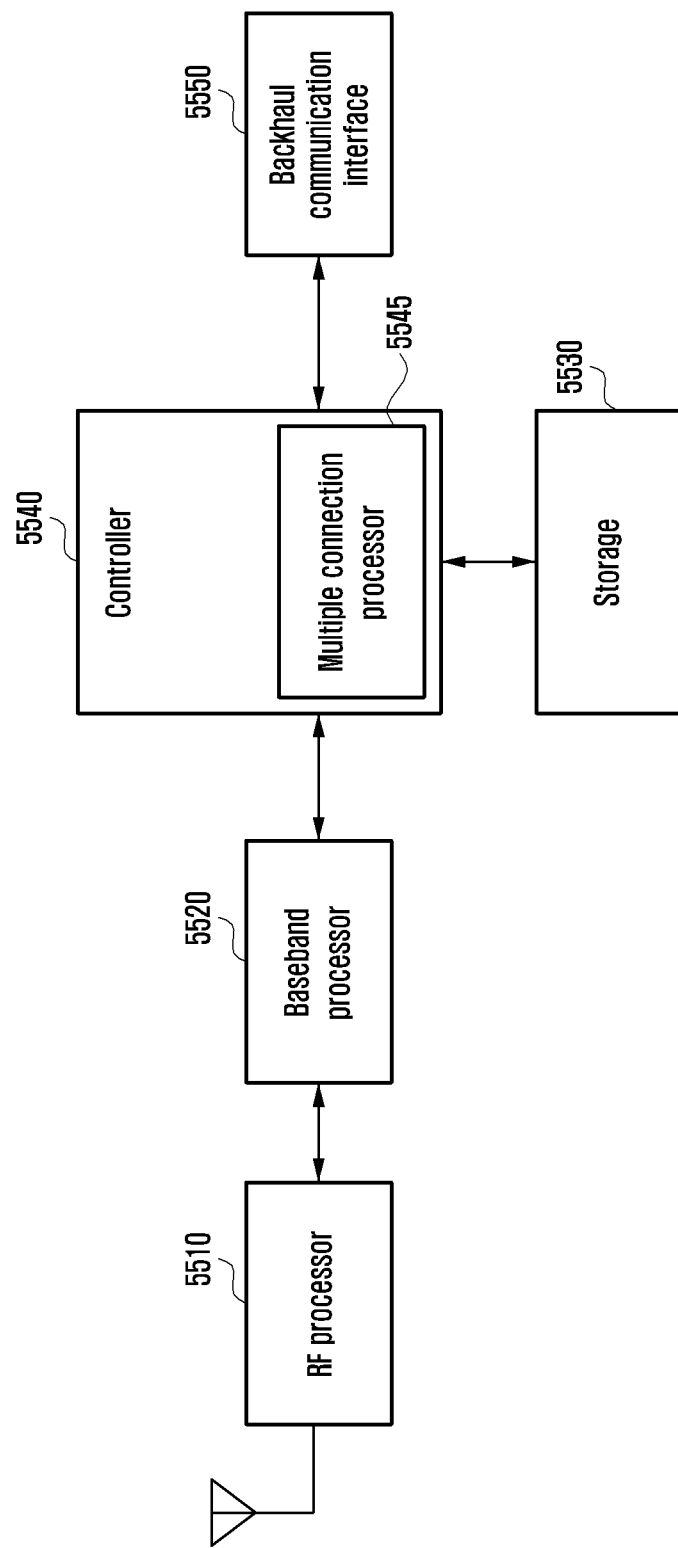
FIG. 55 illustrates a configuration of the base station according to the embodiment of the present disclosure.

FIGS. 1 through 55, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

It is to be understood that when one component is referred to as being "connected to" or "coupled to" another component in the present specification, it may mean that one component is connected directly to or coupled directly to another component or electrically connected to or coupled to another component with the other component interposed there between. Further, in the present specification, "comprising" a specific configuration will be understood that additional configuration may also be included in the embodiments or the scope of the technical idea of the present disclosure.

Furthermore, constitutional parts shown in the embodiments of the present disclosure are independently shown so as to represent different characteristic functions. Thus, it does not mean that each constitutional part is constituted in a constitutional unit of separated hardware or one software. That is, for convenience of description, the respective constitutional parts are included by being arranged as each constitutional part and at least two constitutional parts of the respective constitutional parts may form one constitutional part or one constitutional part is divided into a plurality of constitutional parts to perform functions. An integrated embodiments and a separated embodiment of the respective constitutional parts are also included in the scope of the present disclosure unless departing from the nature of the present disclosure.

In addition, some of constituents may not be indispensable constituents performing essential functions of the present disclosure but be selective constituents improving only performance thereof. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, when it is determined that in describing the embodiments of the present disclosure, the detailed description of the known art related to the present disclosure may obscure the gist of the present disclosure, the detailed description thereof will be omitted. Hereinafter, embodiments of the present disclosure will be described in detail with reference to the accompanying drawings. Further, the following terminologies are defined in consideration of the functions in the present disclosure and may be construed in different ways by the intention or practice of users and operators. Therefore, the definitions thereof should be construed based on the contents throughout the specification.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

Here, the term "~unit" used in the present embodiment means software or hardware components such as FPGA and ASIC and the "~unit" performs any roles. However, the meaning of the "~unit" is not limited to software or hardware. The "~unit" may be configured to be in a storage medium that may be addressed and may also be configured to reproduce one or more processor. Accordingly, for example, the "~unit" includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the "~units" may be combined with a smaller number of components and the "~units" or may further separated into additional components and "~units." In addition, the components and the "~units" may also be implemented to reproduce one or more CPUs within a device or a security multimedia card.

Hereinafter, if it is determined that the detailed description of the known art related to the present disclosure may obscure the gist of the present disclosure, the detailed description thereof will be omitted. Hereinafter, embodiments of the present disclosure will be described in detail with reference to the accompanying drawings.

In order to process explosively increasing mobile data traffic in recent years, a $5^{th}$ generation (5G) system or a new radio access technology (NR) which is a next generation telecommunication system since long term evolution (LTE) or evolved universal terrestrial radio access (E-UTRA) and LTE-advanced (LTE-A) or E-UTRA evolution has been actively discussed. The existing mobile communication system focuses on the typical voice/data communication, while the 5G system aims to meet various services, such as an enhanced mobile broad band (eMBB) service for enhancement of the existing voice/data communication, an ultra-reliable/ultra low latency communication (URLLC) service, and a machine type communication (massive MTC) service supporting mass communication of things, and requirements.

FIG. 1 illustrates a structure of a next generation mobile communication system according to the present disclosure.

Referring to FIG. 1, a radio access network of a next generation mobile communication system includes a next generation base station (new radio node B (NR NB) or gNB, and the like) 110 and a next generation core network (new radio core network (NR CN), access and mobility management function (AMF), a user plane function (UPF), a session management function (SMF), and the like) 120. A user terminal (new radio user equipment (NR UE) or terminal (UE)) 130 may be connected to an external network via the NR NB 110 and the NR CN 120.

Meanwhile, in FIG. 1, the NR NB 110 may correspond to a base station (evolved node B (eNB)) 140 of an existing LTE system. The NR NB 110 is connected to the NR UE 130 via a radio channel and may provide a service superior to the existing node B (base station) 140. In the next generation mobile communication system, since all user traffics are served through a shared channel, an apparatus for collecting state information such as a buffer state, an available transmission power state, and a channel state of the UEs 130 to perform scheduling is required. The NR NB 110 may play a role of the apparatus. One NR NB 110 may typically control multiple cells.

In order to realize super-high speed data transmission compared to the existing LTE, the next generation mobile communication system may have a bandwidth equal to or greater than a maximum bandwidth of the existing LTE, and may additionally apply a beamforming technique using orthogonal frequency division multiplexing (OFDM) as a radio access technology. Further, an adaptive modulation & coding (hereinafter, called AMC) scheme for determining a modulation scheme and a channel coding rate depending on a channel status of the terminal 130 may be applied. The NR CN 120 may perform functions such as mobility support, bearer setup, QoS setup, and the like. The NR CN 120 is an apparatus that serves to perform various control functions as well as a mobility management function for the terminal 130 and may be connected to the plurality of base stations 110.

Also, the next generation mobile communication system may interwork with even the existing LTE system, and the NR CN 120 may be connected to the MME 150 through a network interface according to the embodiment. The MME 150 is connected to the eNB 140 which is the base station of the existing LTE.

A system transmission bandwidth per single carrier of the existing LTE and LTE-A is limited to a maximum of 20 MHz, while the 5G system aims at providing super-high speed data services of several Gbps using an ultra-wide bandwidth much wider than that. As a result, the 5G system has considered as a candidate frequency a very high frequency band from several GHz to 100 GHz, which is relatively easy to secure an ultra-wideband frequency. In addition, a method for securing a wideband frequency for the 5G system is also considered by frequency reallocation or allocation in a frequency band of several hundreds of MHz to several GHz used in the existing mobile communication system.

A radio wave in the very high frequency band is a wavelength of about several mm and therefore is sometimes referred to as a millimeter wave (mmWave). However, in the very high frequency band, a pathloss of the radio wave is increased in proportion to the frequency band, such that the coverage of the mobile communication system becomes small.

In order to overcome the disadvantage of the reduction in the coverage of the very high frequency band, a beamforming technique for concentrating radiation energy of a radio wave onto a predetermined destination by using a plurality of antennas to increase an arrival distance of the radio wave is becoming more important. The beamforming technique may be applied to a transmitting end and a receiving end, respectively. The beamforming technique also reduces interference in areas other than the beam forming direction in addition to increasing the coverage. In order for the beam forming technique to operate properly, a method for accurately measuring and feeding back a transmission/reception beam is required.

As another requirement of the 5G system, there is an ultra-low latency service having a transmission delay of about 1 ms between the transmitting and receiving ends. As one method for reducing a transmission delay, there may be a frame structure design based on a short transmission time interval (TTI) compared to the LTE and the LTE-A. The TTI is a basic unit for performing scheduling, and the TTI of the LTE and LTE-A systems is 1 ms corresponding to a length of one subframe. For example, the short TTI to meet the requirements for the ultra-low latency service of the 5G system may be 0.5 ms, 0.2 ms, 0.1 ms, or the like that are shorter than the LTE and LTE-A systems. In the following description, unless otherwise stated, one TTI and subframe are a basic unit of the scheduling and is interchangeably used with each other as a meaning representing a predetermined time interval.

Hereinafter, the frame structure of the LTE and LTE-A systems will be described with reference to the drawings, and the design direction of the 5G system will be described.

Figure 2:
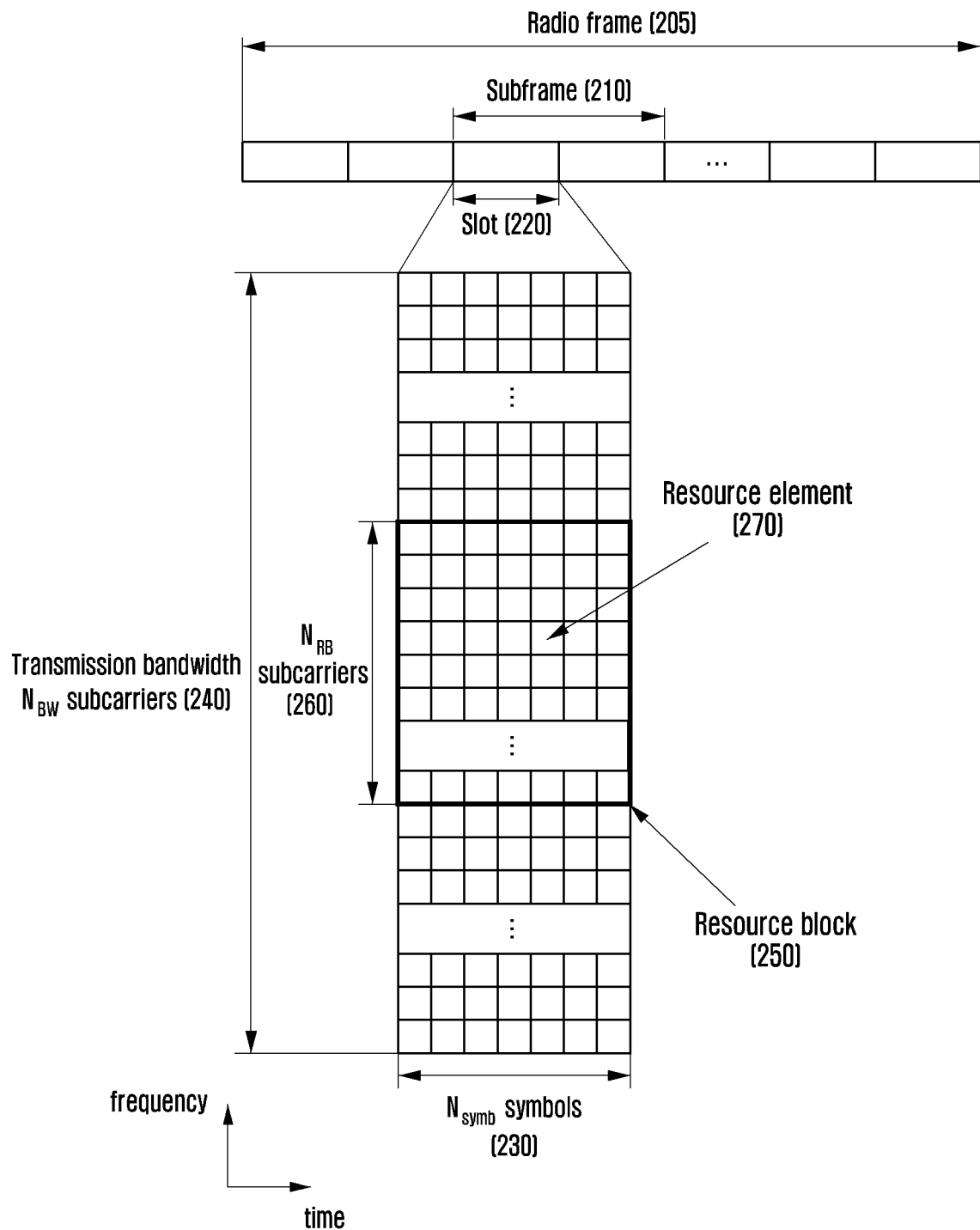
FIG. 2 illustrates a basic structure of a time-frequency domain of the LTE and LTE-A system according to an embodiment of the present disclosure.

FIG. 2 illustrates a basic structure of a time-frequency resource area that is a radio resource area to which a data or a control channel of LTE and LTE-A systems is transmitted according to the present disclosure.

Referring to FIG. 2, a horizontal axis represents a time domain and a vertical axis represents a frequency domain. An uplink (UL) means a radio link through which a terminal transmits a data or a control signal to a base station and a downlink (DL) means a radio link through which the base station transmits the data or the control signal to the terminal. A minimum transmission unit in the time domain of the existing LTE and LTE-A systems is an OFDM symbol in the downlink and an SC-FDMA symbol in the uplink. In addition, $N_{symb}$ 230 symbols are collected to form one slot 220, and two slots 220 are collected to form one subframe 210. A length of the slot 220 is 0.5 ms and a length of the subframe 210 is 1.0 ms. Further, a radio frame 205 is a time domain unit consisting of 10 subframes. A minimum transmission unit in the frequency domain is a sub-carrier in a unit of 15 kHz (sub-carrier spacing is 15 kHz), and the overall system transmission bandwidth consists of a total of $N_{BW}$ sub-carriers 240.

A basic unit of the resource in the time-frequency domain is a resource element (RE) 270 and may be represented by an OFDM symbol index or an SC-FDMA symbol index and a sub-carrier index. A resource block (RB) 250 (or a physical resource block (PRB)) is defined by the $N_{symb}$ continued OFDM symbols or SC-FDMA symbol 230 in the time domain and $N_{RB}$ continued sub-carriers 260 in the frequency domain. Therefore, one RB 250 consists of $N_{symb} \times N_{RB}$ REs 270.

In the LTE and LTE-A systems, a data is mapped in an RB unit, and the base station performs scheduling on a predetermined terminal in a RB-pair unit configuring one subframe. The number of SC-FDMA symbols or the number of OFDM symbols $N_{symb}$ 230 may be determined depending on a length of a cyclic prefix (CP) added to each symbol to prevent inter-symbol interference. For example, $N_{symb}=7$ if a normal CP is applied and $N_{symb}=6$ if a scalable CP is applied. The scalable CP is applied to a system having a radio wave transmission distance relatively longer than the normal CP, thereby maintaining inter-symbol orthogonality. A CP length per symbol may be additionally adjusted in order to configure one subframe into an integer number of symbols. For example, in the case of the normal CP, a CP length of a first symbol of each slot 220 is 5.21 µsec and CP lengths of the remaining symbols within the slot are 4.69 µsec. Since an OFDM symbol length has a reciprocal relationship with sub-carrier spacing, each OFDM symbol length is 1/15 kHz=66.67 µsec and if the OFDM symbol length includes the CP length, the length of the first symbol of each slot 220 is 71.88 µsec and the lengths of the remaining symbols of each slot are 71.36 µsec. ☐If this is expressed by an mathematical expression, a symbol length T_l of an l-th symbol may depend on the following Equation 1.

$$T_l = T_{CP,l} + T_{symb}, \quad \text{Equation 1}$$

$$T_{CP,l} = \begin{cases} 5.21 \ \mu\text{sec} \ (l = 0) \\ 4.69 \ \mu\text{sec} \ (l = 1, 2, \ldots, 6) \end{cases},$$

$$T_{symb} = \frac{1}{15 \ \text{kHZ}} = 66.67 \ \mu\text{sec}$$

The sub-carrier spacing, the CP length, or the like are essential information for OFDM transmission and reception and need to be recognized as a common value by the base station and the terminal to smoothly transmit and receive a signal.

The $N_{BW}$ 240 and $N_{RB}$ 260 are proportional to a system transmission bandwidth. A data rate is increased in proportion to the number of RBs scheduled for the terminal.

The frame structure of the LTE and LTE-A systems as described above is designed considering normal voice/data communications, and has limitations in scalability to meet various services and requirements like the 5G system. Therefore, the 5G system needs to flexibly define and operate the frame structure considering various services and requirements.

As described above, since an operating frequency band of the 5G system is wide from several hundreds of MHz to 100 GHz, transmission and reception suitable for channel environment for each frequency band may be difficult if a single frame structure is operated over the entire frequency band. That is, the 5G system subdivides the operating frequency band and thus operates the frame structure defining the sub-carrier spacing, thereby efficiently transmitting and receiving a signal. For example, to overcome performance deterioration due to phase noise in the high frequency band, it is preferable to keep the sub-carrier spacing relatively large. In addition to the operating frequency band, even a cell size may also be a primary consideration defining the frame structure. For example, when the cell size is large, it may be preferable to apply a relatively long CP length in order to avoid the inter-symbol interference due to a multipath propagation signal. Hereinafter, for convenience of explanation, the frame structure defined according to various scenarios such as the operating frequency band and the cell size will be referred to as a scalable frame structure.

The main subject of the present disclosure is to define essential parameter sets (in the present disclosure, the set is referred to as numerology) defining the scalable frame structure for each operating scenario and to maintain compatibility between the essential parameter sets to enable the efficient system operation. The essential parameter set may be a set of values applied for mobile communication, and may include, for example, the sub-carrier spacing, the CP length, a frequency bandwidth, a subframe length, and the like. The operating scenario may be defined according to service types such as an operating frequency band, a cell size, eMBB, URLLC, and massive MTC.

In the 5G system, a plurality of numerologies may exist and may coexist in one cell. One cell may support at least one numerology, and the cell will need to efficiently notify terminals within a service area of the cell of the supportable numerology. One set of numerologies may be configured of several elements, that is, a combination of a frequency bandwidth, sub-carrier spacing, a cyclic prefix (CP) length, a subframe length, and the like. Accordingly, there will be many kinds of possible numerologies. Therefore, there is a need to optimize the notifying the numerology supported by a cell to the terminal in terms of signaling overhead.

Accordingly, according to the present disclosure, a method for efficiently signaling numerology supported by a cell will be described.

On the other hand, since supporting all combinations of numerologies by the terminal is very inefficient in terms of complexity and cost, only several numerologies may be supported in consideration of the use of each terminal, numerology of a cell provided by a main contract operator, features, and the like. This means that when a moving terminal reselects a serving cell, a numerology supported by a cell newly camping-on a numerology supported by the terminal needs to be considered. Accordingly, the present disclosure is characterized in that the terminal additionally considers numerology in addition to signal quality and frequency priority provided by an operator when reselecting a cell.

Figure 3:
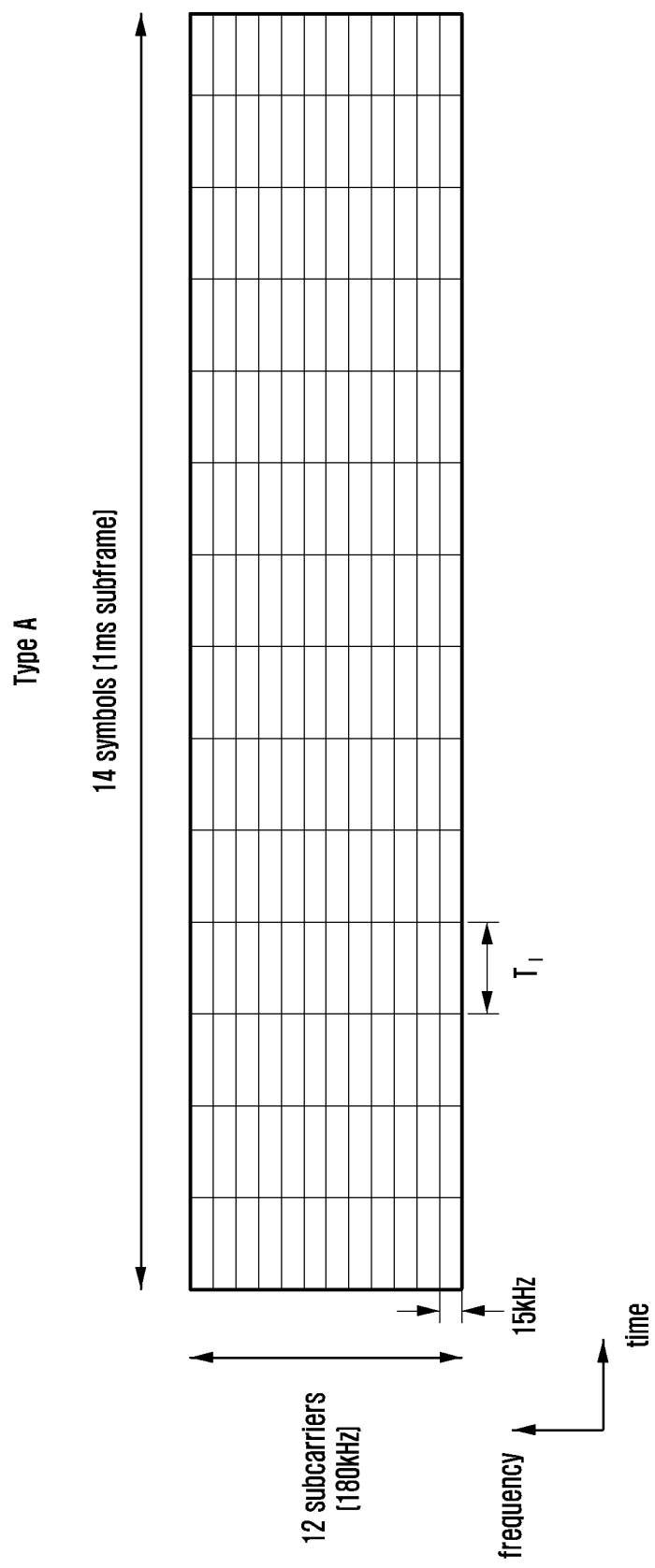
FIG. 3 illustrates an example 1 (sub-carrier spacing of 15 KHz) of an extended frame structure according to an embodiment of the present disclosure.
Figure 4:
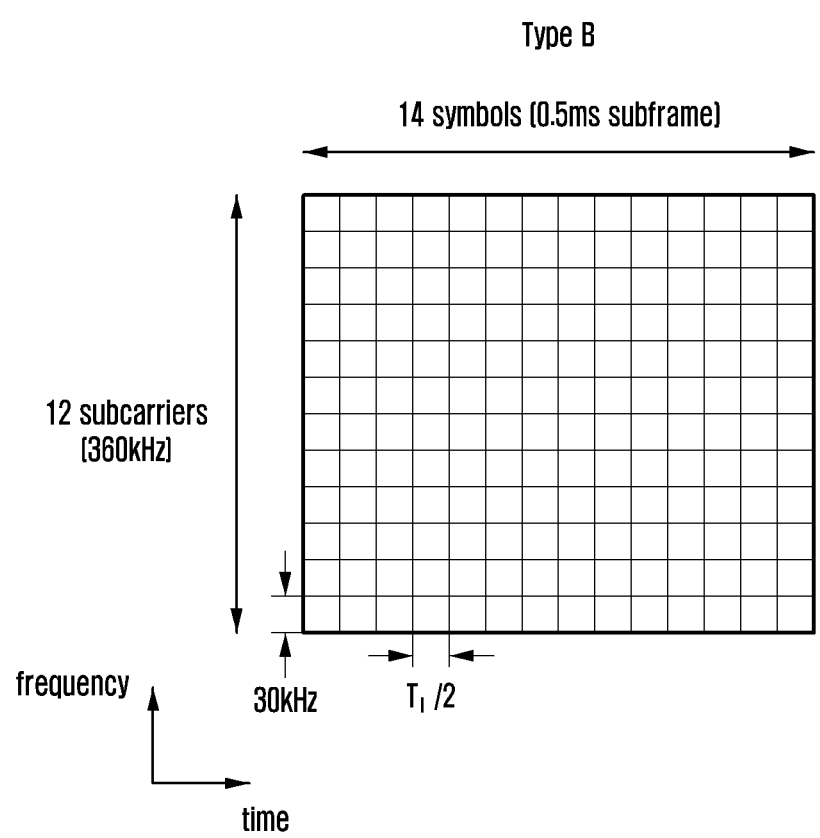
FIG. 4 illustrates an example 2 (sub-carrier spacing of 30 KHz) of an extended frame structure according to an embodiment of the present disclosure.
Figure 5:
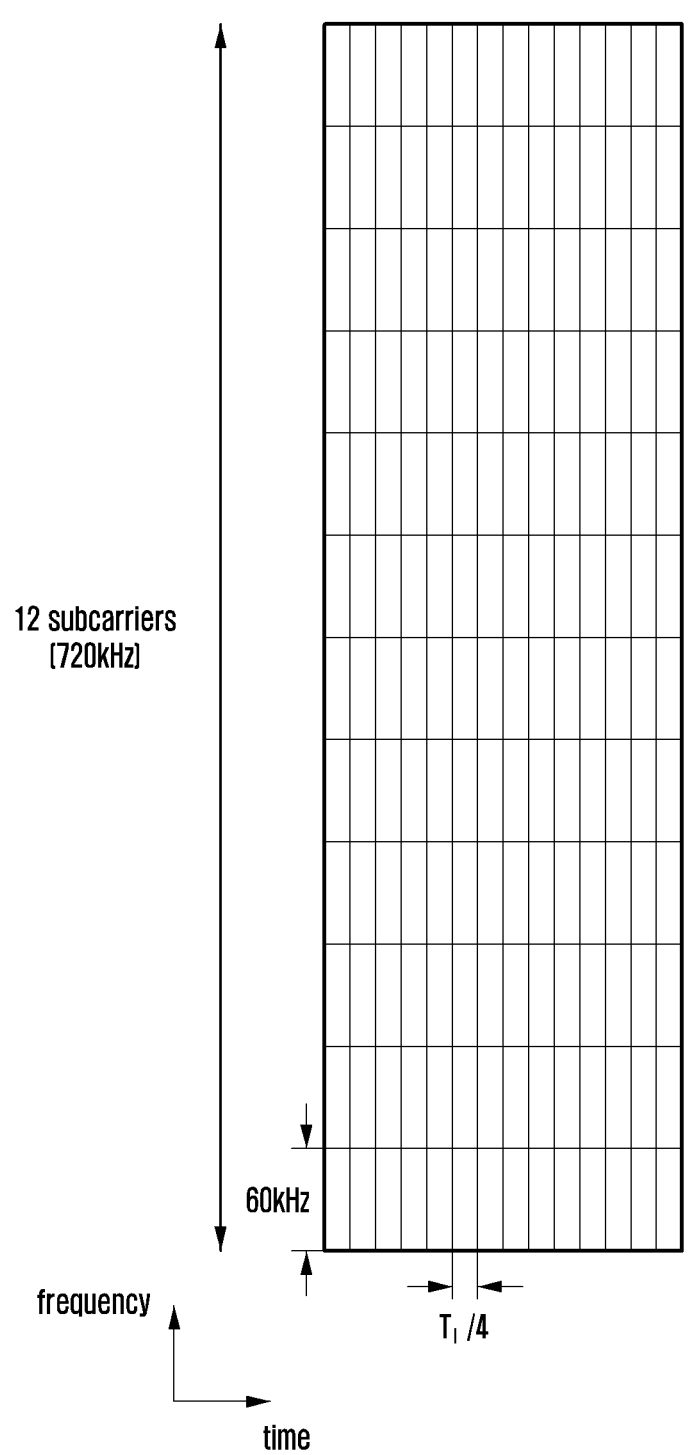
FIG. 5 illustrates an example 3 (sub-carrier spacing of 60 KHz) of an extended frame structure according to an embodiment of the present disclosure.

FIGS. 3 to 5 illustrate examples 1 to 3 of a scalable frame structure according to an embodiment of the present disclosure.

As an example, FIGS. 3 to 5 illustrate the case where the essential parameter set defining the scalable frame structure includes the sub-carrier spacing, the CP length, the subframe length, and the like.

In the early stage of the introduction of the 5G system, coexistence with the existing LTE/LTE-A systems or a dual mode operation is at least anticipated. By this, the existing LTE and LTE-A systems may serve to provide the stable system operation and the 5G system may serve to provide enhanced services. Therefore, the scalable frame structure of the 5G system at least needs to include the frame structure of the LTE and LTE-A or the essential parameter set.

FIG. 3 illustrates a 5G frame structure like the frame structure of the LTE and LTE-A or the essential parameter sets. Referring to FIG. 3, in a frame structure type A, sub-carrier spacing is 15 kHz, a subframe of 1 ms consists of 14 symbols, and a PRB consists of 12 sub-carriers (=180 kHz=12×15 kHz).

Referring to FIG. 4, in a frame structure type B, the sub-carrier spacing is 30 kHz, a subframe of 0.5 ms consists of 14 symbols, and a PRB consists of 12 sub-carriers (=360 kHz=12×30 kHz). That is, it may be seen that the frame structure type B has the sub-carrier spacing and the PRB size twice larger than those of the frame structure type A and the frame structure type B has the subframe length and the symbol length twice smaller than those of the frame structure type A.

Referring to FIG. 5, in a frame structure type C, sub-carrier spacing is 60 kHz, a subframe of 0.25 ms consists of 14 symbols, and a PRB consists of 12 sub-carriers (=720 kHz=12×60 kHz). That is, it may be seen that the frame structure type C has the sub-carrier spacing and the PRB size four times larger than those of the frame structure type A and the frame structure type B has the subframe length and symbol length fourth times smaller than those of the frame structure type A.

That is, if the frame structure type is generalized, the sub-carrier spacing, the CP length, the subframe length or the like that are the essential parameter sets have an integer multiple relationship with each other for each type, such that high scalability may be provided. In addition, as with the characteristics of the LTE frame structure, the CP length of some of the symbols in the subframe may differ from the CP length of the remaining symbols in the subframe, under the defined frame structure.

The exemplified frame structure type may be applied corresponding to various scenarios. In terms of the cell size, it is possible to support a cell having a larger size as the CP length is increased, such that the frame structure type A may support a cell relatively larger than the frame structure types B and C. In terms of the operating frequency band, as the sub-carrier spacing is increased, it is more advantageous in restoring the phase noise in the high frequency band, such that the frame structure type C may support an operating frequency relatively higher than the frame structure types A and B. In terms of the service, to support the ultra-low delay service like the URLLC, it is advantageous to make the subframe length shorter, and therefore the frame structure type C is relatively more suitable for the URLLC service than the frame structure types A and B.

In addition, a scenario for multiplexing the frame structure types in one system and integrally operating them may be considered.

Figure 6:
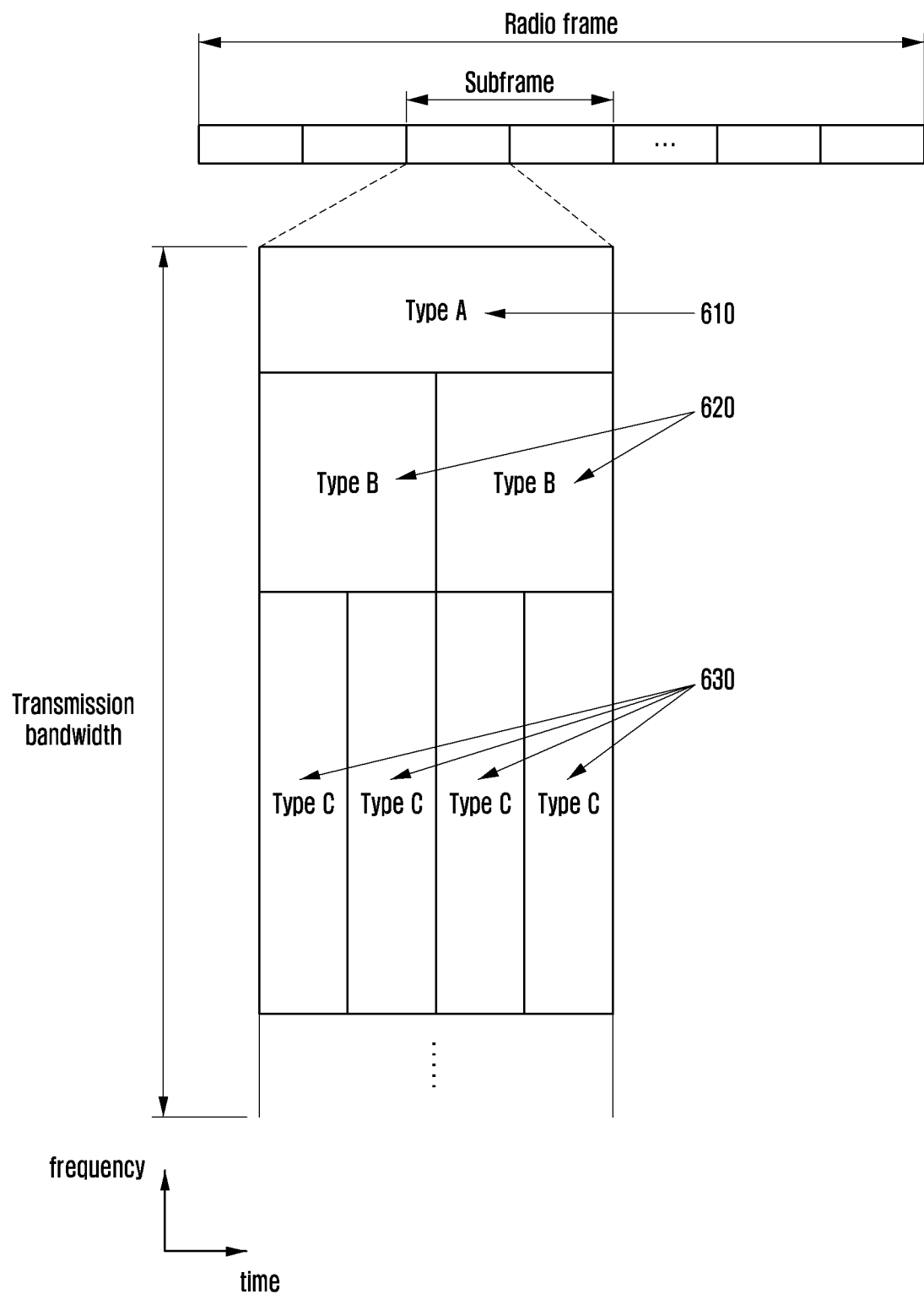
FIG. 6 illustrates an example of multiplexing the extended frame structure according to the embodiment of the present disclosure.

FIG. 6 illustrates an example of multiplexing the extended frame structure according to the embodiment of the present disclosure.

FIG. 6 illustrates an example in which a frame structure type A 610, a frame structure type B 612, and a frame structure type C 630 illustrated in FIGS. 3 to 5 are multiplexed within one system. That is, by maintaining the integer multiple relationship between the essential parameter sets defining the frame structure type, resource mapping in the subframe or in the PRB may be smoothly performed even in the case of the multiplexing as illustrated in FIG. 6.

Figure 7:
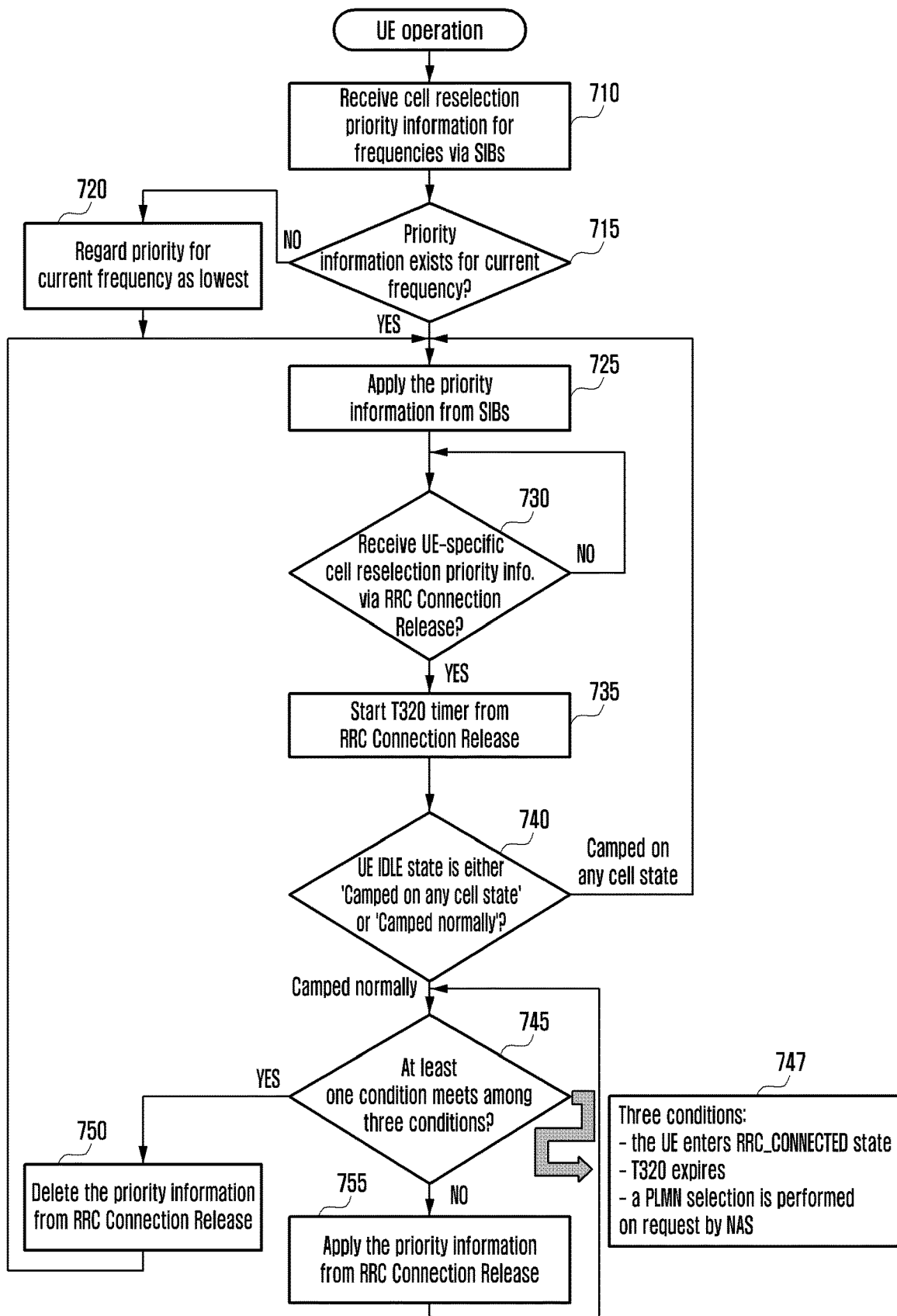
FIG. 7 illustrates an example of a process of transmitting priority information on each frequency for a cell reselection in the LTE technology to a terminal and applying the priority information according to an embodiment of the present disclosure.

FIG. 7 illustrates an example of a process of transmitting priority information on each frequency for a cell reselection in the LTE technology to a terminal and applying the priority information according to the present disclosure.

Referring to FIG. 7, in the LTE technology, priority information on each frequency for a cell reselection may be broadcast through a system information block (SIB) or may be transmitted to a specific terminal through a radio resource control (RRC) connection release message which is dedicated RRC signaling and applied.

The cell reselection is a process of reselecting a serving cell so that a moving terminal may be connected to a cell having the best channel state. The network assigns priority on each frequency and controls a cell reselection of terminals in an idle mode. For example, if one terminal receives priority information on two frequencies f1 and f2 and f1 has a higher priority than f2, the probability that the terminal will stay in f1 is increased. In addition, even if the terminal stays in f2, if the channel state of f2 is not good, the terminal will try to change to f1. The priority information on the frequency may be broadcast through the SIB or may be provided to the specific terminal through an RRC connection release message which is the dedicated RRC signaling. Even if the terminal has priority information on frequencies through the SIB in advance, if the terminal receives the UE-specific priority information provided by the RRC signaling, the priority information on the SIB may be ignored. The priority information on each frequency is transmitted through the following cell reelection priority information element (IE), for example, allocated one of eight priority levels. The lower the value, the lower the priority becomes. For example, "0" may mean the lowest priority.

| CellReselectionPriority information element |
|---|
| -- ASN1START |
| CellReselectionPriority ::=    INTEGER (0..7) |
| -- ASN1STOP |

Frequencies between radio access technologies (RAT) may not be allocated the same priority. If the idle state of the terminal is "camped on any cell state," the terminal applies the frequency priority information received through the SIB and may only store priority information received from the RRC signaling without using the priority information. On the other hand, the cellReselectionPriority IE is an optional 1E, which may not exist. In this case, the priority information on the corresponding frequency is not allocated. At this time, the terminal may consider the priority of the corresponding frequency as the lowest level.

In step 710, the terminal may receive priority information on frequencies used in not only EUTRA but also other RATs through the SIB. However, priority information on all frequencies is not necessarily provided to the terminal. Priority information on a frequency of a serving cell currently camped may not also be provided to the terminal.

In step 715, the terminal may confirm whether the priority information on the frequency of the current serving cell exists in the SIB. If the priority information on the frequency of the current serving cell is not provided, in step 720, the terminal may consider the priority on the current frequency as the lowest level.

The terminal may apply the priority information on each frequency received through the SIB in step 725 and/or the priority information on the current frequency considered in step 720.

If the terminal receives the RRC connection release message from the base station, the terminal switches from the connected mode to the idle mode. At this time, the RRC message may include the priority information on the frequency. The priority information is the UE-specific information and may be preferentially applied to the frequency priority information received from the SIB. Accordingly, in step 730, the terminal may confirm whether there is the frequency priority information (e.g., UE-specific cell reselection priority information) in the RRC message (e.g., an RRC connection release message).

If there is the frequency priority information in the RRC message, the terminal may apply a T 320 value included in the RRC message to drive one timer in step 735.

In step 740, the terminal can determine whether the current standby mode state is "camped on any cell state" or "camped normally state." The "camped normally state" refers to a state in which the terminal is camped in a suitable cell. The suitable cell is a cell that may provide a normal service to a terminal, and is a cell satisfying the following detailed conditions: correspond to a public land mobile network (PLMN) selected by a cell (selected PLMN), a registered PLMN, or one PLMN within an equivalent PLMN list; cell not be barred; cell satisfying a cell selection criterion; and cell in which the corresponding CSG ID exists in a whitelist of the terminal if the cell is a closed subscriber group (CSG) cell.

In addition, the "camped on any cell state" refers to a state in which a terminal is camped in an acceptable cell because the terminal is not camped in a suitable cell. In the acceptable cell, normal services are impossible and the terminal may try only an emergency call. The acceptable cell is a cell satisfying the following conditions: cell not be barred; and cell satisfying a cell selection criterion.

If the terminal is in the "camped on any cell state" idle state, the terminal returns to step 725 instead of the priority information received from the RRC connection release message, and applies the frequency priority information received from the SIB.

However, if the terminal is in the "camped normally" idle state, the terminal determines in step 745 whether at least one of the following three conditions 747 is satisfied. The three conditions 747 are as follows: the terminal is switched to the connection mode; T320 timer expires; and a PLMN selection process is performed according to a non-access stratum (NAS) request.

If any of the above conditions is satisfied, the terminal discards the priority information received from the RRC connection release message in step 750 and returns to step 725 to apply the frequency priority information received from the SIB. Otherwise, if any of the conditions is not satisfied, the terminal may apply the priority information received from the RRC connection release message in step 755.

The frequency priority information affects the measurement on the specific frequency by the terminal. The terminal may always perform measurement on a higher-frequency priority than the current serving cell. On the other hand, other frequencies that have priority equal to or lower than the same intra-frequency as the serving cell or the frequency of the serving cell may not always perform the measurement on the corresponding frequency to save terminal power. At this time, it may be performed whether to perform the measurement on the corresponding frequency when the channel quality of service (QoS) of the serving cell is less than or equal to a specific threshold. The cell reselection is performed to move the terminal to a cell having a good channel state. However, there is no reason for the terminal to move to the frequency having the same priority or lower priority because the channel QoS of the current serving cell is good. Accordingly, in order to reduce power consumption due to the unnecessary channel measurement for the terminal, it is determined whether or not the terminal performs the measurement on the corresponding frequency based on the specific threshold. In the case of the intra-frequency, if the QoS of the serving cell is equal to or lower than the specific threshold Sintrasearch, the terminal may perform the channel measurement on other cells of the intra-frequency. For other frequencies having the same priority or lower priority, when the QoS of the serving cell is equal to or lower than a specific threshold Snonintrasearch, the terminal may perform the channel measurement on cells of different frequencies. The channel QoS generally considers reference signal received power (RSRP) and reference signal received quality (RSRQ).

If the channel QoS of the cell of the higher-priority frequency becomes higher than a specific threshold ThreshX-high while the terminal performs the measurement, the terminal may reselect the cell of the high-priority frequency as the serving cell. If the channel QoS of the cell of the low-priority frequency is higher than the specific threshold ThreshX-low and the QoS of the serving cell is lower than ThreshServing-low, the terminal may reselect the cell of the low-priority frequency as the serving cell.

Figure 8:
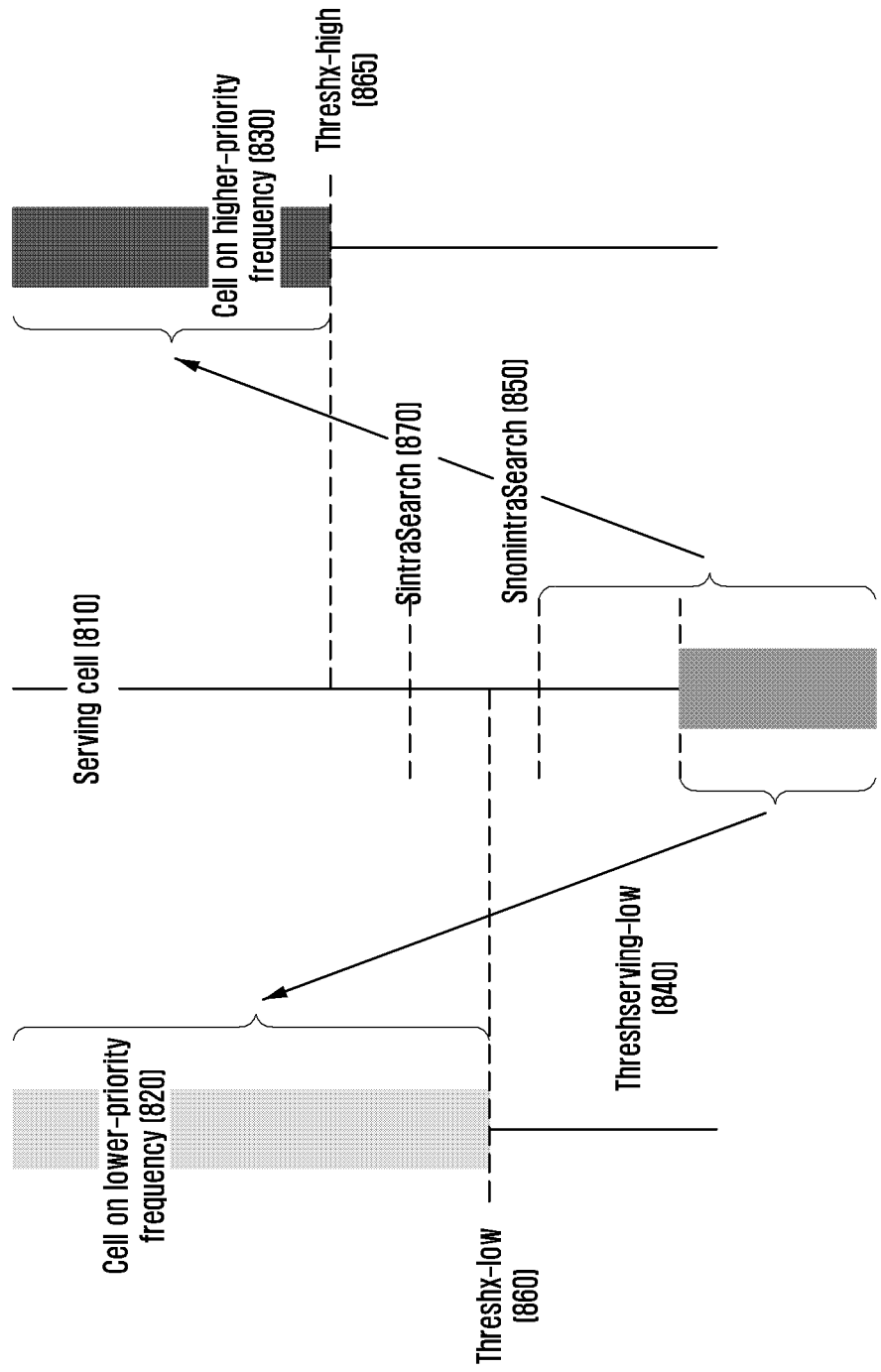
FIG. 8 illustrates a method for a terminal to perform cell reselection depending on signal strength according to an embodiment of the present disclosure.

FIG. 8 illustrates a method for a terminal to perform cell reselection depending on signal strength according to the present disclosure.

Referring to FIG. 8, the terminal always performs inter-frequency/RAT measurement on the higher-priority frequency or the RAT regardless of the measurement signal strength for the serving cell 810. If the measurement signal strength for the serving cell 810 is lower than a first threshold (e.g., SintraSearch) 870, the terminal may perform the intra-frequency measurement. If the measurement signal strength for the serving cell 810 is lower than a second threshold (e.g., SnonintraSearch) 850, the terminal may set the inter-frequency measurement for the frequency equal to or lower than the frequency of the current serving cell. The reason for stepwise triggering the terminal measurement is to reduce the power consumption of the terminal due to the measurement for the neighbor cell.

If the channel QoS of the cell 830 of the high-priority frequency is higher than a specific threshold (e.g., a third threshold) (ThreshX-high) 865, the terminal may reselect the cell 830 of the high-priority frequency as the serving cell. If the channel QoS of the cell 820 of the low-priority frequency is higher than a specific threshold (e.g., a fourth threshold) (ThreshX-low) 860 and the QoS of the serving cell 810 is lower than a fifth threshold (e.g., ThreshServing-low) 840, the terminal may reselect the cell 820 of the lower-priority frequency as the serving cell.

The reference signal received strength (RSRP) or the reference signal received quality (RSRQ) may be considered at the time of the cell reselection of the terminal. In the case of using the received signal quality, that is, the RSRQ, the base station may separately provide Threshserving-lowQ, ThreshX-lowQ, and ThreshX-highQ to the terminal by broadcasting. If the received signal strength, that is, the RSRP is used, it is possible to use Threshserving-lowP, ThreshX-lowP, and ThreshX-highP in the present disclosure in order to distinguish from the above variables.

On the other hand, the 5G systems may support a variety of numerologies. In the existing LTE, a frequency bandwidth is the main numerology. Additionally, however, other factors such as the sub-carrier spacing between sub-carriers, the CP length, and the subframe length may be considered. The specific values of the above factors are determined depending on various services, such as the enhanced mobile broadband (eMBB) service for enhancing the existing voice/data communication supported by the 5G cell, the ultra-reliable and low latency communication (URLLC) service, and the massive machine type communication (MTC) service for massive thing communication, and requirements.

A 5G physical layer is expected to have a maximum of 2048 sub-carriers. In existing LTE, a sub-carrier spacing of 15 kHz is applied to support a frequency bandwidth of up to 20 MHz. However, since the 5G will support a wider frequency bandwidth, the sub-carrier spacing will also increase. In the 5G system, 30 kHz and 60 kHz are considered along with the existing 15 kHz. Typically, the wide sub-carrier spacing reduces a Doppler shift effect. 15 kHz for Internet of things (IoT) terminals or services that use a narrow bandwidth in the low frequency band and 30 kHz or 60 kHz for the wide frequency bandwidth and fast moving scenarios may be considered. On the other hand, it may be inefficient in terms of complexity and cost that one terminal supports all various sub-carrier spacing. The supported numerology may be limited depending on the service that the base station also supports.

In the present disclosure, a 5G base station broadcasts numerologies supported by each 5G frequency or cells. Further, the terminal considers the numerology supported by a cell at the time of reselecting the cell.

The base station may provide the numerology supported by each frequency or a cell to the terminal using the system information.

Figure 9:
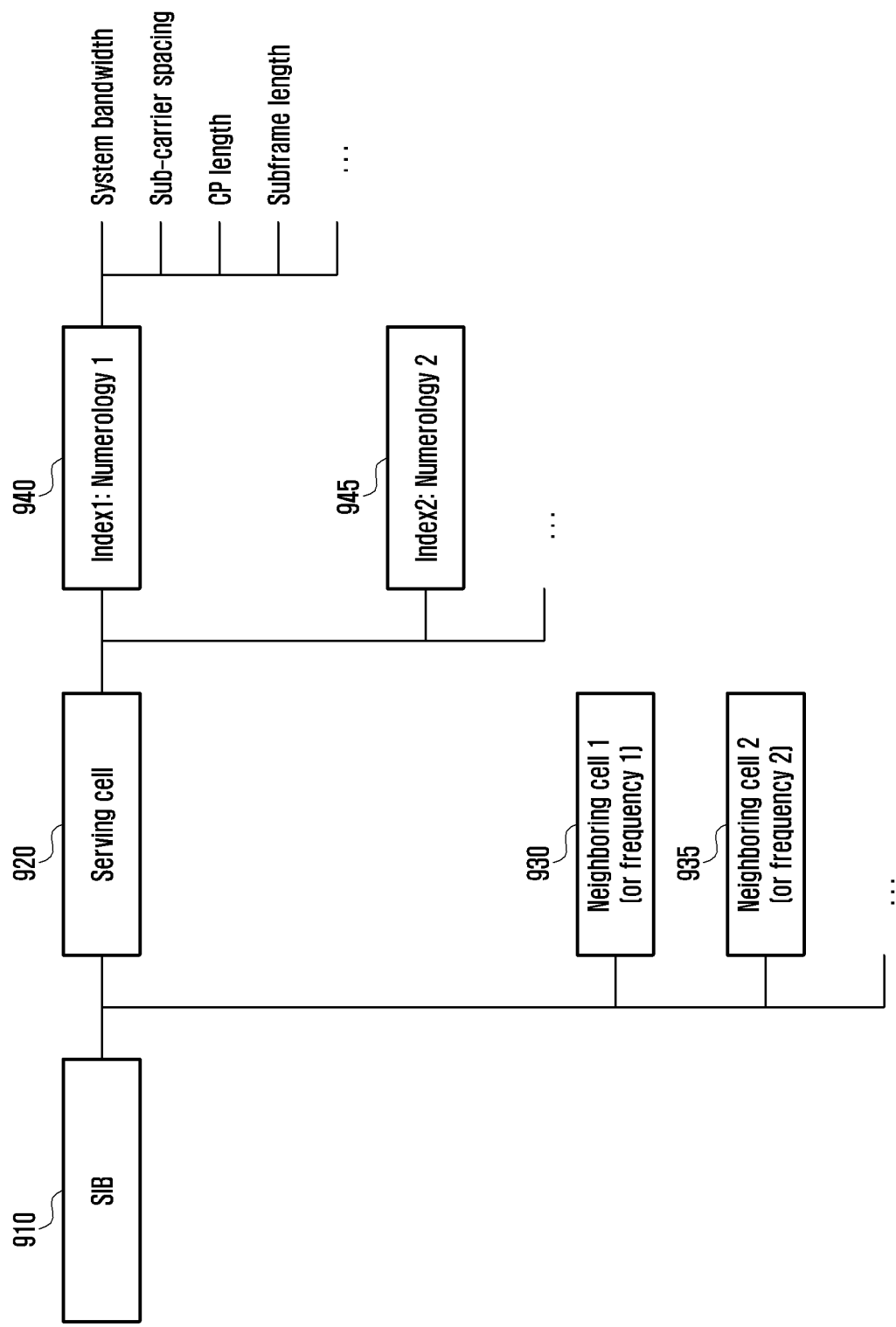
FIG. 9 illustrates an example of a configuration of supported numerology according to an embodiment of the present disclosure.

FIG. 9 illustrates an example of a configuration of supported numerology according to an embodiment of the present disclosure.

Referring to FIG. 9, one cell may use system information (SIB) 910 to broadcast a numerology supported by the one cell's own 920 and neighbor frequencies/cells 930 and 935. One cell may support at least one numerology 940 and 945.

Each numerology 940 and 945 may consist of a combination of several elements. For example, each numerology 940 and 945 may consist of at least one combination of the system bandwidth, the sub-carrier spacing, the CP length, the subframe length, and the like. Although not illustrated, each numerology 940 and 945 may also consist of a combination of different elements. To reduce signaling overhead, each numerology 940 and 945 may be encoded with an index. For example, a frequency bandwidth of 10 MHz, a sub-carrier spacing of 15 kHz, a CP length of 1 ms, and a subframe length of 10 ms may be represented by an index value of 1.

Figure 10:
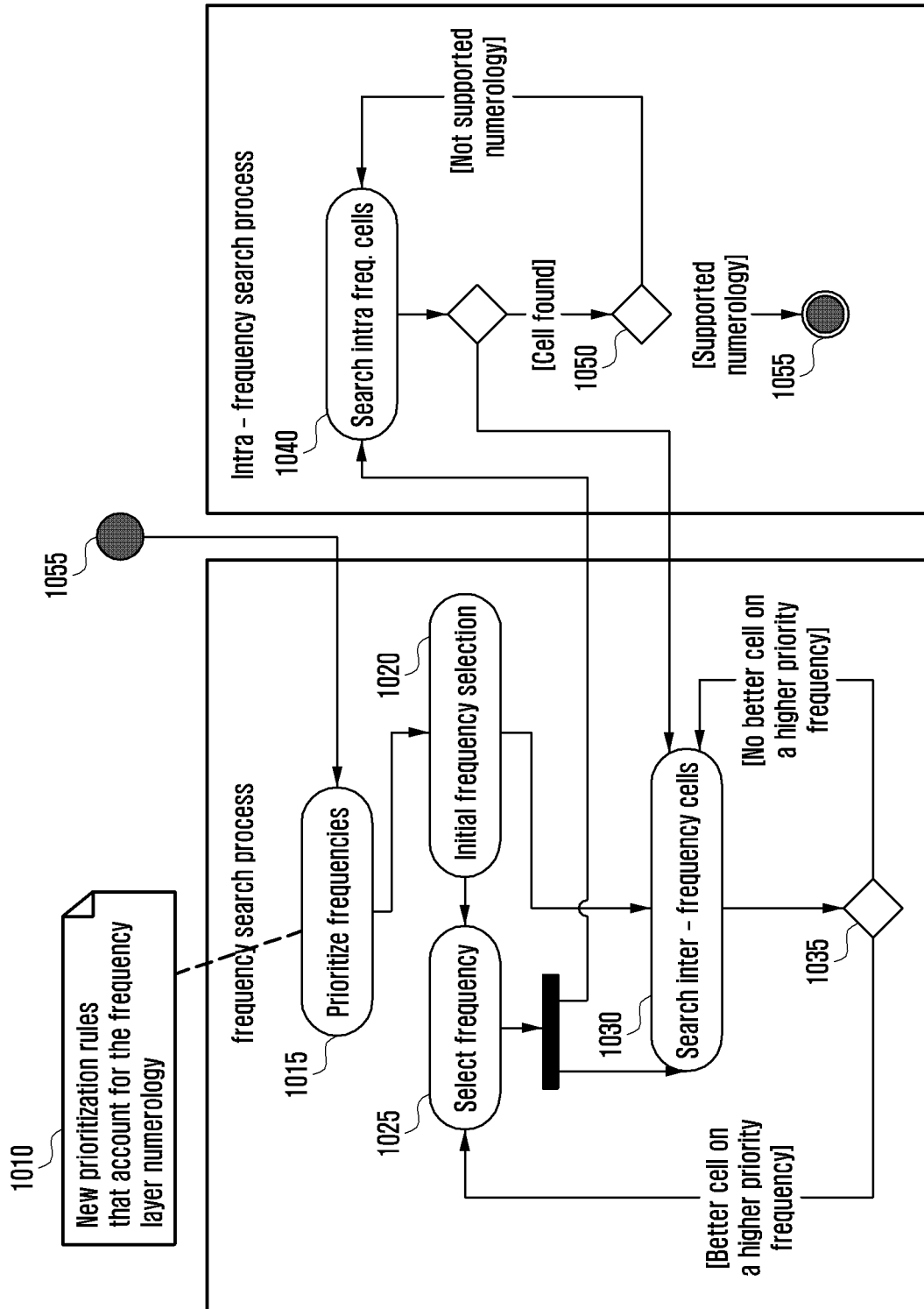
FIG. 10 illustrates a process of performing a cell reselection according to an embodiment of the present disclosure.

FIG. 10 illustrates a process of performing a cell reselection according to an embodiment of the present disclosure.

In the present disclosure, a terminal may receive numerology information supported by a serving cell and the neighbor cells (frequencies) from a cell using the system information. The terminal may derive the priority by considering both of the numerology supported by the cells at the same or different frequencies and the numerology supported by the current serving cell to perform the cell reselection using the priority information. If the specific cell of the frequency having priority higher than that of the current frequency has the better received signal quality than the specific threshold, the terminal may perform the reselection to the cell having the better received signal quality. The cell may be able to at least support the numerology supported by the terminal. The terminal may derive frequency priority 1010 depending on the supported numerologies at each frequency (or a specific cell at each frequency) (1015). The rule for determining the frequency priorities may be various. For example, the base station may provide priority information on each frequency and the supported numerologies to the terminal using the system information.

For example, the base station may transmit the system information including priority information corresponding to each frequency and the supported numerology (for example, consisting of sub-carrier spacing information) to the terminal as shown in the following example. At this time, the priority having a higher figure may mean that priority is high. For example, "0" may mean the lowest priority: (1) Frequency: A; Numerology: 60 kHz; Priority: 1; (2) Frequency: B; Numerology: 15 kHz; Priority: 4; (3) Frequency: C; Numerology: 15 kHz, 30 kHz; Priority: 3; (4) Frequency: D; Numerology: 30 kHz; Priority: 0; and (5) Frequency: E; Numerology: 30 kHz, 60 kHz; Priority: 2.

The terminal may derive a new (UE specific) frequency priority applied to the terminal by considering the priorities of each frequency and the supported numerology. At this time, frequencies supporting all numerologies supported by the terminal may have the highest priority. At this time, a frequency supporting some of the numerologies supported by the terminal may have the second highest priority. On the other hand, a frequency that does not support the numerology supported by the terminal at all may have the lowest priority. Meanwhile, according to the embodiment, when the priorities of each frequency are the same, a frequency supporting only one sub-carrier spacing (or supporting a smaller number of sub-carrier spacings) may have a higher priority.

For example, the priorities of the frequencies of the above examples may be determined depending on the numerology (UE supporting numerology)(e.g., sub-carrier spacing supported by the terminal) supported by the terminal as follows: (1) a UE supporting 15 kHz, 30 kHz, 60 kHz:B, C, E, A, D; (2) a UE supporting 15 kHz, 30 kHz:B, C, D, E; (3) a UE supporting 15 kHz, 60 kHz:B, A, E; (4) a UE supporting 30 kHz, 60 kHz:E, A, D; and (5) a UE supporting 60 kHz:A, E.

The terminal may perform an initial frequency selection process based on the derived frequency priority information (1020). The terminal may select one frequency of the terminal by considering the signal quality and the like (1025). If the frequency at which the terminal is currently camped-on is best, the terminal may determine whether there is an appropriate cell within the frequency (1040). If all the cells of the frequency do not support the desired numerology (1050) or the signal quality is poor, the terminal may select an appropriate cell at other frequencies having the next priority (1030). If a higher-priority frequency having good signal quality is found (1035), the terminal may select the frequency (1025). If no higher priority frequency having good signal quality is found, the terminal may perform a frequency search again (1030). If all the cells of a specific frequency support one numerology supported by the terminal, the terminal may camp-on the specific cell of the frequency. If there are several cells at one frequency and only specific cells support the numerology supported by the terminal, the terminal may camp-on only those cells. The terminal camping-on the cell supporting the numerology supported by the terminal may proceed to step 1055 and return to step 1015.

Figure 11:
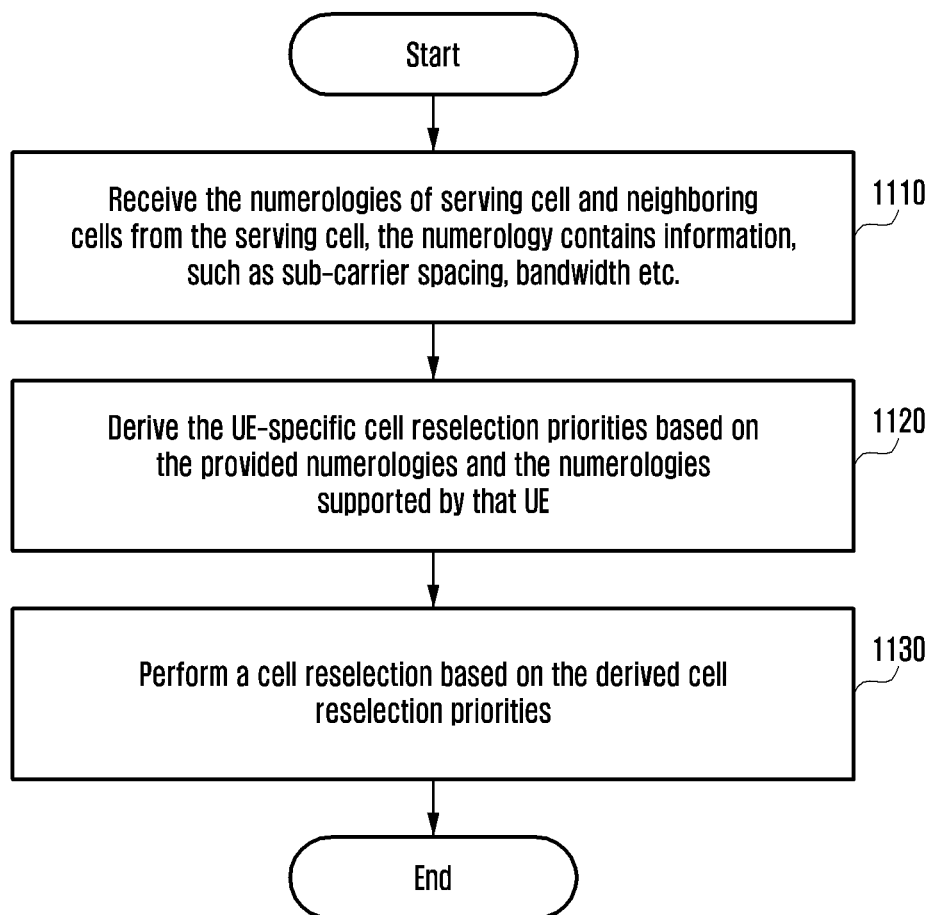
FIG. 11 illustrates an operation of a terminal according to an embodiment of the present disclosure.

FIG. 11 illustrates an operation of a terminal according to an embodiment of the present disclosure.

Referring to FIG. 11, in step 1110, the terminal may receive numerologies supported by the serving cell and neighbor cells from the serving cell. In addition, the terminal may receive priority information on each frequency along with the information on the numerologies supported by the serving cell and the neighbor cells through a separate message.

In step 1120, the terminal may derive a cell reselection priority using the received numerology and the priority information on each frequency. In step 1130, the terminal may perform the cell reselection using the reselection priority information.

Thereafter, the terminal may camp-on the cell supporting the numerology supported by the UE at the reselected frequency. The received signal quality of the cell that is camped-on will satisfy a specific threshold. If there is no cell satisfying the threshold, the terminal may reselect the next-priority frequency.

Figure 12:
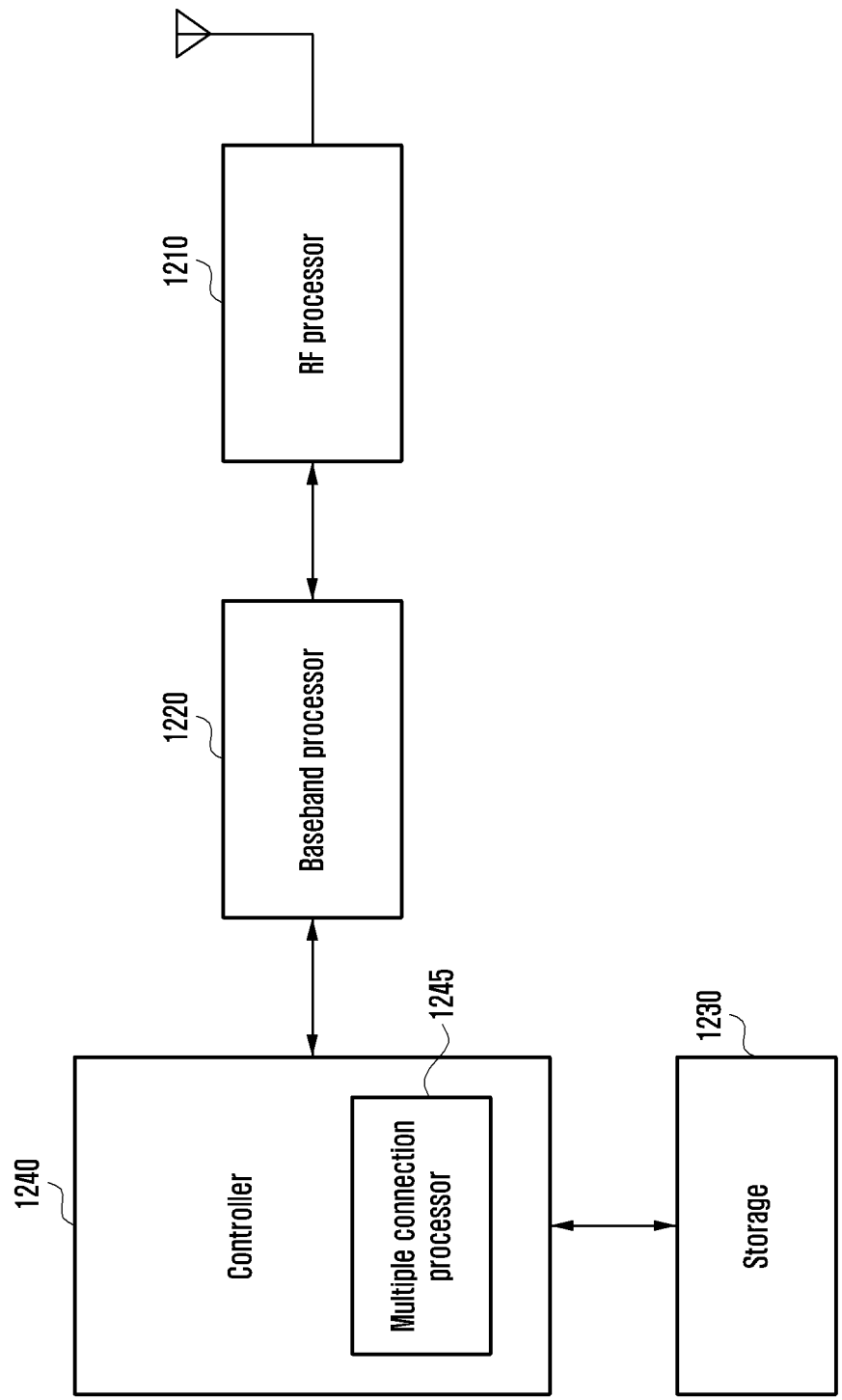
FIG. 12 illustrates a configuration of the terminal according to the embodiment of the present disclosure.

FIG. 12 illustrates a configuration of the terminal according to the embodiment of the present disclosure.

Referring to FIG. 12, the terminal according to one embodiment of the present disclosure may include a transceiver and a controller 1240. The terminal may further include a storage 1230. At this point, the transceiver may be a radio frequency (RF) processor 1210. According to the embodiment, the transceiver may include an RF processor 1210 and a baseband processor 1220.

The RF processor 1210 serves to transmit/receive as signal through a radio channel, such as band conversion and amplification of a signal. That is, the RF processor 1210 may up-convert a baseband signal provided from the baseband processor 1210 into an RF band signal and then transmit the RF band signal through an antenna, and down-convert the RF band signal received through the antenna into the baseband signal. For example, the RF processor 1210 may include a transmitting filter, a receiving filter, an amplifier, a mixer, an oscillator, a digital to analog converter (DAC), an analog to digital converter (ADC), or the like. FIG. 12 illustrates only one antenna but the terminal may include a plurality of antennas. Further, the RF processor 1210 may include the plurality of RF chains. Further, the RF processor 1210 may perform beamforming. For the beamforming, the RF processor 1210 may adjust a phase and a size of each of the signals transmitted and received through a plurality of antennas or antenna elements. In addition, the RF processor 1210 may perform MIMO and may receive a plurality of layers when performing a MIMO operation. The RF processor 1210 may perform reception beam sweeping by appropriately configuring a plurality of antennas or antenna elements under the control of the controller 1240 or adjust a direction and a beam width of the reception beam so that the reception beam is resonated with the transmission beam.

The baseband processor 1220 performs a conversion function between the baseband signal and a bit string according to a physical layer standard of the system. For example, when data are transmitted, the baseband processor 1220 generates complex symbols by coding and modulating a transmitted bit string. Further, when data are received, the baseband processor 1220 may recover a received bit string by demodulating and decoding the baseband signal provided from the RF processor 1210. For example, according to an orthogonal frequency division multiplexing (OFDM) scheme, when data are transmitted, the baseband processor 1220 may generate the complex symbols by coding and modulating the transmitted bit string, map the complex symbols to sub-carriers, and then configure OFDM symbols by an inverse fast Fourier transform (IFFT) operation and a cyclic prefix (CP) insertion. Further, when data are received, the baseband processor 1220 may segment the baseband signal provided from the RF processor 1410 in an OFDM symbol unit, recover the signals mapped to the sub-carriers by the fast Fourier transform (FFT) operation, and then recover the received bit string by the modulation and decoding.

The baseband processor 1220 and the RF processor 1210 may transmit and receive a signal as described above. Therefore, the baseband processor 1220 and the RF processor 1210 may be called a transmitter, a receiver, a transceiver, or a communication interface. Further, at least one of the baseband processor 1220 and the RF processor 1210 may include a plurality of communication modules to support a plurality of different radio access technologies. Further, at least one of the baseband processor 1220 and the RF processor 1210 may include different communication modules to process signals in different frequency bands. For example, different radio access technologies may include a wireless LAN (for example, IEEE 802.11 or the like), a cellular network (for example, LTE or the like), or the like. Further, the different frequency bands may include a super high frequency (SHF) (for example: 2.5 GHz, 5 GHz, or the like) band, a millimeter wave (for example, 60 GHz, or the like) band.

The storage 1230 may store data such as basic programs, application programs, and configuration information for the operation of the terminal. In particular, the storage 1230 may store information associated with a second access node performing wireless communication using a second access technology. The storage 1230 may provide the stored data according to the request of the controller 1240. The controller 1240 may control the overall operations of the terminal to perform any one operation of the above-described embodiments. For example, the controller 1240 may transmit/receive a signal through the baseband processor 1220 and the RF processor 1210. Further, the controller 1240 may record and read data in and from the storage 1230. For this purpose, the controller 1240 may include a circuit, an application-specific circuit, or at least one processor. For example, the controller 1240 may include a communication processor (CP) performing a control for communication and an application processor (AP) controlling a higher layer such as the application programs. In addition, the operations of the terminal may be realized by including a memory device storing the corresponding program code in any component of the terminal. That is, the controller 1240 may execute the above-described operations by reading and executing the program code stored in the memory device by a processor, a central processor (CPU) or the like. In addition, according to the embodiment of the present disclosure, the controller 1240 may include a multiple connection processor 1245 that performs processing to be operated in a multi connection mode. The controller 1240 may be electrically connected to other components, for example, the transceiver 1210.

Figure 13:
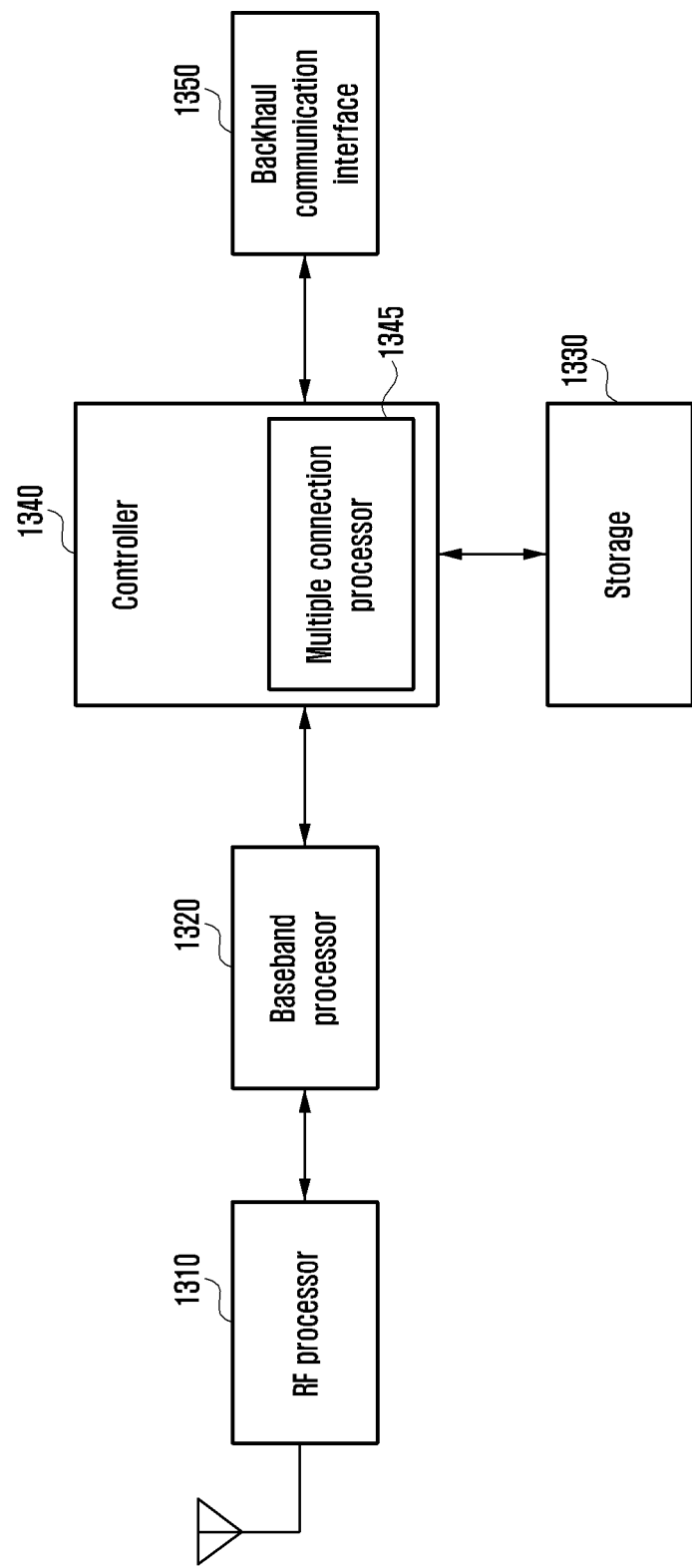
FIG. 13 illustrates a configuration of a base station according to an embodiment of the present disclosure.

FIG. 13 illustrates a configuration of a base station according to an embodiment of the present disclosure.

Referring to FIG. 13, the base station according to one embodiment of the present disclosure may include a transceiver and a controller 1340. Further, the base station may further include a backhaul communication interface 1350 and a storage 1330. At this point, the transceiver may be a radio frequency (RF) processor 1310. According to the embodiment, the transceiver may include an RF processor 1310 and a baseband processor 1320.

The RF processor 1310 serves to transmit/receive a signal through a radio channel, such as band conversion and amplification of a signal. That is, the RF processor 1310 may up-convert a baseband signal provided from the baseband processor 1320 into an RF band signal and then transmit the RF band signal through an antenna and down-convert the RF band signal received through the antenna into the baseband signal. For example, the RF processor 1310 may include a transmitting filter, a receiving filter, an amplifier, a mixer, an oscillator, a DAC, an ADC, etc. FIG. 13 illustrates only one antenna but the base station may include a plurality of antennas. Further, the RF processor 1310 may include the plurality of RF chains. Further, the RF processor 1310 may perform the beamforming. For the beamforming, the RF processor 1310 may adjust a phase and a size of each of the signals transmitted and received through a plurality of antennas or antenna elements. The RF processor 1310 may perform a downlink MIMO operation by transmitting one or more layers.

The baseband processor 1320 performs a conversion function between the baseband signal and a bit string according to a physical layer standard of the system. For example, when data are transmitted, the baseband processor 1320 generates complex symbols by coding and modulating a transmitted bit string. Further, when data are received, the baseband processor 1320 may recover a received bit string by demodulating and decoding the baseband signal provided from the RF processor 1310. For example, according to the OFDM scheme, when data are transmitted, the baseband processor 1320 may generate the complex symbols by coding and modulating the transmitted bit string, map the complex symbols to the sub-carriers, and then configure the OFDM symbols by the IFFT operation and the CP insertion. Further, when data are received, the baseband processor 1320 divides the baseband signal provided from the RF processor 1310 in an OFDM symbol unit and recovers the signals mapped to the sub-carriers by an FFT operation and then recovers the received bit string by the modulation and decoding.

The baseband processor 1320 and the RF processor 1310 may transmit and receive a signal as described above. Therefore, the baseband processor 1320 and the RF processor 1310 may be called a transmitter, a receiver, a transceiver, a communication interface, or a wireless communication interface. Further, at least one of the baseband processor 1320 and the RF processor 1310 may include a plurality of communication modules to support a plurality of different radio access technologies. Further, at least one of the baseband processor 1320 and the RF processor 1310 may include different communication modules to process signals in different frequency bands. For example, different radio access technologies may include a wireless LAN (for example, IEEE 802.11 or the like), a cellular network (for example, LTE or the like), or the like. Further, the different frequency bands may include a super high frequency (SHF) (for example: 2.5 GHz, 5 GHz, or the like) band, a millimeter wave (for example, 60 GHz, or the like) band.

The backhaul communication interface 1350 provides an interface for performing communication with other nodes within the network. That is, the backhaul communication interface 1350 may convert bit strings transmitted from the base station to other nodes, for example, an auxiliary base station (or other neighbor base stations), a core network, etc., into physical signals and converts the physical signals received from other nodes into bit strings.

The storage 1330 may store data such as basic programs, application programs, and configuration information for the operation of the base station. In particular, the storage 1330 may store the information on the bearer allocated to the accessed terminal, the measured results reported from the accessed terminal, etc. Further, the storage 1330 may store information that is a determination criterion on whether to provide a multiple connection to the terminal or stop the multiple connection to the terminal. The storage 1330 may provide the stored data according to the request of the controller 1340.

The controller 1340 may control the overall operations of the base station to perform any one operation of the above-described embodiments. For example, the controller 1340 may transmit/receive a signal through the baseband processor 1320 and the RF processor 1310 or the backhaul communication interface 1350. Further, the controller 1340 may record and read data in and from the storage 1330. For this purpose, the controller 1340 may include a circuit, an application-specific circuit, or at least one processor. For example, the controller 1340 may include a communication processor (CP) performing a control for communication and an application processor (AP) controlling a higher layer such as the application programs. In addition, the operations of the base station may be realized by including a memory device storing the corresponding program code in any component of the terminal. That is, the controller 1340 may execute the above-described operations by reading and executing the program code stored in the memory device by a processor, a central processor (CPU) or the like. In addition, according to the embodiment of the present disclosure, the controller 1340 may include a multiple connection processor 1345 that performs processing to be operated in a multi connection mode. The controller 1340 may be electrically connected to other components, for example, the transceiver 1310.

Hereinafter, an operation principle of the present disclosure will be described in detail with reference to the accompanying drawings. Hereinafter, when it is determined that the detailed description of the known art related to the present disclosure may obscure the gist of the present disclosure, the detailed description thereof will be omitted. Further, the following terminologies are defined in consideration of the functions in the present disclosure and may be construed in different ways by the intention or practice of users and operators. Therefore, the definitions thereof should be construed based on the contents throughout the specification.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3rd generation partnership project long term evolution (3GPP LTE). However, the present disclosure is not limited to the terms and names but may also be identically applied to the system according to other standards.

Figure 14:
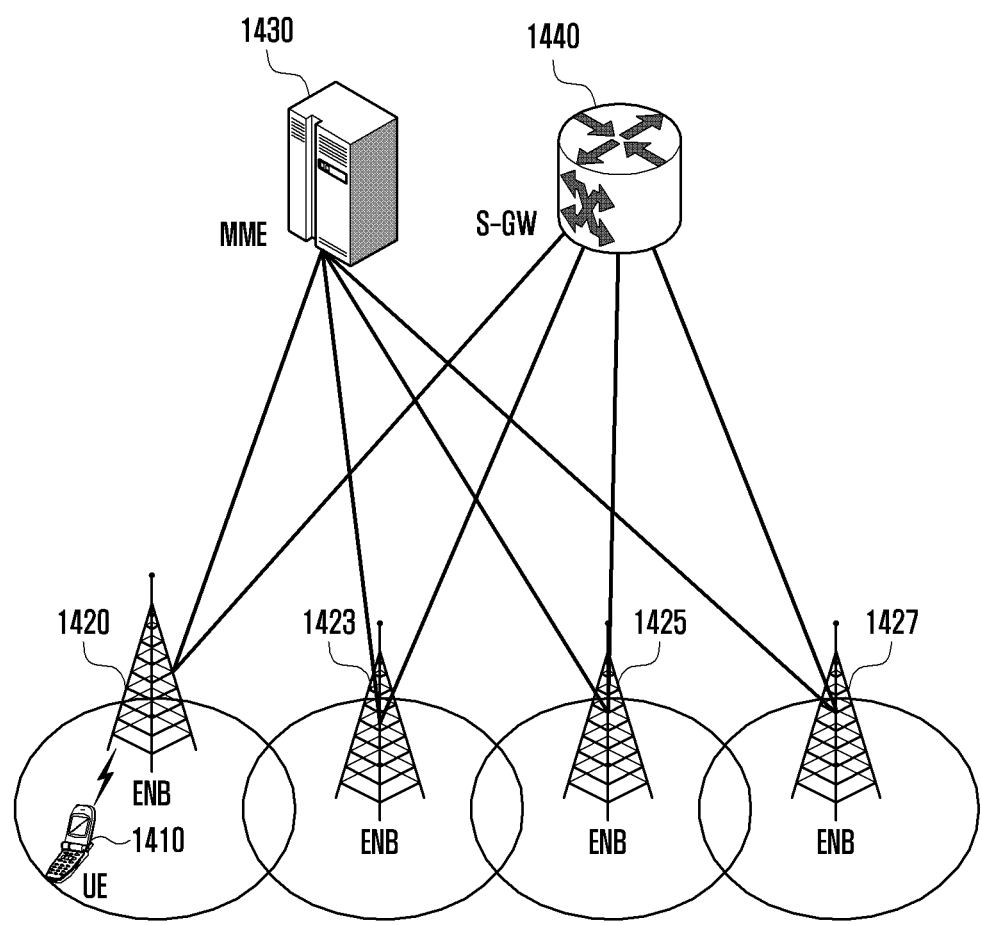
FIG. 14 illustrates an example of a network structure of an LTE system according to an embodiment of the present disclosure.

FIG. 14 illustrates an example of the network structure of the LTE system according to the embodiment of the present disclosure.

Referring to FIG. 14, a wireless communication system (e.g., an LTE system) may include a plurality of base stations (evolved node B (eNB)) 1420, 1423, 1425, and 1427, a mobility management entity (MME) 1430, and a serving gateway (S-GW) 1440. User equipment (UE) (or terminal) 1410 is connected to an external network through the base stations 1420, 1423, 1425, and 1427 and the S-GW 1440.

The base stations 1420, 1423, 1425, and 1427 are access nodes of a cellular network and provide a wireless access to terminals 1410 that are connected to the network. That is, in order to serve traffic of users, the base stations 1420, 1423, 1425, and 1427 collect and schedule state information such as a buffer state, an available transmission power state, and a channel state of the terminals 1410 to support a connection between the terminal 1410 and a core network (CN). The MIME 1430 is an apparatus serving to perform various control functions as well as a mobility management function for the terminal 1410 and is connected to the plurality of base stations 1420, 1423, 1425, and 1427. Further, the S-GW 1440 is an apparatus providing a data bearer. Further, the MME 1430 and the S-GW 1440 may further perform authentication, bearer management, etc., on the terminal 1410 connected to the network and process packets arriving from the base stations 1420, 1423, 1425, and 1427 and packets to be transmitted to the base stations 1420, 1423, 1425, and 1427.

Figure 15:
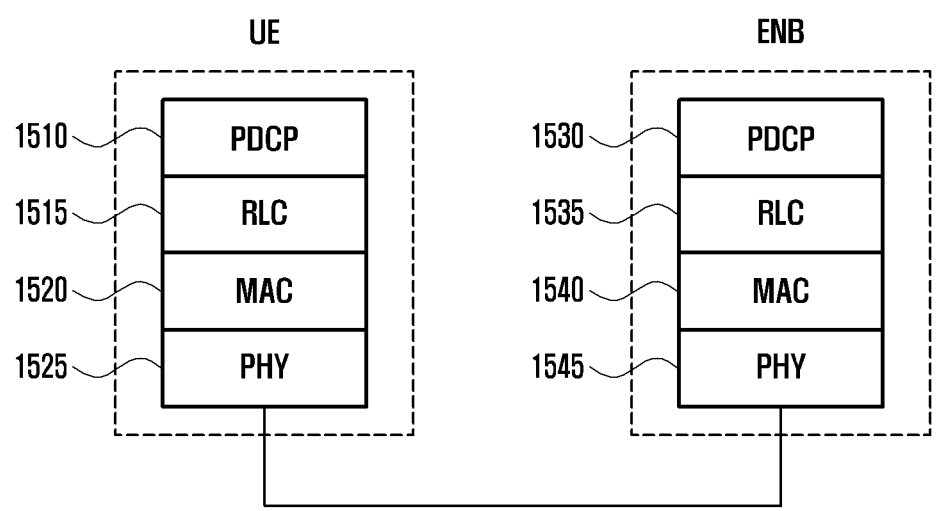
FIG. 15 illustrates a radio protocol structure in the LTE system according to the embodiment of the present disclosure.

FIG. 15 illustrates a radio protocol structure in the LTE system according to the embodiment of the present disclosure.

Referring to FIG. 15, according to a radio protocol of the LTE system, the terminal and the base station (eNB), respectively, includes packet data convergence protocols (PDCPs) 1510 and 1530, radio link controls (RLCs) 1515 and 1535, and medium access controls (MMCs) 1520 and 1540. The packet data convergence protocols (PDCPs) 1510 and 1530 perform operations such as an IP header compression/recovery and the radio link controls 1515 and 1535 reconfigures a PDCP packet data unit (PDU) to an appropriate size. The MACs 1520 and 1540 are connected to several RLC layer apparatuses configured in one terminal and performs an operation of multiplexing RLC PDUs in an MAC PDU and demultiplexing the RLC PDUs from the MAC PDU. Physical layers (PHYs) 1525 and 1545 perform an operation of channel-coding and modulating higher layer data, making the higher layer data into an OFDM symbol, and transmitting the higher layer data to the radio channel or an operation of demodulating the OFDM symbol received through the radio channel, channel-decoding the OFDM symbol, and transmitting the OFDM symbol to a higher layer. In addition, even the physical layers 1525 and 1545 also use a hybrid automatic repeat request (HARQ) for additional error correction and may transmit, in 1 bit, whether a receiving end receives packets transmitted from a transmitting end. This is called HARQ ACK/NACK information. Downlink HARQ ACK/NACK information on an uplink transmission may be transmitted through a physical channel of a physical hybrid-ARQ indicator channel (PHICH) and uplink HARQ ACK/NACK information on a downlink transmission may be transmitted through a physical channel of a physical uplink control channel (PUCCH) or a physical uplink shared channel (PUSCH).

Although not illustrated in the present drawings, a radio resource control (RRC) layer is present at a higher part of the PDCP layers 1510 and 1530 of the terminal and the base station, and the RRC layer may receive and transmit connection and measurement related control messages for a radio resource control.

Figure 16:
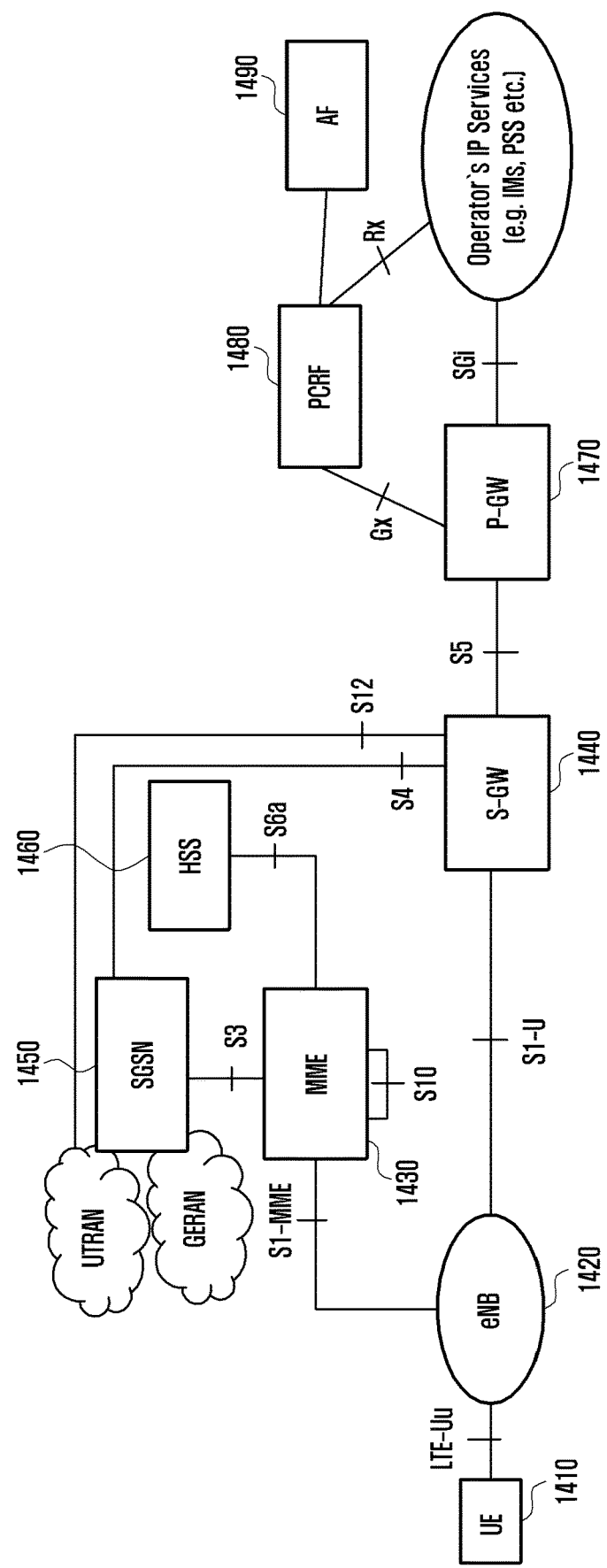
FIG. 16 illustrates a detailed example of a network structure of a wireless communication system according to an embodiment of the present disclosure.

FIG. 16 illustrates a detailed example of a network structure of a wireless communication system according to an embodiment of the present disclosure.

Referring to FIG. 16, a radio access network (RAN) of the LTE mobile communication system may include the base station 1420, the MME 1430, and the S-GW 1440. The user equipment 1410 may access the external network through the base station 1420, the S-GW 1440, and the packet data network (PDN) gateway (P-GW) 1470.

The base station 1420 is an RAN node and corresponds to a radio network controller (RNC) of a universal terrestrial radio access network (UTRAN) system and abase station controller (BSC) of a GSM edge radio access network (GERAN) system. The base station 1420 is connected to the terminal 1410 through a radio channel and serves to manage the radio communication of the terminal 1410 similar to the RNC/BSC, and may use several cells simultaneously. In the LTE, since all user traffic is served through a shared channel, an apparatus for collecting and scheduling the situation information of the terminals 1410 is required, which is handled by the base station 1420.

The MME 1430 is an apparatus for taking charge of various control functions, in which one MME may be connected to a plurality of base stations. The MME 1430 may be connected to a serving GPRS support node (SGSN) 1450 through an S3 interface and may be connected to a home subscriber server (HSS) 1460 through an S6a interface. The S-GW 1440 is an apparatus for providing a data bearer and generates or removes a bearer under the control of the MME 1430. An application function (AF) 1490 is an apparatus that exchanges application related information with a user at an application level. For example, an enhanced proxy call session control function (eP-CSCF) that is an IMS network equipment is a type of AF.

A policy charging and rules function (PCRF) 1480 is an apparatus that controls policies related to quality of service (QoS). The policy is defined by a policy and charging control (PCC) rule, and the PCC rule is transmitted and applied to the P-GW 1470. In order to apply the PCC rules, the P-GW 1470 may include a policy and charging rule enforcement function (PCEF).

In general, a user plane (UP) refers to paths connecting between the terminal 1410 to and from which user data is transmitted and received and the base station 1420 that is an RAN node, between the base station 1420 that is the RAN node and the S-GW 1440, and between the S-GW 1440 and the P-GW 1470. Among the paths, a portion using a radio channel in which a resource restriction is severe is a path between the terminal 1410 and the base station 1420 that is the RAN node. In wireless communication systems such as the LTE, QoS may be applied in units of an evolved packet system (EPS) bearer. One EPS bearer may be used to transmit IP flows having the same QoS requirements. Parameters associated with the QoS may be designated in the EPS bearer. An example of the parameters may include a QoS class identifier (QCI) and allocation and retention priority (ARP). The QCI is a parameter defining QoS priority and the ARP is a parameter used to determine whether to permit or reject a generation of a new EPS bearer.

The EPS bearer corresponds to a packet data protocol context (PDP context) of a general packet radio service (GPRS) system. One EPS bearer may belong to a PDN connection, and the PDN connection may have an access point name (APN) as an attribute. If the PDN connection for an IMS service is generated, the PDN connection may be generated using a well-known IMS APN. If the terminal 1410 accesses a communication network through a web application of a web browser, the PDN connection for the access may be generated through the APN for the Internet service or through the IMS APN.

Figure 17A:
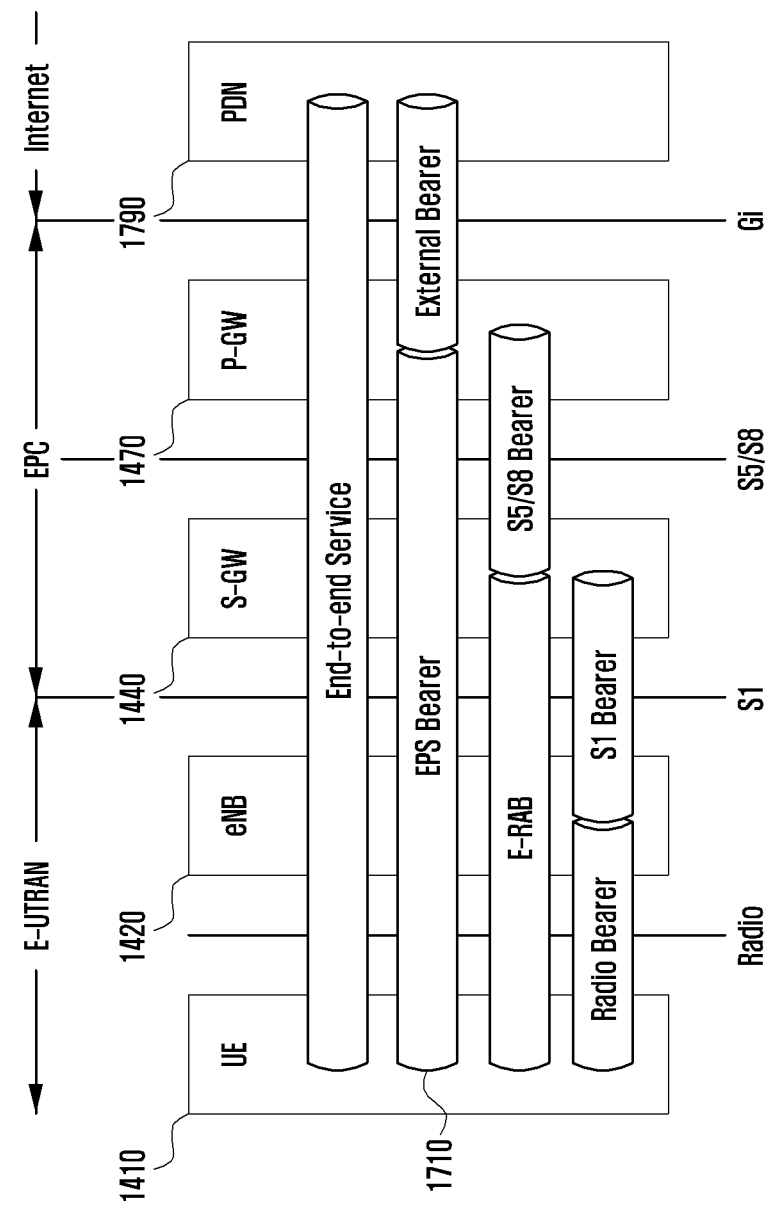
FIGS. 17A and 17B illustrate a method for setting up bearer-based QoS in a wireless communication system according to an embodiment of the present disclosure.
Figure 17B:
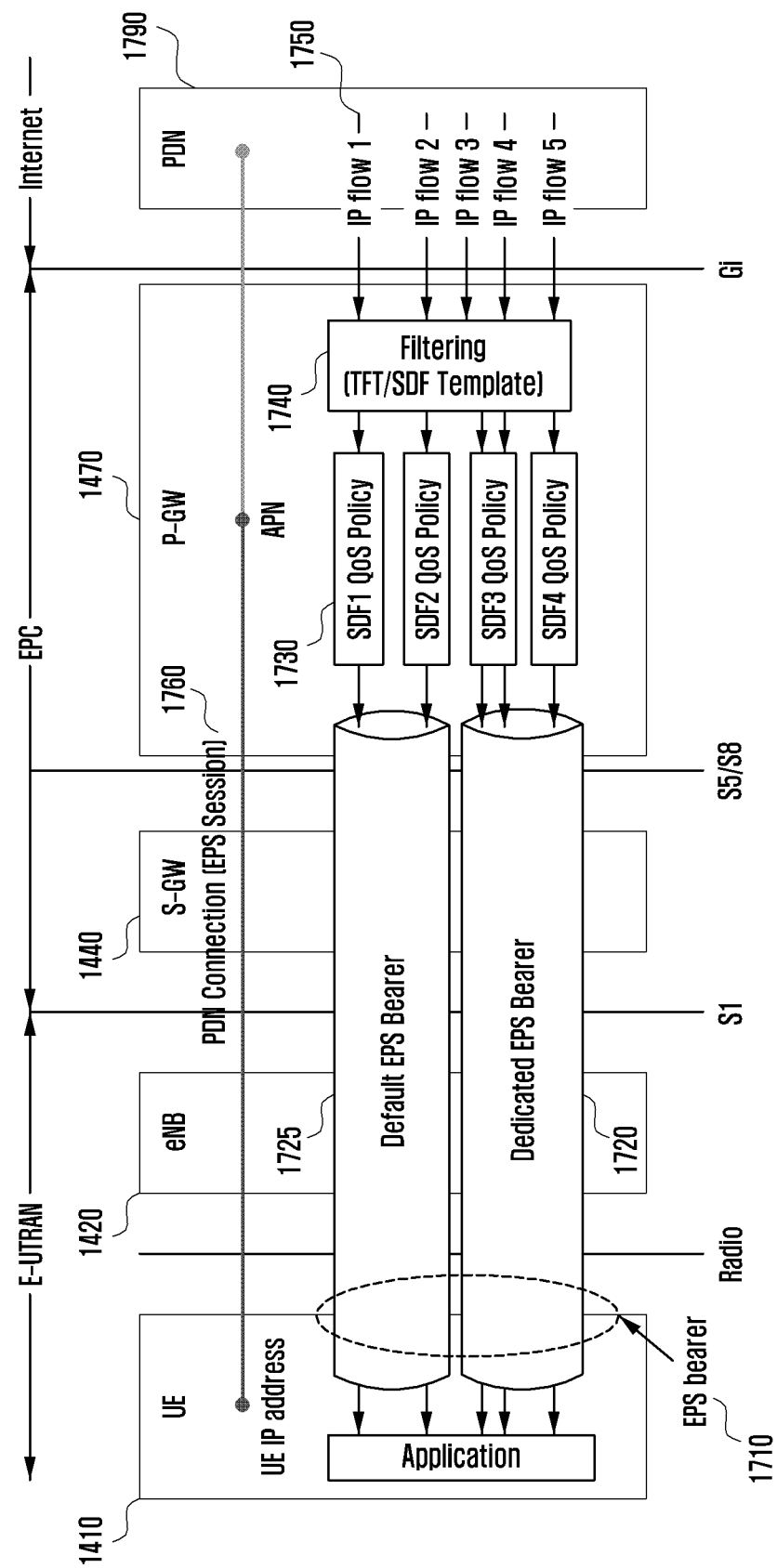

FIGS. 17A and 17B illustrate a method for setting up bearer-based QoS in a wireless communication system according to an embodiment of the present disclosure.

Referring to FIGS. 17A and 17B, an operator providing an LTE service may be able to provide services requiring different qualities of service (QoS) to subscribers having different service levels. For this purpose, the operator may be aware of a service level and a service type of the subscriber and be able to differentially allocate and manage radio resources for user IP traffic (IP flow) 1750. Therefore, the network sets a user traffic transmission path according to the QoS requirements or controls the IP flows 1750 for each service.

In the evolved packet system (EPS), the user traffic transmission path generates another EPS bearer to the EPS bearer 1710 according to the QoS. The IP flows having the same QoS are mapped to a service data flow (SDF) 1730, and the SDF 1730 becomes a unit for applying a QoS rule reflecting an operator policy FIGS. 17A and 17B illustrate specific relationships between the EPS bearer 1710 and the SDF 1730. The SDF 1730 provides QoS corresponding to a service to the IP flow 1750 transmitted from the PDN 1790 and the EPS bearer 1710 provides QoS between the terminal 1410 and the P-GW 1470 in the EPS transmission network. When the SDF 1730 is transmitted to the user terminal 1410 through the EPS, the SDF 1730 is transmitted while being mapped to the EPS bearers 1710, 1720, and 1725 capable of providing appropriate QoS according to the QoS rules installed in the P-GW 1470. The IP flows 1750 have different QoS characteristics depending on what service (or application) is used. The SDF 1730 is an IP flow that filters (classifies) user traffic for each service or a set of the IP flows, and a specific QoS policy is applied according to a subscriber class of the terminal 1410 and an application to be used. In FIGS. 17A and 17B, the IP flows 1750 from the PDN 1790 to the user terminal 1410 are filtered to the SDF 1730 through an SDF template (classifier) 1740 of the P-GW 1470 according to service characteristics and QoS policies (e.g., bandwidth control) are applied to each SDF to be transmitted to a user. For example, the first IP flow may be classified into a first SDF and thus the first QoS policy may be applied, and the second IP flow may be classified into a second SDF and thus the second QoS policy may be applied. The third IP flow and the fourth IP flow are classified into a third SDF and thus the third QoS policy may be applied, and a fifth IP flow is classified into a fourth SDF and thus the fourth QoS policy may be applied. Since the QoS in the EPS transmission network is provided by the EPS bearers 1710, 1720 and 1725, each SDF 1730 is mapped and transmitted to the EPS bearers 1710, 1720 and 1725 capable of satisfying each SDF's own QoS requirements.

A type of EPS bearer 1710 includes a default bearer 1725 and a dedicated bearer 1720. If the terminal 1410 accesses the LTE network, the terminal 1410 is allocated an IP address and generates a default data bearer 1725 while generating a packet data network (PDN) connection (EPS session) 1760. If the user terminal 1410 uses a service (for example, video on demand (VOD)) that may not properly receive QoS from the default bearer 1725 during a use of a service (for example, internet) through the default bearer 1725, the dedicated bearer 1720 may be generated on-demand (according to a request). That is, the dedicated bearer 1720 is set to be QoS different from an already established bearer (e.g., default bearer 1725 and other dedicated bearers).

The terminal 1410 may access several access point names (APNs) (P-GW) 1470 and may establish one default EPS bearer 1725 and multiple dedicated EPS bearers 1720 per APN. The default bearer 1725 is generated when the terminal 1410 initially accesses the network and is continuously maintained even when the terminal 1410 does not use the service on the way, and then disappears when the terminal 1410 leaves the network. The default bearer 1725 is generated for each APN and whether to generate the default bearer 1725 by what QoS is applied to which APN is provisioned to the HSS 1460 as user subscription information when the terminal 1410 initially accesses the network. If the terminal 1410 initially accesses the network, the MME 1430 may download the user subscription information (e.g., default APN, EPS subscribed QoS profile) from the HSS 1460 and may use a subscriber QoS profile to generate the default bearer 1725 to the corresponding PDN 1790.

In FIGS. 17A and 17B, the downlink IP flows 1750 are transmitted through the EPS bearer 1710, 1720, and 1725 and the SDF 1730 when the downlink IP flows are transmitted to the user terminal 1410 via the EPS. The user IP flows 1750 arriving at the P-GW 1470 via the PDN 1790 are filtered into the SDF 1730 via the SDF template 1740. For example, the first IP flow (IP flow 1) is classified into the first SDF (SDF 1), the second IP flow (IP flow 2) is classified into the second SDF (SDF 2), the third IP flow (IP flow 3) and the fourth IP flow (IP flow 4) is classified into the third SDF (SDF 3), and the fifth IP flow (IP flow 5) is classified into the fourth SDF (SDF 4), such that a QoS rule may be applied to each SDF and then mapped to the EPS bearers 1710, 1720, and 1725 according to a traffic flow template (TFT) filtering rule (1730). For example, the SDF 1 and the SDF 2 are mapped to the default bearer 1725, and the SDF 3 and the SDF 4 are mapped to the dedicated bearer 1720 and transmitted to the terminal 1410 through the corresponding EPS bearers 1720 and 1725. The IP flows arriving at the terminal 1410 are transmitted to the corresponding application.

In the LTE network, QoS parameters are defined based on the bearers 1710, 1720, and 1725. The EPS bearer QoS parameter is a bearer level QoS parameter. The bearer level is otherwise referred to as an SDF aggregate level. The SDF aggregate refers to a collection of SDFs having the same QoS class identifier (QCI) and allocation and retention priority (ARP) values belonging to the same EPS session.

The QCI and the ARP are basic QoS parameters that are applied to all EPS bearers. The QCI is a standardized different QoS characteristics to be represented by integer values (e.g., 1 to 9). The standardized QoS characteristics are represented by a resource type, a priority, a packet delay budget, and a packet error loss rate.

The EPS bearers 1710, 1720, and 1725 are divided into a guaranteed bitrate (GBR) type bearer and a non-GBR type bearer according to the QCI resource type. The default bearer 1725 is always the non-GBR type bearer and the dedicated bearer 1720 may be set to be the GBR type bearer and the non-GBR type bearer. The GBR type bearer has the QCI, the ARP, the GBR (UL/DL), and a maximum bitrate (MBR) (UL/DL) as the GBR type bearer's QoS parameters and the non-GBR type bearer has the QCI, the ARP, an aggregated maximum bitrate (APN-AMBR) (UL/DL), and UE-AMBR (UL/DL). In addition to the QCI and the ARP, the GBR type bearer has the GBR and the MBR as the QoS parameters, which means that a fixed resource is allocated (bandwidth guarantee) to each bearer. On the other hand, the non-GBR type bearer has the aggregated maximum bitrate (AMBR) as the QoS parameter, which means that a resource is not allocated to each bearer but the maximum bandwidth that may be used with other non-GBR type bearers is allocated. The APN-AMBR is the maximum bandwidth that the non-GBR type bearers may share within the same PDN, and the UE-AMBR is the maximum bandwidth that may share within the same terminal. If the terminal 1410 has multiple PDN connections, the sum of the APN-AMBRs of each PDN may not exceed the UE-AMBR.

As illustrated in FIGS. 17A and 17B, if the method for setting up bearer-based QoS is applied in a wireless communication system, groups of a plurality of IP flows 1750 are treated with the same QoS in the network. Therefore, more precise QoS control is not possible in the EPC stages 1440 and 1470 and the E-UTRAN stages 1410 and 1420.

Therefore, according to the present disclosure, the method for setting up flow-based QoS other than the method for setting up bearer-based QoS as illustrated in FIGS. 17A and 17B will be described. In the present disclosure, the flow may refer to IP flow 1750 and the service data flow (SDF) 1730. The SDF may be represented by the group of IP flows.

Figure 18:
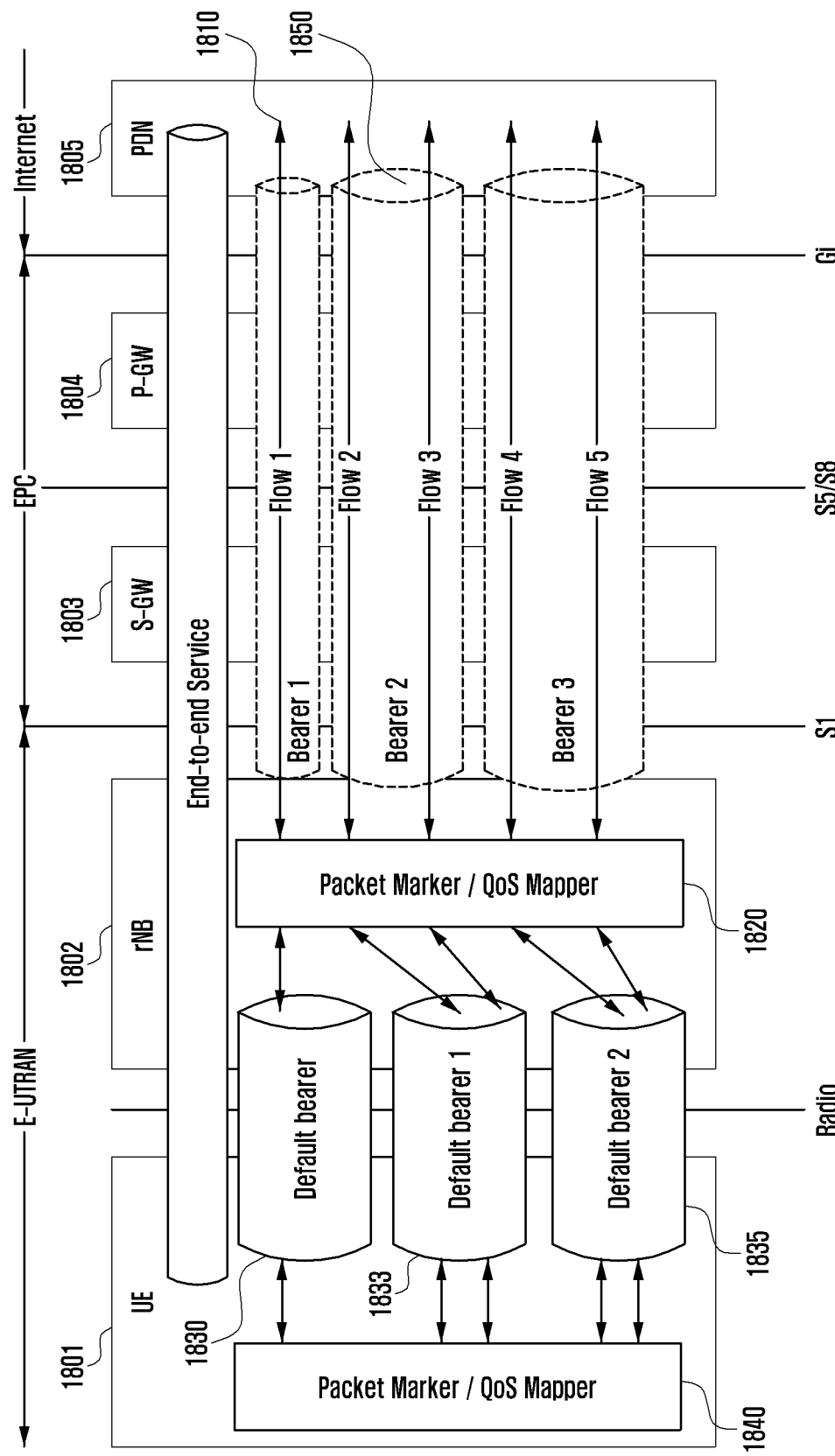
FIG. 18 illustrates a method for setting up flow-based QoS in a next generation wireless communication system according to an embodiment of the present disclosure.

FIG. 18 illustrates a method for setting up flow-based QoS in a next generation wireless communication system according to an embodiment of the present disclosure.

As described above, the flow may refer to the IP flow and may refer to the SDF. The SDF may be represented by the group of IP flows.

Referring to FIG. 18, in the E-UTRAN, a concept of bearers 1830, 1833 and 1835 exists as illustrated in FIGS. 17A and 17B, but in next generation core networks (NGCNs) 1803 and 1804, a concept of a bearer 1850 may exist or may not exist. The NGCNs 1803 and 1804 may be an evolved CN or a new CNs of the EPCs 1440 and 1470 of the LTE system. The NGCN may include a P-GW 1804 and an S-GW 1803. Alternatively, the NGCN may include a user plane function (UPF), a session management function (SMF) (control plane function (CPF)), and the like.

If downlink data are generated in the PDN 1805, IP flows 1810 are transmitted to a base station (rNB or gNB) 1802 through the PDN 1805, the P-GW (0804), and the S-GW 1803. At this time, the base station (rNB or gNB) 1802 may be an evolved base station or a new base station of the LTE base station for the next generation wireless communication system.

Meanwhile, packets of the flows 1810 may suffer from packet marking indicating QoS information. Alternatively, each flow may be mapped to specific QoS information. The QoS refers to ability or a measure to ensure a certain level of performance in data transmission by allocating a priority to applications, users, or data flows. The QoS may represent a lowest transmission bitrate, a delay, a packet loss rate, and the like.

The base station 1802 receiving the flows 1810 may interpret the packet markings in the packets of the flows 1810 to know the QoS information. Alternatively, the QoS information of each of the flows 1810 may also be known based on the mapping information on the predefined flows 1810 and QoS information. The base station 1802 may allocate the flows 1810 to the base station's corresponding bearer through a layer or an apparatus called a packet marker/QoS mapper (PMQM) 1820 according to the QoS information. If there is no bearer corresponding to the QoS of the flow 1810, the base station 1802 may newly establish the bearer corresponding to the QoS with the terminal 1801.

For example, the first downlink data flow may be mapped to the first QoS to be allocated to the default bearer 1830, and the second downlink data flow and the third downlink data flow may be mapped to the second QoS to be allocated to a first dedicated bearer 1833. Alternatively, according to the embodiment, the first dedicated bearer 1833 may correspond to the second QoS and the third QoS, such that the second downlink data flow and the third downlink data flow may each be mapped to the second QoS and the third QoS to be allocated to the first dedicated bearer 1833 corresponding to each thereof. A fourth downlink data flow and a fifth downlink data flow may be mapped to the fourth QoS to be allocated to the second dedicated bearer 1835. Alternatively, according to the embodiment, the second dedicated bearer 1835 may correspond to a fourth QoS and a fifth QoS, such that the fourth downlink data flow and the fifth downlink data flow may each be mapped to the fourth QoS and the fifth QoS to be allocated to the second dedicated bearer 1835 corresponding to each thereof.

In FIG. 18, if uplink data is generated, the terminal 1801 may confirm whether a downlink flow corresponding to the uplink data has been previously received. The confirming process may be performed using header information of an IP packet such as a source IP address and a destination IP address. If there is a flow corresponding to the uplink data among the downlink flows previously received, the terminal 1801 may map the uplink data to the corresponding flow and transmit the uplink data to the base station 1802 through the corresponding bearer. If there is no flow corresponding to the uplink data among the previously received downlink flows, the terminal 1801 may mark QoS information to the uplink data packet through a layer or an apparatus called a packet marker/QoS mapper (PMQM) 1840. The QoS refers to ability or a measure to ensure a certain level of performance in data transmission by allocating a priority to applications, users, or data flows. The QoS may represent a lowest transmission bitrate, a delay, a packet loss rate, and the like. The PMQM layer or the apparatus 1840 of the terminal 1801 may confirm whether there is an appropriate bearer for the marked QoS information among the bearers 1830, 1833, and 1835 currently established based on the marked QoS information. If there is an appropriate bearer, the terminal 1801 may map the uplink flow through the bearer and transmit the uplink flow to the base station 1802. If there is no appropriate bearer, the PMQM layer or apparatus 1840 of the terminal 1801 may transmit the uplink flow while mapping the uplink flow to the default bearer 1830. The PMQM layer or apparatus 1820 of the base station 1802 receiving the uplink flow to the default bearer 1830 may confirm the packet marking of the uplink flow to find out the QoS information. If the PMQM layer or apparatus 1820 of the base station 1802 determines that the QoS of the uplink flow is not appropriate for the QoS of the default bearer 1830, the PMQM layer or apparatus 1820 of the base station 1802 may establish a new bearer appropriate for the QoS of the uplink flow with the terminal 1801. If the new bearer is established, the terminal 1801 may transmit the uplink flow generated later to the base station 1802 through a newly established bearer instead of the default bearer 1830.

Figure 19:
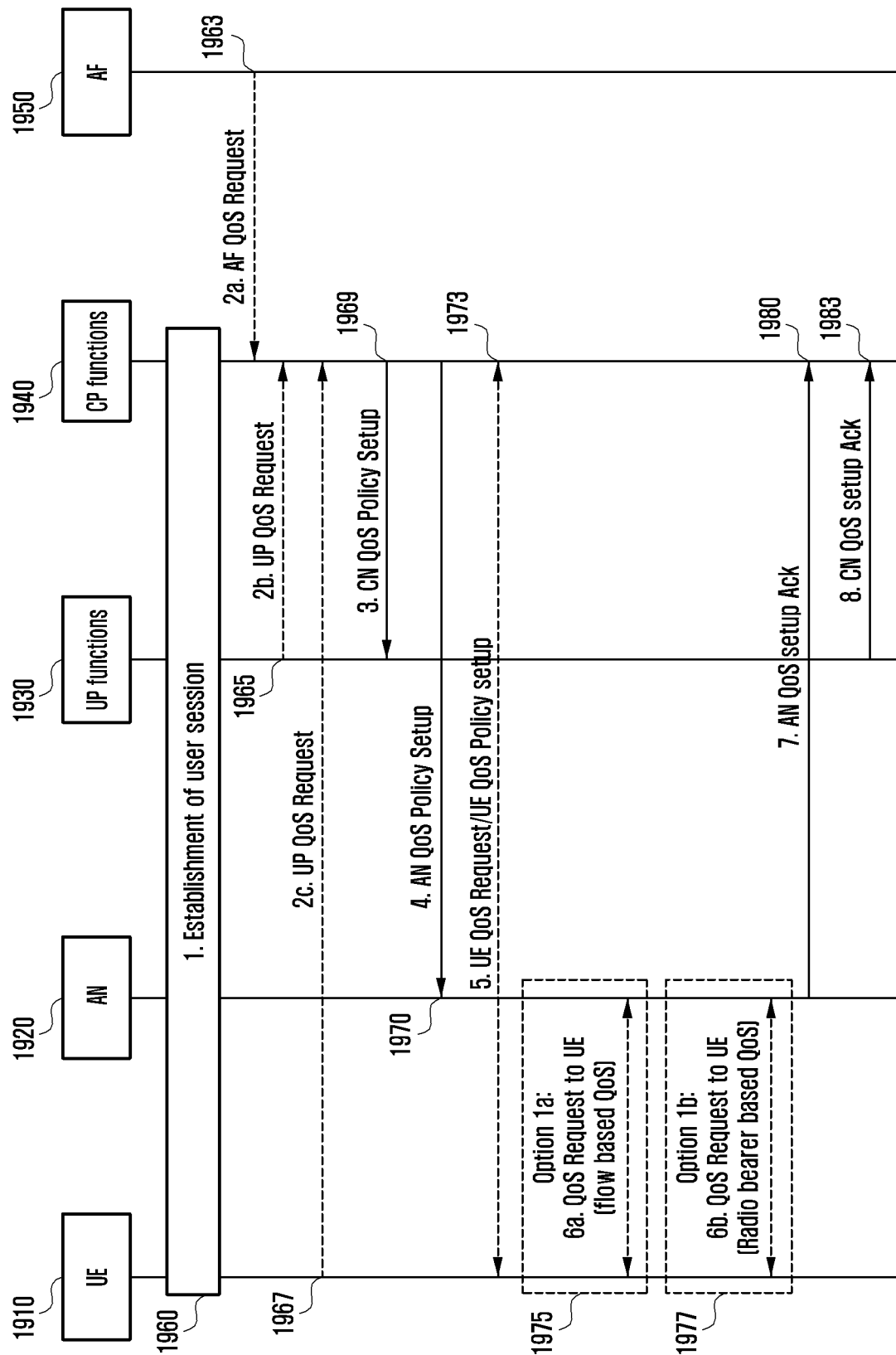
FIG. 19 illustrates a signaling procedure for allocating a QoS policy including QoS mapping information to each flow or information on packet marking to a base station and a terminal in the method for setting up flow-based QoS according to the embodiment of the present disclosure.

FIG. 19 illustrates a signaling procedure for allocating a QoS policy including QoS mapping information to each flow or information on packet marking to a base station and a terminal in the method for setting up flow-based QoS according to the embodiment of the present disclosure.

At this time, the flow may refer to the IP flow and may refer to the SDF. The SDF may be represented by the group of IP flows.

Referring to FIG. 19, in step 1960, a terminal 1910 may establish a user session to establish a connection with a network. The user session may include information related to user session establishment regardless of QoS of each traffic flow. Multiple flows multiplexed in a user session may differentiate QoS by marking packets related to QoS in each packet.

In step 1960, the terminal 1910 may receive a predetermined flow priority indicator (FPI). The flow priority indicator may be used to initialize the uplink packet without the terminal 1910 transmitting/receiving control signaling with the network. That is, the terminal 1910 may perform the packet marking on the uplink packet generated from the terminal 1910 using the flow priority indicator.

In steps 1963, 1965, and 1967, control plane (CP) functions 1940 may receive a QoS request from at least one of an application function (AF) 1950, a user plane (UP) function 1930, or the terminal 1910, respectively (AF QoS request, UP QoS request). The AF 1950 may provide a flow of packets requiring specific QoS. Upon receiving a new flow having the specific QoS, the UP 1930 may transmit the QoS request to the CP 1940 in order to process the new flow.

Upon receiving the QoS request message in steps 1963, 1965, and 1967, the CP 1940 may determine an authorized QoS policy according to the operator's requirements. The QoS policy may be a list of parameters to be applied for the core networks (CNs) 1930 and 1940, the access network (AN) 1920, and the terminal 1910 to process flows according to the QoS. The parameters may include at least one of a DL flow descriptor, a flow priority indicator, a downlink max flow bitrate, a downlink session bitrate, and a reflective QoS indicator. The downlink flow descriptor may be used to distinguish flows and to confirm whether to perform the packet marking with a flow priority indicator received in a QoS policy. The UP 1930 may adjust the flow and the maximum bitrate of the user session based on the downlink flow maximum bitrate and the downlink session bitrate. The flow priority indicator refers to the parameters set in nodes of the access network (AN) 1920 and indicates how to handle the packet. The reflective QoS indicator indicates whether or not the terminal 1910 applies the reflective QoS to the uplink flows corresponding to the downlink flow. The flow priority indicator and the reflective QoS indicator may be used to mark downlink user data packets.

In step 1969, the CP 1930 may allocate the authorized QoS policy as described above to the UP 1930 (CN QoS policy setup).

In step 1970, the CP 1930 may transmit a message including the QoS policy authorized by the AN 1920 (AN QoS policy setup). The QoS policy may be a list of parameters to be applied for the AN 1920 and the terminal 1910 to process the flows according to the QoS. The parameters may include at least one of the UL flow descriptor, the flow priority indicator, the flow priority level, the UL max flow bitrate, the UL and DL guarantee flow bitrate, the UL session bitrate, and the like. The UL flow descriptor may be used to distinguish flows and to confirm whether to perform the packet marking with the flow priority indicator received in the QoS policy. The AN 1920 may adjust the flow and the maximum bitrate of the user session based on the DL flow max bitrate and the DL session bitrate.

In step 1973, the terminal 1910 may receive the authorized QoS policy from the CP 1930 as non-access stratum (NAS) information (UE QoS request/UE QoS policy setup). Alternatively, in steps 1975 and/or 1977, the terminal 1910 may receive a QoS policy (QoS request to UE) authorized as access stratum (AS) information from the AN 1920. The QoS policy may be a list of parameters to be applied for the terminal 1910 to process the flows according to the QoS. The parameters may include at least one of the UL flow descriptor, the flow priority indicator, the UL guarantee flow bitrate, and the like. In steps 1975 and 1977, the access network (AN) 1920 may allocate the QoS policy of the terminal 1910 to the terminal 1910. At this time, in step 1975, a flow-based QoS policy may be allocated to the terminal 1910 according to the network interface. Alternatively, in step 1977, a bearer based QoS policy may also be allocated to the terminal 1910. If the AN 1920 processes QoS by considering both the flow and the bearer, both the flow-based QoS policy and the bearer-based QoS policy may be allocated to the terminal 1910 (1975 and 1977). If the AN 1920 processes the QoS by considering only the flow, only the flow-based QoS policy may be allocated to the terminal 1910 (1975). If the AN 1920 processes the QoS by considering only the bearer, only the bearer-based QoS policy may be allocated to the terminal 1910 (1977). If the AN 1920 and the CN 1930 normally receive the authorized QoS policy and complete the setup, in steps 1980 and 1983, the AN 1920 and the UP 1930 may transmit responses (AN QoS session Ack and the CN QoS session ACK) thereto to the CP 1940.

Figure 20:
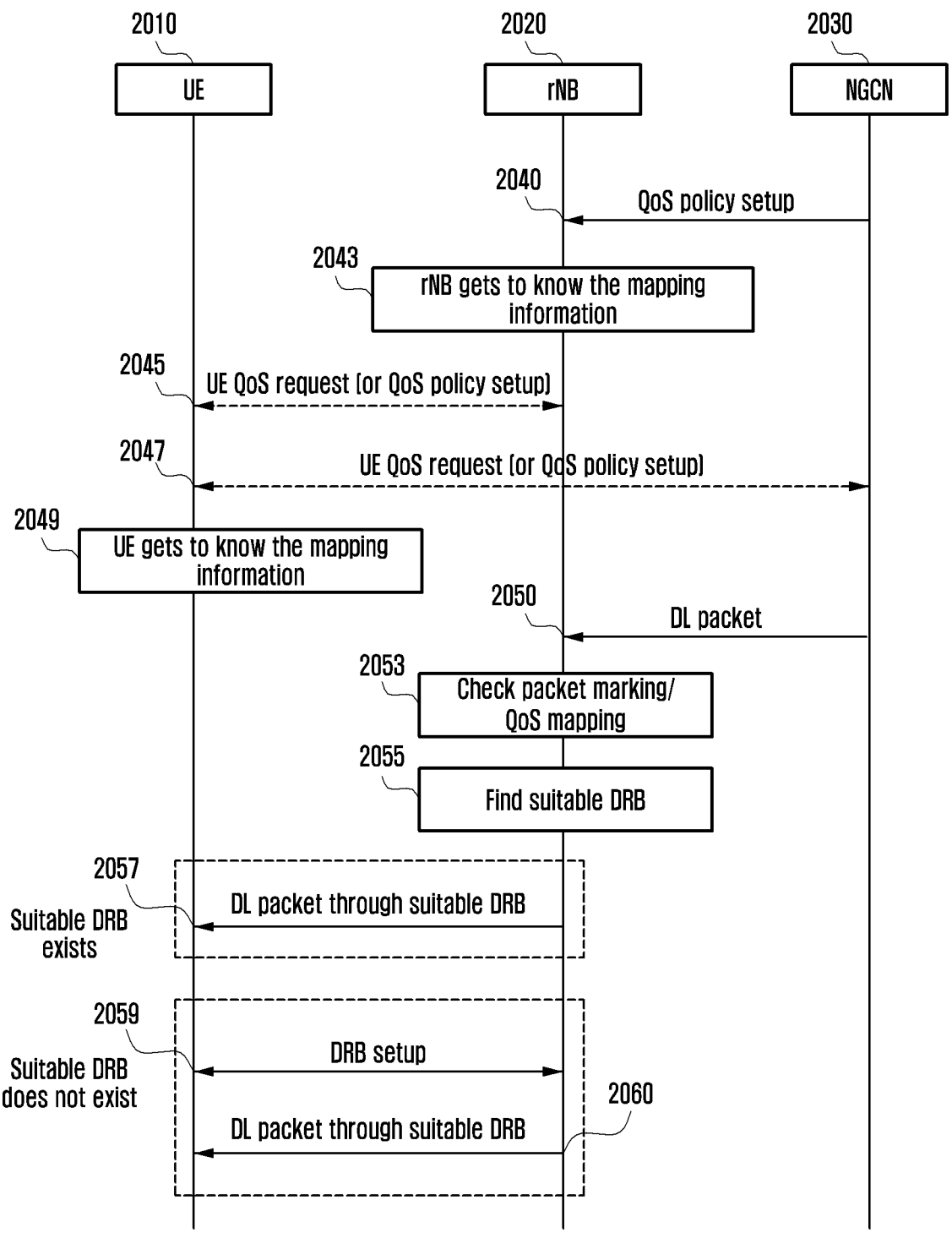
FIG. 20 illustrates a procedure of setting up a bearer and transmitting downlink data in the method for setting up flow-based QoS according to an embodiment of the present disclosure.

FIG. 20 illustrates a procedure of configuring a bearer and transmitting downlink data in the method for setting up flow-based QoS according to an embodiment of the present disclosure.

At this time, the flow may refer to the IP flow and may refer to the SDF. The SDF may be represented by the group of IP flows.

Referring to FIG. 20, a base station (rNB, gNB) 2020 and a terminal 2010 may receive the QoS policy setup that is authorized according to the procedure of FIG. 19. The base station (rNB or gNB) 2020 may be an evolved base station or a new base station of the LTE base station for the next generation wireless communication system.

In step 2040, the base station 2020 may receive the QoS policy setup that is authorized from a next generation core network (NGCN) 2030. The NGCN 2030 may be an evolved CN or a new CN of the EPC of the LTE system. The NGCN may include a P-GW and an S-GW. Alternatively, the NGCN may include a user plane function (UPF), a session management function (SMF) (control plane function (CPF)), and the like. The QoS policy may include the mapping information on each flow and QoS corresponding thereto, and may include the information related to the packet marking for indicating QoS of the flow. In step 2043, the base station

2020 receiving the QoS policy in the step 2040 may confirm the flow and QoS mapping information, the packet marking information or the like.

The terminal 2010 may request the QoS policy authorized in step 2045 to the base station 2020 at an AS level to receive the authorized QoS policy setup from the base station 2020. Alternatively, in step 2047, the terminal 2010 may request the authorized QoS policy to the NGCN 2030 at the NAS level, and thus receive the authorized QoS policy setup from the NGCN 2030. The QoS policy may include the mapping information on each flow and QoS corresponding thereto, and may include the information related to the packet marking for indicating QoS of the flow. Further, the QoS policy may include the QoS information for each bearer. The terminal 2010 that has received the QoS policy in step 2045 or 2047 may confirm flow and QoS mapping information, packet marking information, QoS information for each bearer, and the like in step 2049.

As described above, if the initial QoS setup procedure is completed, in step 2050, the NGCN 2030 may transmit the downlink packet to the base station.

The base station 2020 may confirm the flow and QoS mapping information on the packet in step 2053 or confirm the marking of the packet based on the QoS policy established in the step 2040 to confirm the QoS. In step 2055, the base station 2010 may confirm whether there is a bearer satisfying the QoS of the downlink flow among the bearers (e.g., data radio bearer (DRB)) currently established between the base station 2020 and the terminal 2010.

If there is a bearer satisfying the QoS of the downlink flow among the current bearers, in step 2057, the base station 2020 may transmit the downlink packet to the terminal 2010 through the bearer. Meanwhile, the bearer established between the terminal 2010 and the base station 2020 may be established at the time of the RRC connection setup/reconfiguration between the terminal 2010 and the base station 2020 and several bearers may also be established. According to an embodiment, upon the establishment of the bearer, the base station 2020 may include an indicator indicating which bearer is the default bearer to indicate the default bearer to the terminal 2010.

If there is no bearer satisfying the QoS of the downlink flow among the current bearers, in step 2059, the base station 2020 may set a new bearer capable of satisfying the QoS of the downlink flow with the terminal 2010. In step 2060, the base station 2020 may transmit the downlink packet to the MS 2010 through a newly established bearer in step 2059.

Figure 21:
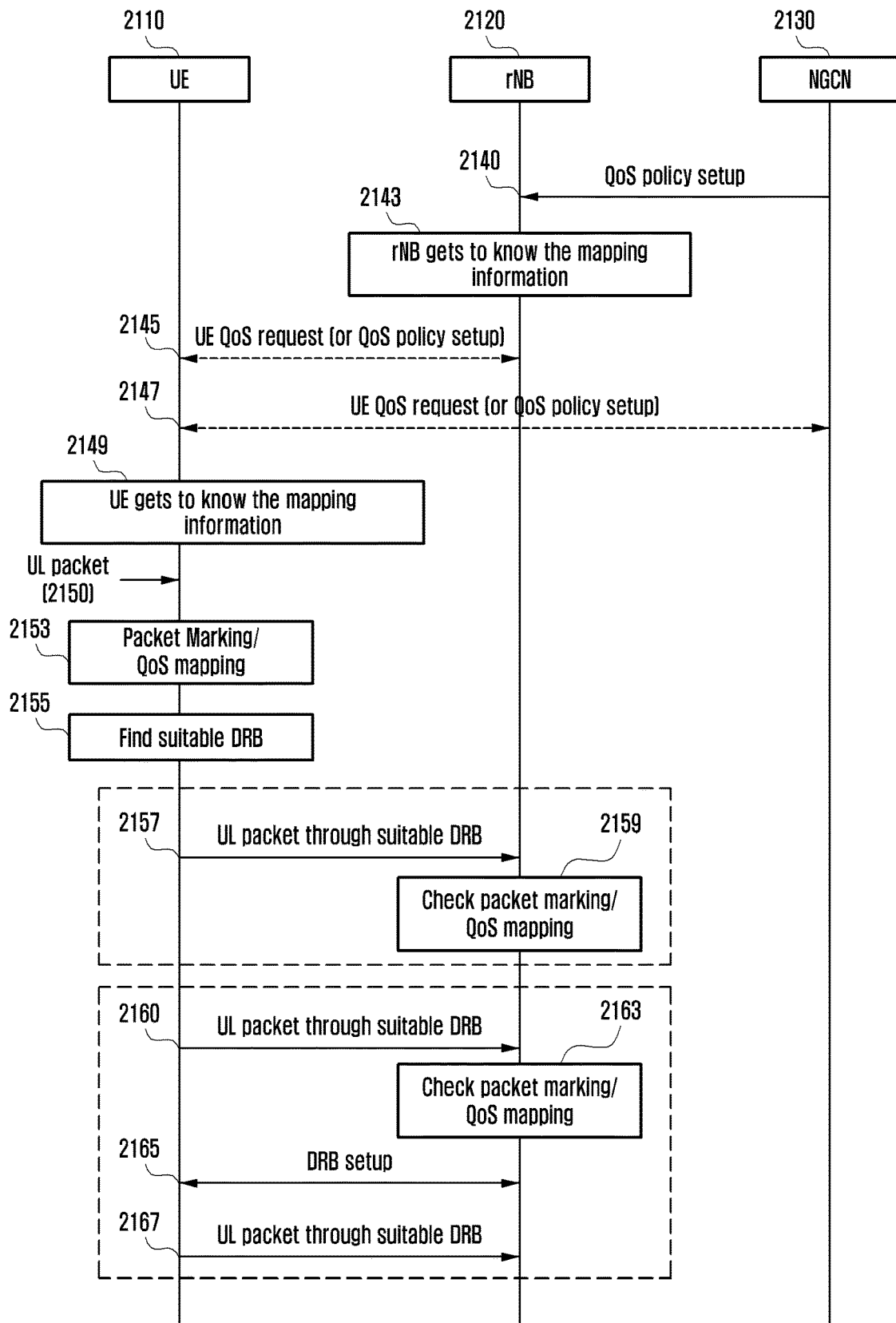
FIG. 21 illustrates a procedure for a terminal to establish a bearer and transmit uplink data in the method for setting up flow-based QoS according to the embodiment of the present disclosure.

FIG. 21 illustrates a procedure for a terminal to establish a bearer and transmit downlink data in the method for setting up flow-based QoS according to the embodiment of the present disclosure.

At this time, the flow may refer to the IP flow and may refer to the SDF. The SDF may be represented by the group of IP flows.

Referring to FIG. 21, a base station (rNB, gNB) 2120 and a terminal 2110 may receive the QoS policy setup that is authorized according to the procedure of FIG. 19. The base station (rNB or gNB) 2120 may be an evolved base station or a new base station of the LTE base station for the next generation wireless communication system.

In step 2140, the base station 2120 may receive the QoS policy setup that is authorized from the NGCN 2130. The NGCN 2130 may be an evolved CN or a new CN of the EPC of the LTE system. The NGCN may include a P-GW and an S-GW. Alternatively, the NGCN may include a user plane function (UPF), a session management function (SMF) (control plane function (CPF)), and the like. The QoS policy may include the mapping information on each flow and QoS corresponding thereto, and may include the information related to the packet marking for indicating QoS of the flow. In step 2043, the base station 2120 receiving the QoS policy in the step 2140 may confirm the flow and QoS mapping information, the packet marking information or the like.

The terminal 2110 may request the QoS policy authorized in step 2145 to the base station 2120 at an AS level to receive the authorized QoS policy setup from the base station 2120. Alternatively, in step 2147, the terminal 2110 may request the authorized QoS policy to the NGCN 2110 at the NAS level, and thus receive the authorized QoS policy setup from the NGCN 2130. The QoS policy may include the mapping information on each flow and QoS corresponding thereto, and may include the information related to the packet marking for indicating QoS of the flow. Further, the QoS policy may include the QoS information for each bearer. The terminal 2110 that has received the QoS policy in step 2145 or 2147 may confirm flow and QoS mapping information, packet marking information, QoS information for each bearer, and the like in step 2149.

In step 2150, if the uplink packet is generated from the terminal 2110, the terminal 2110 may confirm and use the flow and QoS mapping information on the packet in step 2153 on the basis of the QoS policy that is setup in step 2145 or step 2147 or may indicate the QoS of the uplink flow or packet to the base station 2120 by marking the QoS corresponding to the packet to the packet. In step 2155, the terminal 2110 may confirm whether there is a bearer satisfying the QoS of the uplink flow among the bearers (e.g., data radio bearer (DRB)) currently established between the base station 2120 and the terminal 2110.

If there is a bearer satisfying the QoS of the uplink flow among the current bearers, in step 2157, the terminal 2110 may transmit the uplink packet to the terminal 2010 through the bearer. If there is a bearer satisfying the QoS of the uplink flow, the QoS of the uplink flow may be represented by the QoS of the bearer and mapped. In this case, the packet marking in step 2153 may be skipped. Alternatively, if the downlink flow corresponding to the flow of the uplink packet has been received prior to step 2153, the terminal 2110 may skip the packet marking in step 2153. However, if it is determined to be necessary, the terminal 2110 may perform the packet marking in step 2153.

In step 2157, the base station 2120 receiving the uplink packet may confirm the QoS mapping information or packet marking of the flow in step 2159. However, for some reason (e.g., not the default bearer), the base station 2120 may skip the QoS mapping information or packet marking checking of the flow. Meanwhile, the bearer established between the terminal 2110 and the base station 2120 may be established at the time of the RRC connection setup/reconfiguration between the terminal 2110 and the base station 2120 and several bearers may also be established. According to an embodiment, upon the establishment of the bearer, the base station 2120 may include an indicator indicating which bearer is the default bearer to indicate the default bearer to the terminal 2110.

If there is no bearer satisfying the QoS of the uplink flow among the current bearers, the terminal 2110 may use the packet marking indicating the QoS corresponding to the packet of the uplink flow or indicate the QoS mapping information on the uplink flow to the base station 2120 in step 2153 and transmit the uplink packet to the base station 2120 through the default bearer previously established at the time of the RRC connection setup/reconfiguration in step 2160.

In step 2163, the base station 2120 checks the QoS mapping information or the packet marking of the flow of the uplink packet received through the default-bearer and then may transmit the uplink packet to the NGCN 2130 if the base station 2120 determines that the QoS of the uplink packet matches the default bearer.

However, if it is determined in step 2163 that the base station 2120 checks the QoS mapping information or the packet marking of the flow of the uplink packet and then the default bearer does not match the QoS of the uplink packet, the base station 2120 may establish a new bearer appropriate for the QoS of the uplink packet in step 2165. In step 2167, the terminal 2110 may transmit packets corresponding to the uplink flow to the base station 2120 through the newly established bearer.

Figure 22:
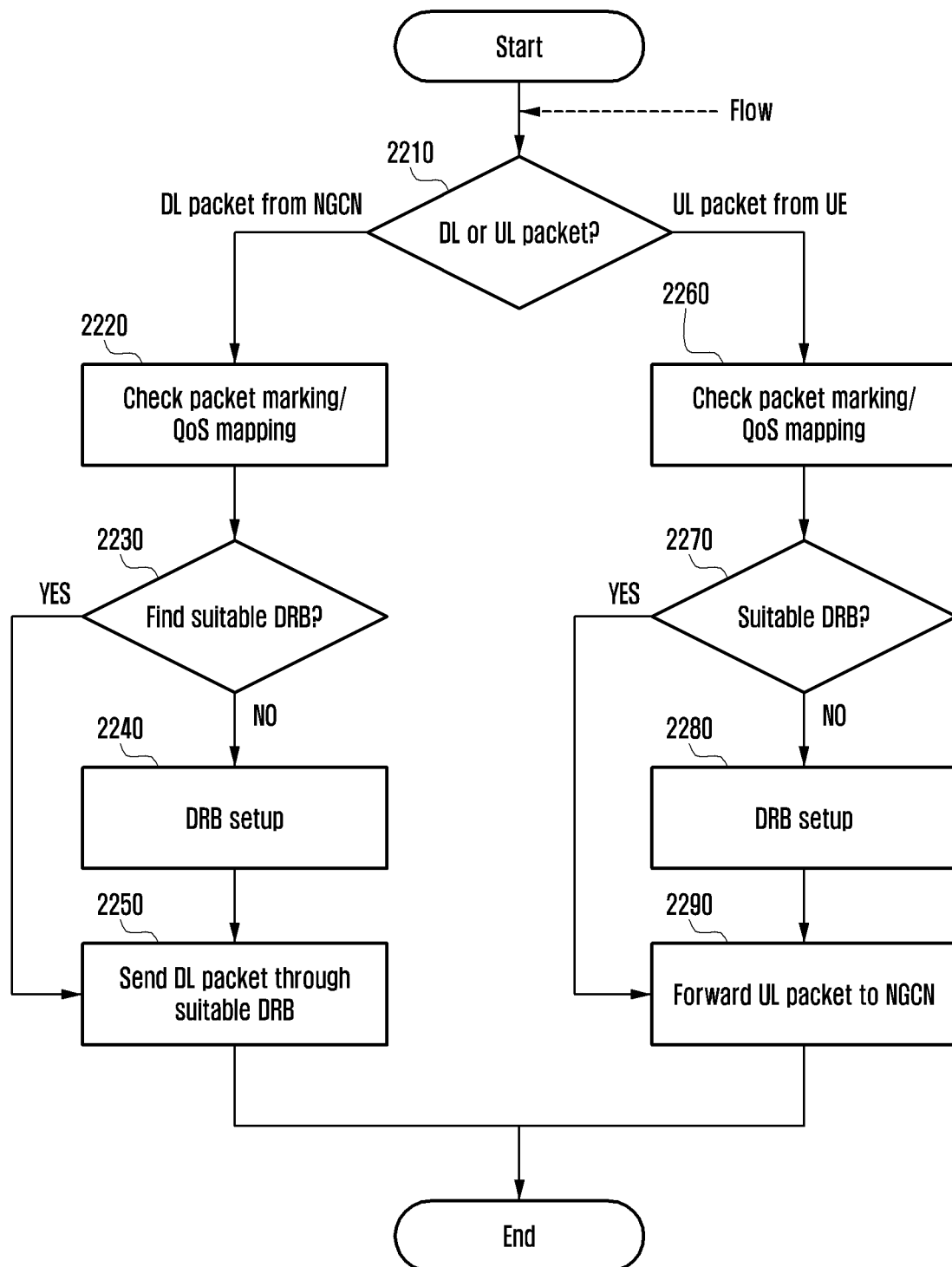
FIG. 22 illustrates an example of an operation of a base station in the method for setting up flow-based QoS according to the embodiment of the present disclosure.

FIG. 22 illustrates an example of an operation of a base station in the method for setting up flow-based QoS according to the embodiment of the present disclosure.

At this time, the flow may refer to the IP flow and may refer to the SDF. The SDF may be represented by the group of IP flows.

Referring to FIG. 22, the base station may receive the authorized QoS policy setup according to the procedure in FIG. 19. The base station may be an evolved base station or a new base station of the LTE base station for the next generation wireless communication system. The base station may receive the QoS policies setup that is authorized from the NGCN. The NGCN may be an evolved CN or a new CN of the EPC of the LTE system. The QoS policy may include mapping information on each flow and QoS corresponding thereto, and may include the information related to the packet marking for indicating QoS of the flow.

If the base station receives the packet of the flow, in step 2210, the base station may process the uplink packet and the downlink packet separately. That is, the base station 2210 may confirm whether the packet of the flow is the downlink packet or the uplink packet If the base station receives the downlink packet from the NGCN, in step 2220, the base station confirms the marking information or the QoS mapping information on the downlink packet based on the setup QoS policy to confirm the QoS of the flow of the downlink packet. In step 2230, the base station may confirm whether there is a bearer satisfying the QoS of the downlink flow among the bearers (e.g., data radio bearer (DRB)) currently established between the base station and the terminal.

If there is a bearer satisfying the QoS of the downlink flow among the current bearers, in step 2250, the base station may transmit the downlink packet to the terminal through the bearer. The bearer established between the terminal and the base station may be established at the time of the RRC connection setup/reconfiguration between the terminal and the base station, and several bearers may be established. According to the embodiment, upon the establishment of the bearer, the base station may include an indicator indicating which bearer is the default bearer to indicate the default bearer to the terminal.

If there is no bearer satisfying the QoS of the downlink flow among the current bearers, in step 2240, the base station may establish a new bearer capable of satisfying the QoS of the downlink flow with the terminal. In step 2250, the base station may transmit the downlink packet to the terminal through the newly established bearer.

Meanwhile, if the base station receives the uplink packet from the terminal, in step 2220, the base station confirms the marking information of the packet or the confirms the flow and QoS mapping information based on the setup QoS policy to confirm the QoS of the flow of the uplink packet. In step 2270, it is confirmed whether the QoS of the uplink flow matches the QoS of the bearer corresponding to the uplink flow. According to the embodiment, the procedure of confirming whether the QoS of the uplink flow in step 2270 matches the corresponding QoS of the bearer may be performed only for the uplink flow received by the base station through the default bearer. That is, in the case of the bearer other than the default bearer, the base station may skip the procedure of confirming whether the QoS of the uplink flow matches the QoS of the corresponding bearer for predetermined reasons (e.g., reduction in complexity).

If it is determined in step 2260 that the QoS of the uplink flow received by the base station in the step 2210 matches the QoS of the corresponding bearer, in step 2290, the base station may transmit the uplink packet to the NGCN.

However, if it is determined in step 2260 that the QoS of the uplink flow received by the base station in the step 2210 does not match the QoS of the corresponding bearer, in step 2280, the base station may establish a new bearer appropriate for the QoS of the uplink flow with the terminal. In step 2290, the base station may transmit the uplink packet to the NGCN. Thereafter, the base station may receive the packets corresponding to the uplink flow from the terminal through the newly established bearer.

Figure 23:
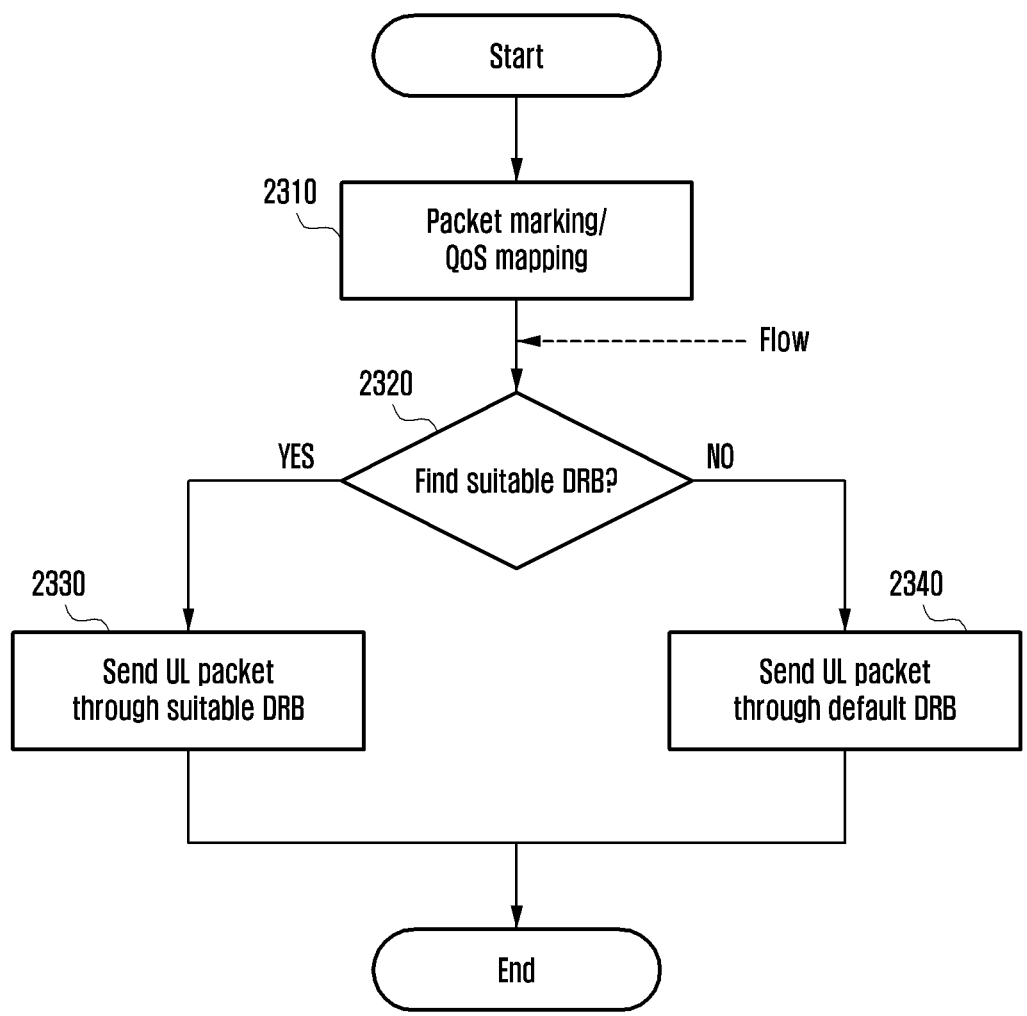
FIG. 23 illustrates an example of an operation of a terminal in the method for setting up flow-based QoS according to the embodiment of the present disclosure.

FIG. 23 illustrates an example of an operation of a terminal in the method for setting up flow-based QoS according to the embodiment of the present disclosure.

At this time, the flow may refer to the IP flow and may refer to the SDF. The SDF may be represented by the group of IP flows.

Referring to FIG. 23, the terminal may receive the authorized QoS policy setup according to the procedure in FIG. 19. The terminal may receive the authorized QoS policy setup by requesting the authorized QoS policy to the base station at the AS level or may receive the authorized QoS policy setup by requesting the authorized QoS policy to the NGCN at the authorized QoS policy at the NAS level. The QoS policy may include mapping information on each flow and QoS corresponding thereto, and may include the information related to the packet marking for indicating QoS of the flow. Further, the QoS policy may include the QoS information for each bearer.

If the terminal generates the flow of the uplink packet, in step 2310, the terminal confirms and uses the flow and QoS mapping information on the packet based on the setup QoS policy or marks the QoS corresponding to the packet to indicate the uplink flow or the QoS of the packet to the base station. In step 2320, the terminal may confirm whether there is a bearer satisfying the QoS of the uplink flow among the bearers (e.g., data radio bearer (DRB)) currently established between the base station and the terminal.

If there is a bearer satisfying the QoS of the uplink flow among the current bearers, in step 2230, the terminal may transmit the uplink packet to the base station through the bearer. If there is a bearer satisfying the QoS of the uplink flow, the QoS of the uplink flow may be represented by the QoS of the bearer and mapped, such that the terminal may skip the packet marking in step 2310. Alternatively, if the downlink flow corresponding to the flow of the uplink packet has been received prior to step 2310, the terminal 2310 may skip the packet marking in step 2310. However, if it is determined to be necessary, the terminal may perform the packet marking in step 2310.

If there is no bearer satisfying the QoS of the uplink flow among the current bearers, the terminal 2340 may use the packet marking indicating the QoS corresponding to the packet of the uplink flow or indicate the QoS mapping information on the uplink flow to the base station in step 2340 and transmit the uplink packet to the base station 2120 through the default bearer previously established at the time of the RRC connection setup/reconfiguration in step 2340.

Meanwhile, the bearer established between the terminal and the base station may be established at the time of the RRC connection setup/reconfiguration between the terminal and the base station, and several bearers may be established. According to the embodiment, upon the establishment of the bearer, the base station may include an indicator indicating which bearer is the default bearer to indicate the default bearer to the terminal.

Figure 24:
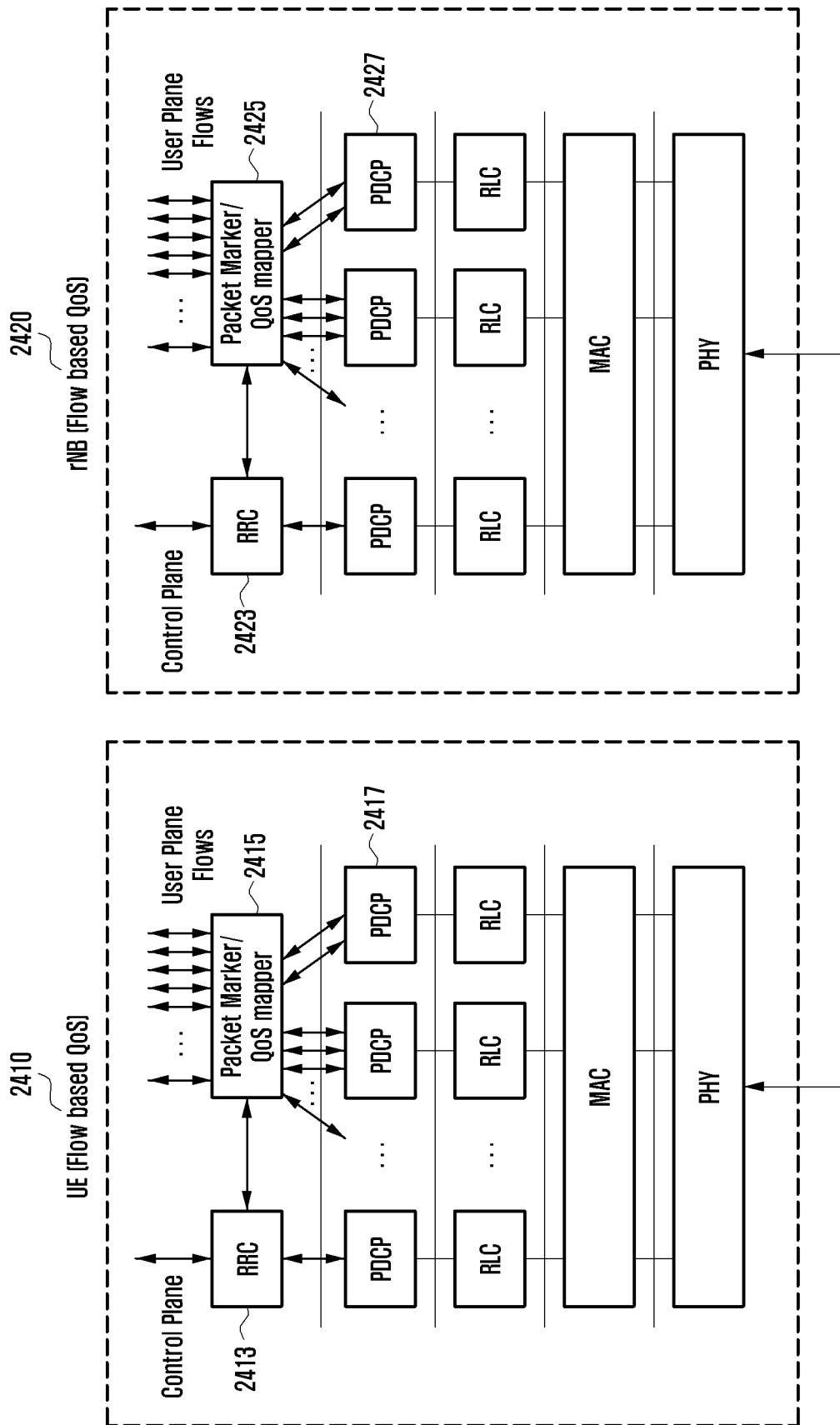
FIG. 24 illustrates a configuration of the terminal and a configuration of the base station to which the method for setting up flow-based QoS according to an embodiment of the present disclosure is applied.

FIG. 24 illustrates a configuration of the terminal and a configuration of the base station to which the method for setting up flow-based QoS according to an embodiment of the present disclosure is applied.

At this time, the flow may refer to the IP flow and may refer to the SDF. The SDF may be represented by the group of IP flows.

Referring to FIG. 24, in the case of the uplink, a terminal 2410 may allocate QoS to uplink flows using the mapping information on the QoS and the uplink flows or the packet marking indicating the QoS, and allocate the uplink flows to an appropriate bearer 2417 having QoS corresponding to the QoS through a packet marker/QoS apper (PMQM) 2415 that is at a higher layer or apparatus of a packet data convergence protocol (PDCP). Meanwhile, as long as the PMQM 2415 is a layer or an apparatus performing an operation of allocating the QoS and allocating the uplink flows to the appropriate bearer 2417 having the QoS corresponding to the QoS as described above, any apparatus may correspond thereto regardless of terms. For example, the PMQM 2415 may be referred to as a service data adaptation protocol (SDAP), a packet data adaptation protocol (PDAP), or the like, and may map between a data radio bearer and a QoS flow and mark the QoS information to the uplink packet and the downlink packet.

If there is no bearer appropriate for the QoS of the uplink flow, the PMQM 2415 may allocate the uplink flow to the default bearer 2417.

Meanwhile, the base station 2420 may confirm the QoS of the uplink flows received from the terminal 2410 using the mapping information on the QoS and the flows or the packet marking indicating the QoS and confirm whether the QoS of the uplink flow matches the QoS of the bearer to which the uplink flows are transmitted in the layer or the apparatus called the PMQM 2425.

If the uplink flows match the transmitted QoS of the bearer, the base station 2420 may transmit the uplink flows to the NGCN. If the QoS of the uplink flow does not match the QoS of the bearer to which the uplink flows are transmitted, the PMQM 2425 interworks with an RRC layer 2423 to newly establish a bearer 2427 appropriate for the QoS of the uplink flow with the terminal 2410. Thereafter, the base station 2420 may transmit the uplink flow through the newly established bearer 2427.

Meanwhile, referring to FIG. 24, in the case of the downlink, the base station 2420 may analyze the QoS of the downlink flows received from the NGCN using the mapping information on the QoS and the flows or the packet marking indicating the QoS and allocate the downlink flow to the bearer 2427 having QoS matching the QoS of the downlink flow through the layer or the apparatus called the PMQM 2425 that is at the higher part of the packet data convergence protocol (PDCP) layer. Meanwhile, as long as the PMQM 2425 is a layer or an apparatus performing an operation of allocating the QoS and allocating the downlink flows to the appropriate bearer 2427 having the QoS corresponding to the QoS as described above, any apparatus may correspond thereto regardless of terms. For example, the PMQM 2425 may be referred to as the SDAP, the PDAP, or the like, and may map between a data radio bearer and a QoS flow and mark the QoS information to the uplink packet and the downlink packet.

If there is no bearer matching the QoS of the downlink flow, a new bearer matching the QoS of the downlink flow may be established with the terminal 2410 by interworking with the RRC layer 2423. The base station 2420 may transmit the downlink flow to the terminal 2410 through the newly established bearer. The terminal 2410 may receive the downlink flows through the bearers and the PMQM 245 may transmit them to the corresponding applications. The terminal 2410 may analyze the QoS of the downlink flows received from the base station 2420 using the mapping information on the QoS and the flows or the packet marking indicating the QoS in the PMQM 2415 and use the QoS information and the downlink bearer information for the uplink flow generated as the response to the downlink flows.

Figure 25:
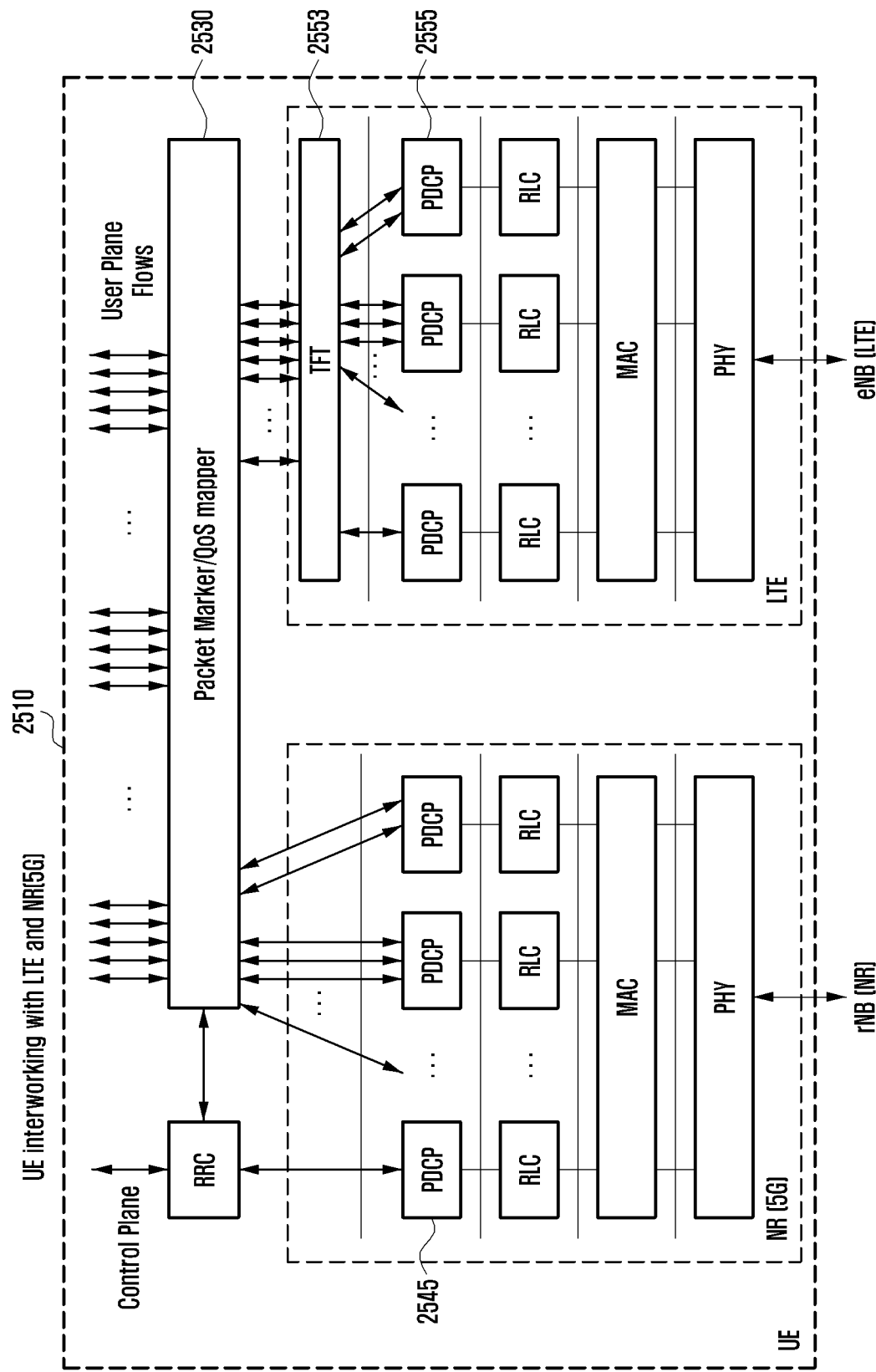
FIGS. 25 to 27 illustrate a configuration of the terminal when the terminal capable of applying the method for setting up flow-based QoS according to an embodiment of the present disclosure interworks with an LTE system and the next generation wireless communication system.
Figure 26:
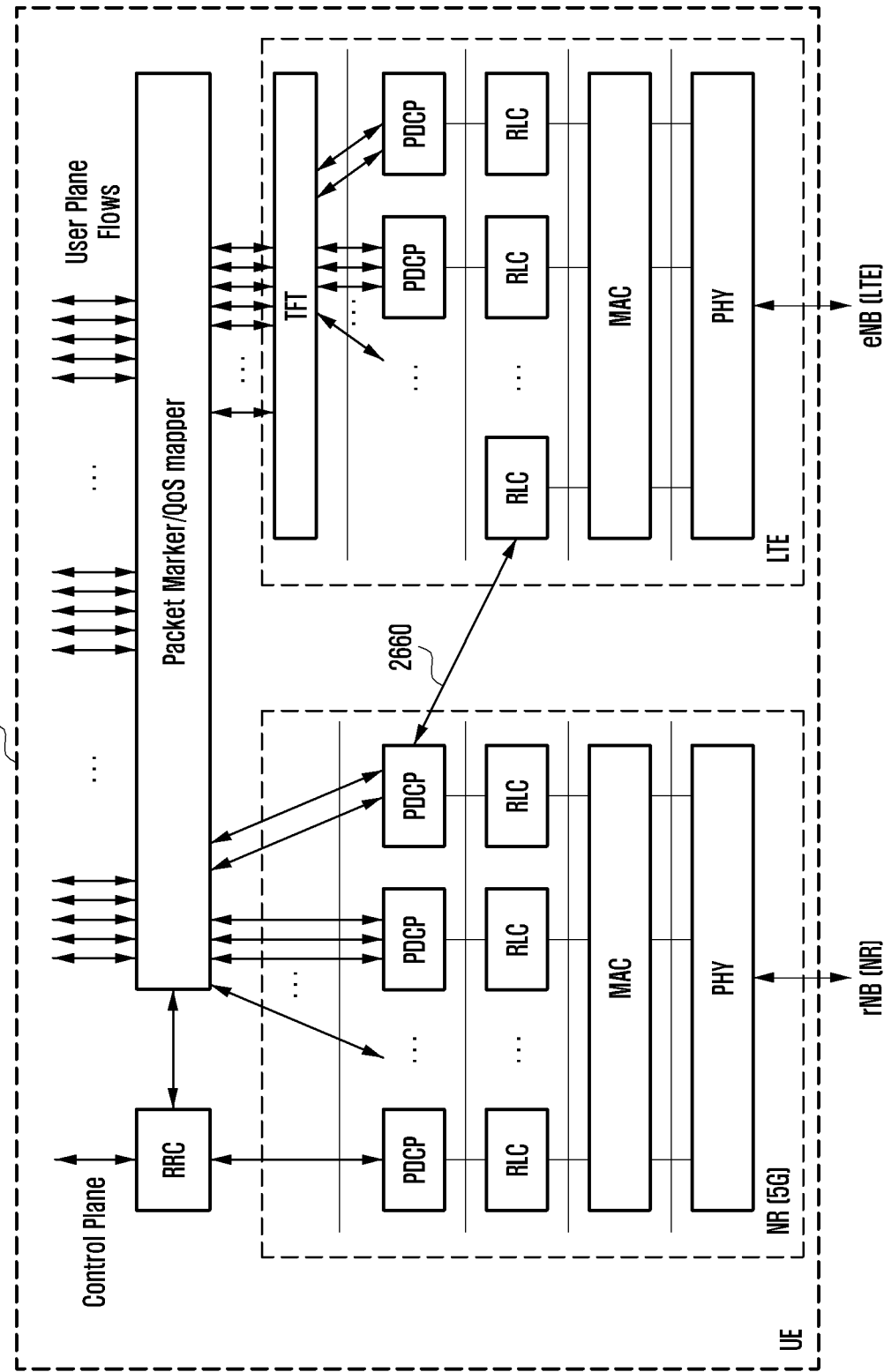
Figure 27:
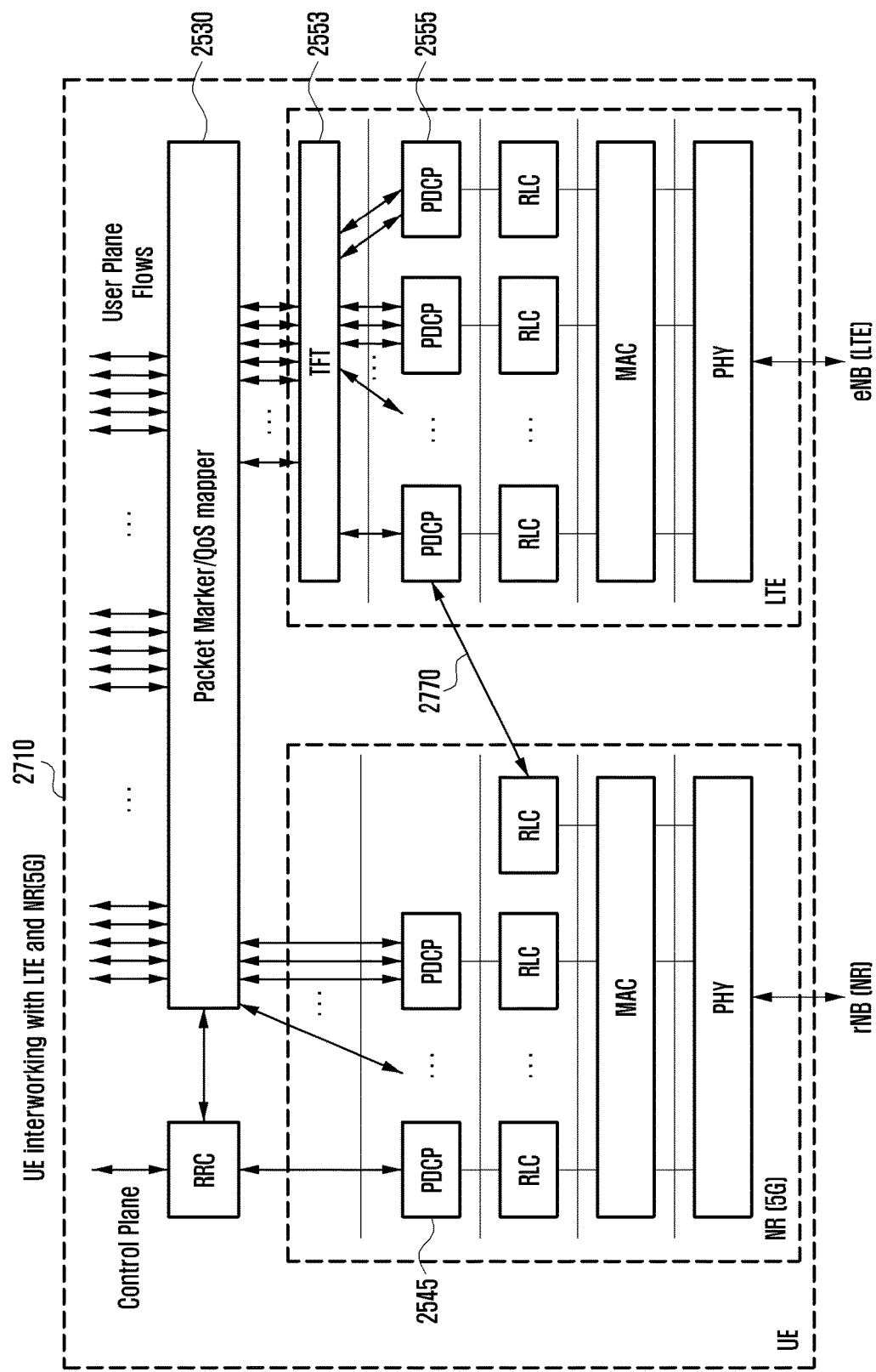

FIGS. 25 to 27 are diagrams illustrating the configuration of the terminal when the terminal capable of applying the method for setting up flow-based QoS according to an embodiment of the present disclosure interworks with an LTE system and the next generation wireless communication system.

At this time, the flow may refer to the IP flow and may refer to the SDF. The SDF may be represented by the group of IP flows.

Referring to FIG. 25, a terminal 2510 may segment uplink flows into NR (5G) flows and LTE (4G) flows in a layer or an apparatus called a packet marker/QoS mapper (PMQM) 2530 that is at a higher part of the PDCP layer. The PMQM 2530 may analyze the mapping information on the QoS and the flows or the packet marking indicating the QoS and allocate the NR flows to a bearer 2545 appropriate for the QoS of each flow to transmit the NR flows to an NR base station (rNB). If there is no bearer appropriate for the QoS of the flow, the PMQM 2530 may allocate the flow to the default bearer. In addition, the PMQM 2530 may transmit LTE flows among the uplink flows to a traffic flow template (TFT) 2553. The LTE flows transmitted to the TFT 2553 may be mapped to an EPS bearer 2555 according to the TFT filtering rule after the QoS rule is applied.

The terminal 2510 may analyze the QoS of the downlink flows received from the LTE or the NR base station using the mapping information on the QoS and the flows or the packet marking indicating the QoS in the PMQM 2530 and use the QoS information and the downlink bearer information for the uplink flow generated as the response to the downlink flows.

In addition, in order to transmit data to the NR bearer and the LTE base station for the same bearer, terminals 2610 and 2710 as illustrated in FIGS. 26 and 27 may be considered. At this time, the terminals 2610 and 2710 may perform interworking such as 2660 and 2770.

Figure 28:
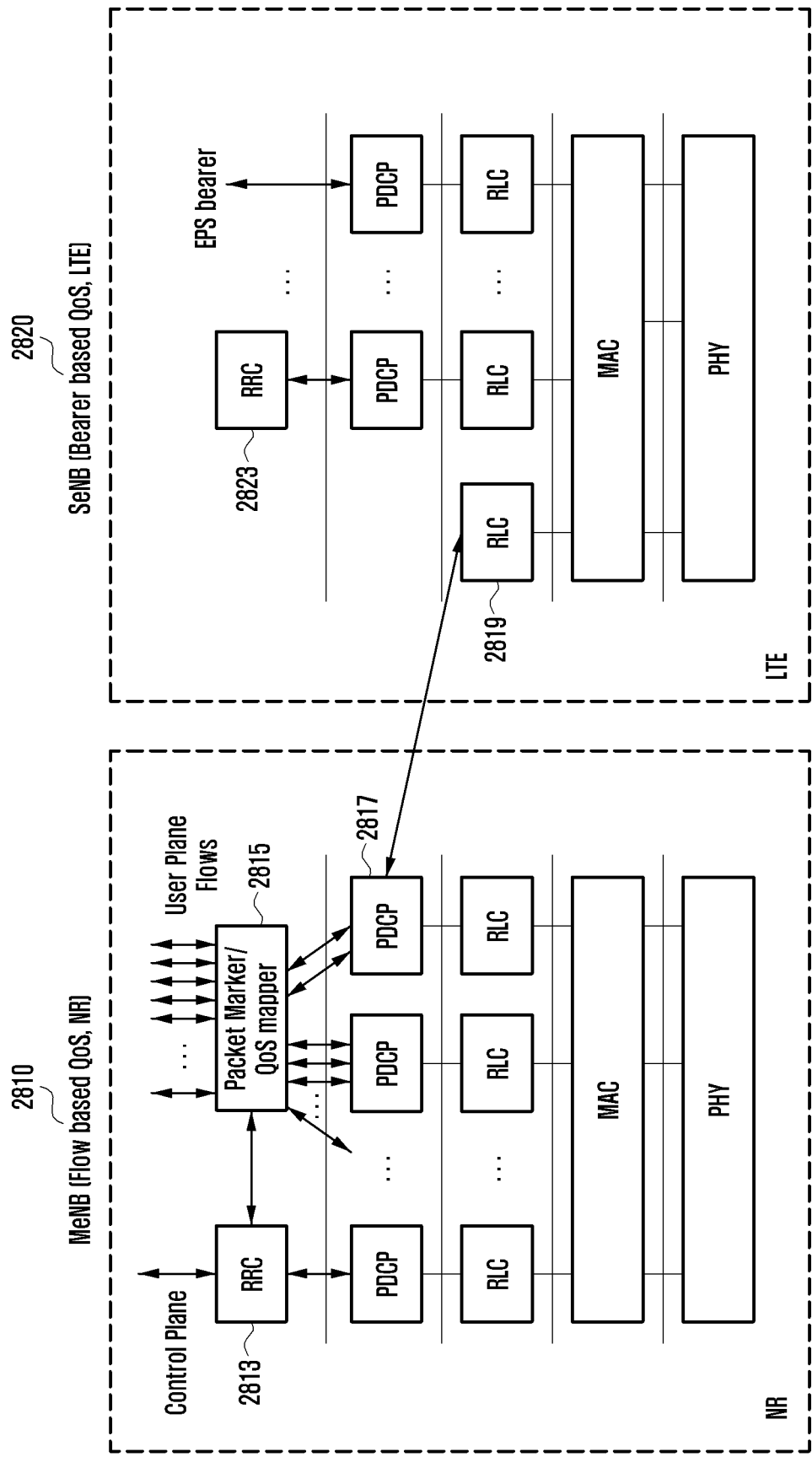
FIG. 28 illustrates a scenario of interworking between a base station (rNB) of a next generation wireless communication system to which the method for setting up flow-based QoS according to the embodiment of the present disclosure is applied and a base station (eNB) of the LTE system.

FIG. 28 illustrates a scenario of interworking between a base station (rNB) of a next generation wireless communication system to which the method for setting up flow-based QoS according to the embodiment of the present disclosure is applied and a base station (eNB) of the LTE system.

At this time, the flow may refer to the IP flow and may refer to the SDF. The SDF may be represented by the group of IP flows.

FIG. 28 illustrates a scenario in which an NR base station 2810 is operated as an MeNB and the LTE base station 2820 is operated as an SeNB. A layer or an apparatus called a packet marker/QoS mapper (PMQM) 2815 of the NR base station 2810 analyzes the QoS using the mapping information on the QoS and flows or the packet marking indicating QoS of the downlink flows and allocates the downlink flows to a bearer 2817 appropriate for the analyzed QoS to transmit the downlink flows. The PDCP layer 2817 may transmit the packets of the bearer corresponding to the PDCP layer 2817 to an RLC layer 2819 bearer of the LTE base station 2820 appropriate for the QoS of the PDCP layer bearer to interwork with the LTE base station 2820. If there is no RLC layer of the LTE base station 2820 appropriate for the QoS of the PDCP layer bearer, the NR RRC layer 2813 and the LTE RRC layer 2823 may interwork with each other to generate a bearer of an appropriate RLC layer.

Figure 29:
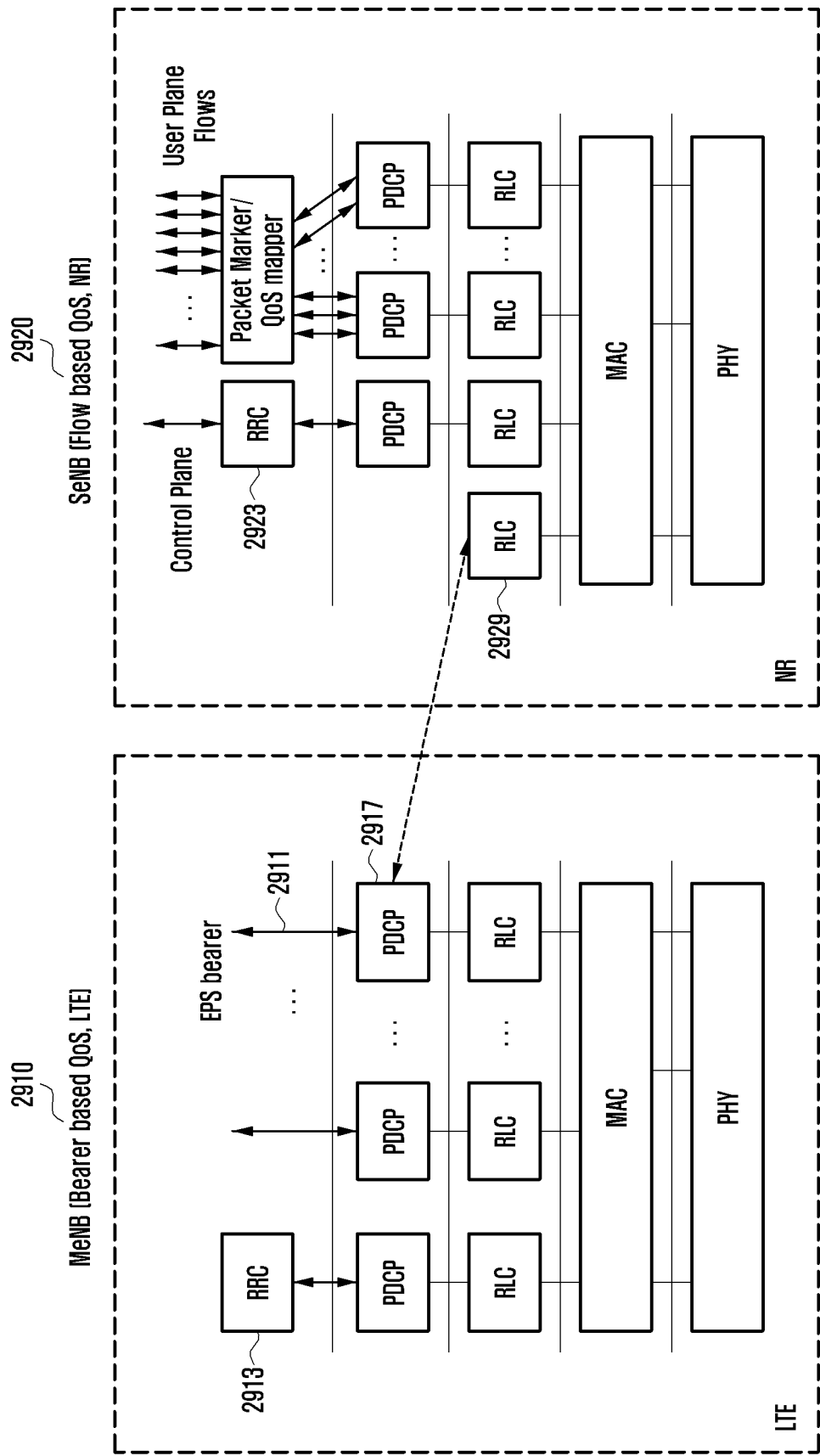
FIG. 29 illustrates another scenario of interworking between abase station (rNB) of a next generation wireless communication system to which the method for setting up flow-based QoS according to the embodiment of the present disclosure is applied and a base station (eNB) of the LTE system.

FIG. 29 illustrates another scenario of interworking between abase station (rNB) of a next generation wireless communication system to which the method for setting up flow-based QoS according to the embodiment of the present disclosure is applied and a base station (eNB) of the LTE system.

Referring to FIG. 29 illustrates a scenario in which, an LTE base station 2910 is operated as an MeNB and an NR base station 2920 is operated as an SeNB. If the LTE base station 2910 receives the downlink data having the QoS processed based on the bearer, in order to interwork with the NR base station 2920 in the PDCP layer 2917, the LTE base station may transmit the packets of the bearer 2911 corresponding to the PDCP layer 2917 to the RLC layer 2929 bearer of the NR base station 2920 appropriate for the QoS of the PDCP layer bearer. If there is no RLC layer of the NR base station 2910 appropriate for the QoS of the PDCP layer bearer, the LTE RRC layer 2913 and the NR RRC layer 2923 may interwork with each other to generate the bearer of the appropriate RLC layer.

Figure 30:
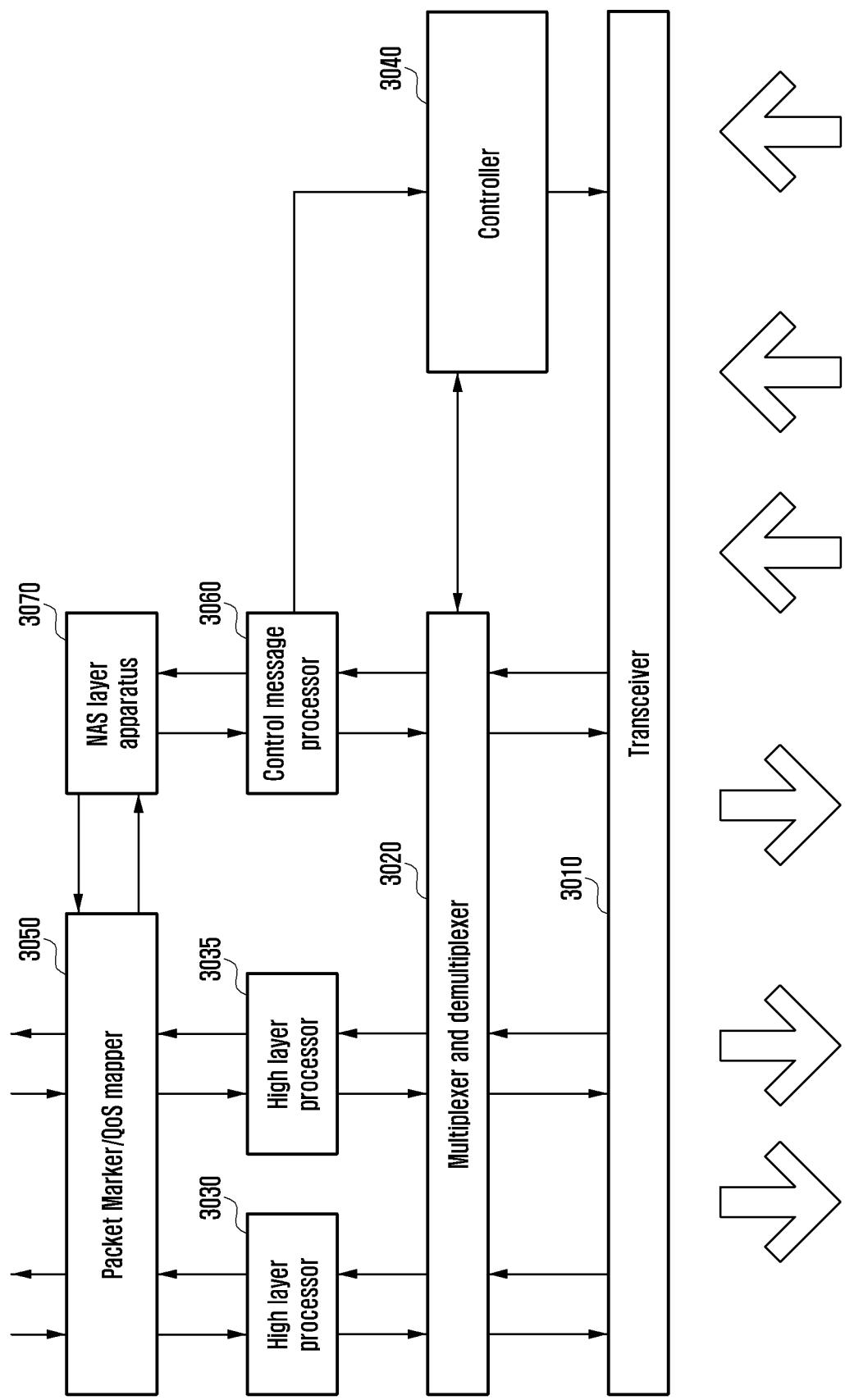
FIG. 30 illustrates a configuration of the terminal according to the embodiment of the present disclosure.

FIG. 30 illustrates a configuration of the terminal according to the embodiment of the present disclosure.

Referring to FIG. 30, the terminal according to one embodiment of the present disclosure may include a transceiver 3010 and a controller 3040. The terminal includes a multiplexer/demultiplexer 3020, a control message processor 3060, various higher layer processors 3030 and 3035, a layer or an apparatus 3050 called a packet marker/QoS mapper (PMQM), and an NAS layer apparatus 3070.

The transceiver 3010 may receive data and a predetermined control signal through a forward channel of the serving cell and transmit the data and the predetermined control signal through a reverse channel. If a plurality of serving cells is configured, the transceiver 3010 may transmit and receive data and a control signal through the plurality of serving cells.

The multiplexer and demultiplexer 3020 may serve to multiplex data generated from the higher layer processors 3030 and 3035 or the control message processor 3060 or demultiplexes data received by the transceiver 3010 and transmit the data to the appropriate higher layer processors 3030 and 3035 or the control message processor 3060.

The control message processor 3060 is an RRC layer apparatus and process the control message received from the base station to take the required operation. For example, when receiving an RRC CONNECTION SETUP message, the control message processor 3060 configures a signaling radio bearer (SRB) and a temporary DRB.

The layer or apparatus called the PMQM 3050 may allocate QoS of the uplink flows using the mapping information on the QoS and the flows or the packet marking indicating the QoS, and allocate the uplink flows to the appropriate bearers 3030 and 3035 having the QoS corresponding to the QoS. If there is no bearer appropriate for the QoS of the uplink flow, the PMQM 3050 may allocate the uplink flow to the default bearer 2417. The PMQM 3050 may analyze the QoS of the downlink flows received from the base station 2420 using the mapping information on the QoS and the flows or the packet marking indicating the QoS and use the QoS information and the downlink bearer information for the uplink flow generated as the response to the downlink flows. Meanwhile, as long as the PMQM 3050 is a layer or an apparatus that performs an operation of mapping between a data radio bearer and a QoS flow and marking the QoS information on the uplink packet and the downlink packet, any apparatus may correspond thereto regardless of terms. For example, the PMQM 3050 may be referred to as a service data adaptation protocol (SDAP), a packet data adaptation protocol (PDAP), or the like.

The higher layer processors 3030 and 3035 mean the DRB apparatus and may be configured for each service. The higher layer processors 3030 and 3035 may process data generated from user services such as a file transfer protocol (FTP) and a voice over internet protocol (VoIP) and transmit the processed data to the multiplexer and demultiplexer 3020, or process data transmitted from the multiplexer and demultiplexer 3020 and transmit them to the service application of the higher layer. One service may be mapped one-to-one with one EPS bearer and one higher layer processor on a one-to-one basis.

The controller 3040 may control the overall operations of the terminal to perform any one operation of the above-described embodiments. For example, the controller 3040 may control the transceiver 3010 and the multiplexer and demultiplexer 3020 to confirm scheduling commands received through the transceiver 3010, for example, reverse grants to control the multiplexer and demultiplexer 3010 to perform a reverse transmission to an appropriate transmission resource at an appropriate time. For this purpose, the controller 3040 may include a circuit, an application-specific circuit, or at least one processor. For example, the controller 3040 may include a communication processor (CP) performing a control for communication and an application processor (AP) controlling a higher layer such as the application programs. In addition, the operations of the terminal may be realized by including a memory device storing the corresponding program code in any component of the terminal. That is, the controller 3040 may execute the above-described operations by reading and executing the program code stored in the memory device by a processor, a central processing unit (CPU) or the like. The controller 3040 may be electrically connected to other components, for example, the transceiver 3010.

Figure 31:
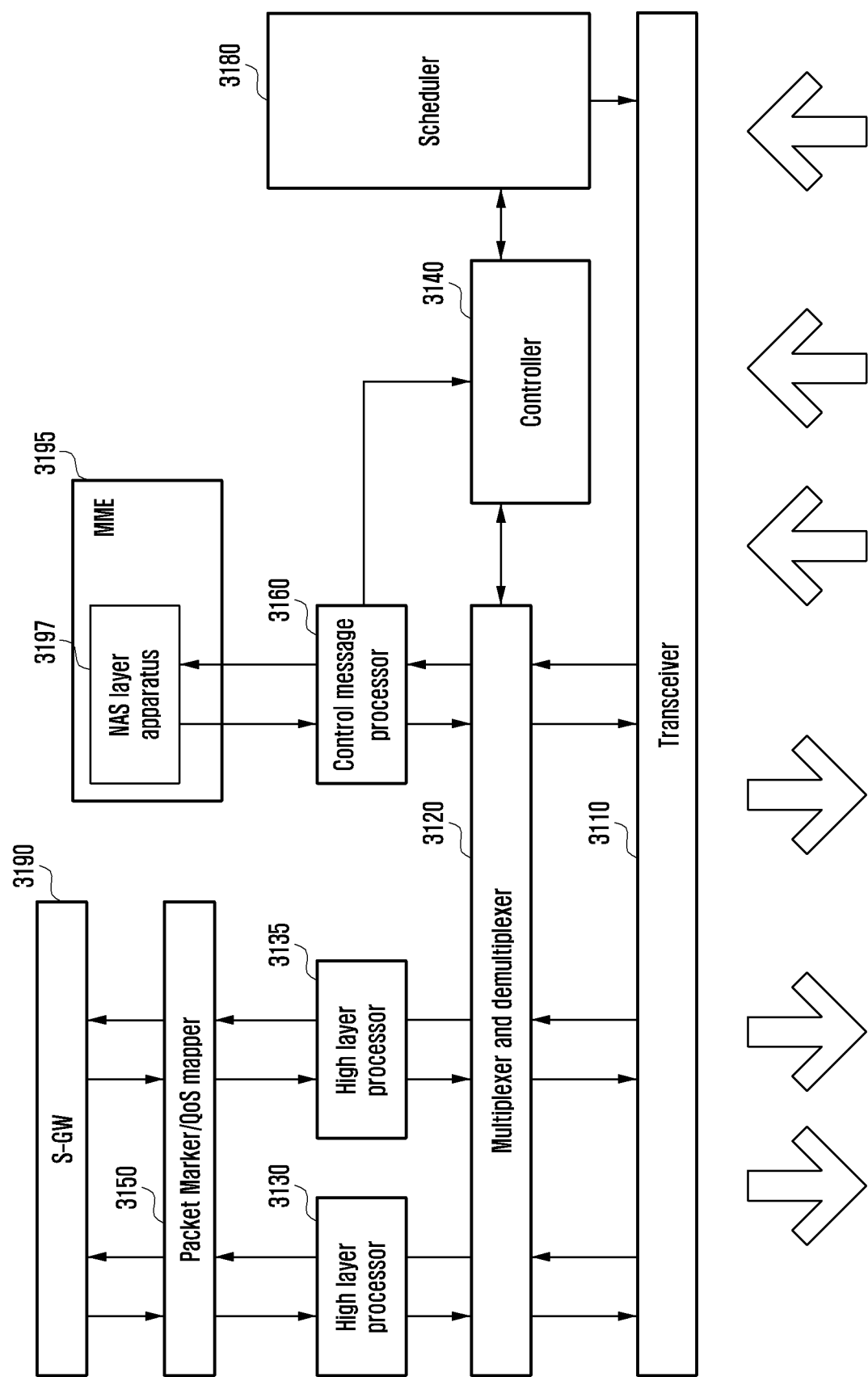
FIG. 31 illustrates a configuration of a base station, MME, and S-GW according to an embodiment of the present disclosure.

FIG. 31 illustrates configurations of a base station, MME, and S-GW according to an embodiment of the present disclosure.

Referring to FIG. 31, a block diagram illustrating a configuration of a base station, an MME 3195, and an S-GW 3190 according to an embodiment of the present disclosure is illustrated. At this time, the base station may include a transceiver 3110 and a controller 3140. The base station may further include a multiplexer/demultiplexer 3120, a control message processor 3160, various higher layer processors 3130 and 3135, a scheduler 3180, and a layer or an apparatus 3150 called a packet marker/QoS mapper (PMQM). The MME may include an NAS layer device 3197.

The transceiver 3110 may transmit data and a predetermined control signal through a forward carrier and receive the data and the predetermined control signal through a reverse carrier. If a plurality of carriers is configured, the transceiver 3110 may transmit and receive the data and the control signal through the plurality of carriers.

The multiplexer and demultiplexer 3120 serves to multiplex data generated from the upper layer processors 3130 and 3135 or the control message processor 3160 or demultiplex data received by the transceiver 3110 and transmit the data to the appropriate upper layer processors 3130 and 3135, the control message processor 3160, or the controller 3140.

The control message processor 3160 may allow the terminal to process the transmitted control message to perform the required operation or generates the control message to be transmitted to the terminal and transmit the generated control message to the lower layer.

The layer or apparatus called the PMQM 3150 may analyze the QoS of the uplink flows using the mapping information on the QoS and the flows or the packet marking indicating the QoS, and allocate the downlink flows to the appropriate bearers 3130 and 3135 having the QoS corresponding to the QoS. If there is no bearer appropriate for the QoS of the uplink flow, the PMQM 3150 may generates the QoS of the downlink flow. Meanwhile, as long as the PMQM 3150 is a layer or an apparatus that performs an operation of mapping between a data radio bearer and a QoS flow and marking the QoS information on the uplink packet and the downlink packet, any apparatus may correspond thereto regardless of terms. For example, the PMQM 3150 may be referred to as a service data adaptation protocol (SDAP), a packet data adaptation protocol (PDAP), or the like.

The higher layer processors 3130 and 3135 may be configured for each EPS bearer. The higher layer processors 3030 and 3035 may configure the data transmitted from the PMQM apparatus 3150 into the RLC PDU and transmit the RLC PDU to the multiplexer and demultiplexer 3120 or configure the RLC PDU transmitted from the multiplexer and demultiplexer 3120 into PDCP SDU and transmit the PDCP SDU to the PMQM apparatus 3150.

The scheduler 3180 allocates a transmission resource to the terminal at appropriate timing in consideration of the buffer status and the channel status of the terminal, etc. and allows the transceiver 3130 to process the signal transmitted from the terminal or perform a process to transmit a signal to the terminal.

The PMQM apparatus 3150 processes the data transmitted from the lower layer processor and transmits the processed data to a next network node.

The higher layer processors 3130 and 3135 and the PMQM apparatus 3150 are interconnected by a bearer and a flow. The NAS layer apparatus 3197 processes the IP packet included in the NAS message and transfers the processed IP packet to the S-GW 3190.

The controller 3140 may control the overall operations of the base station to perform any one operation of the above-described embodiments. For example, the controller 3140 may control the PMQM 3150 to analyze the QoS of the uplink flows using the mapping information on the QoS and the flows or the packet marking indicating the QoS, and allocate the downlink flows to the appropriate bearers 3130 and 3135 having the QoS corresponding to the QoS. In addition, if there is no bearer appropriate for the QoS of the uplink flow, the controller 3140 may control the PMQM 3150 to generate the bearer corresponding to the QoS of the downlink flow. For this purpose, the controller 3140 may include a circuit, an application-specific circuit, or at least one processor. For example, the controller 3140 may include a communication processor (CP) performing a control for communication and an application processor (AP) controlling a higher layer such as the application programs. In addition, the operations of the base station may be realized by including a memory device storing the corresponding program code in any component of the terminal. That is, the controller 3140 may execute the above-described operations by reading and executing the program code stored in the memory device by a processor, a central processing unit (CPU) or the like. The controller 3140 may be electrically connected to other components, for example, the transceiver 3110.

Hereinafter, an operation principle of the present disclosure will be described in detail with reference to the accompanying drawings. Hereinafter, when it is determined that the detailed description of the known art related to the present disclosure may obscure the gist of the present disclosure, the detailed description thereof will be omitted. Further, the following terminologies are defined in consideration of the functions in the present disclosure and may be construed in different ways by the intention or practice of users and operators. Therefore, the definitions thereof should be construed based on the contents throughout the specification. Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3rd generation partnership project long term evolution (3GPP LTE) or terms and names modified based on the terms and names. However, the present disclosure is not limited to the terms and names but may also be identically applied to the system according to other standards.

The present disclosure relates to a reselection of a serving beam of a terminal in an NR system operated based on a beam, and more particularly, to a method and an apparatus for measuring neighbor beams using differential thresholds.

Recently, the mobile communication system has been developed by combining various new technologies to satisfy the rapidly increasing demand for data traffic and various services. Particularly, discussions about 5G (5th generation), which is a next generation mobile communication system reflecting the demands are actively underway. The 5G system is also referred to as a new radio access technology (hereinafter, referred to as NR). The NR system aims to provide super-high speed data services of several Gbps using ultra-wideband over 100 MHz bandwidth compared to the existing LTE and LTE-A. However, since it is difficult to ensure an ultra-wideband frequency of 100 MHz or more in the frequency band of several hundreds of MHz or several GHz used in the LTE and LTE-A, the NR system considers operation in a very high frequency band of several GHz or several tens of GHz. Since a wavelength of a radio wave to be used in the above-described very high frequency band is a few millimeters (mm), it is called a millimeter wavelength (mmWave). Since the frequency band and the pathloss of the radio wave are proportional to each other, the pathloss of the radio wave is large in the very high frequency, so that the service area becomes small. In order to overcome the disadvantage of the reduction of the service area in the NR system, a beamforming technique of concentrating radiant energy of a radio wave by using a plurality of antennas to increase an arrival distance of the radio wave has been emphasized. The beamforming technique may be applied to the transmitting end and the receiving end, respectively. In addition to the enlargement of the service area, the beamforming technique has the effect of reducing the interference due to the physical beam concentration in the target direction.

Figure 32:
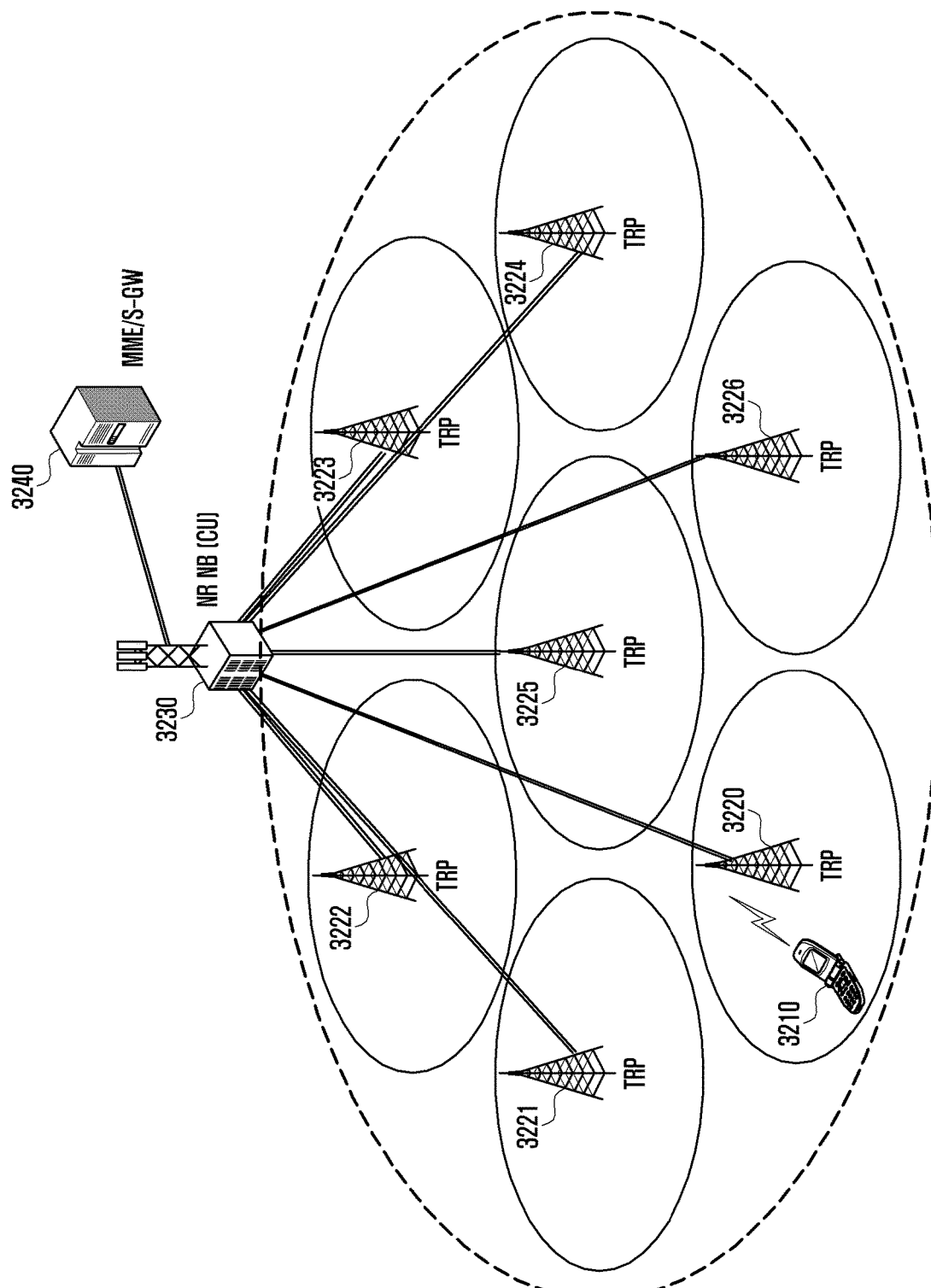
FIG. 32 illustrates a structure of an NR system according to an embodiment of the present disclosure.

FIG. 32 illustrates a structure of an NR system according to an embodiment of the present disclosure.

Referring to FIG. 32, a cell served by a NR base station (NR Node B, NR NB, gNB) 3230 operating on a beam basis includes a plurality of transmission reception points (TRP) 3220, 3221, 3222, 3223, 3224, 3225, and 3226. The TRPs 3220, 3221, 3222, 3223, 3224, 3225, and 3226 are blocks that separate only functions of transmitting and receiving physical signals from the existing LTE base station (eNB), and may be configured of a plurality of antennas. In particular, the TRPs 3220, 3221, 3222, 3223, 3224, 3225, and 3226 may generate beams in various directions by using a plurality of transmitting and receiving antennas to perform beamforming, and may be called a beam group (BG). The user terminal 3210 may access the NR base station 3230 and the external network through the TRPs 3220, 3221, 3222, 3223, 3224, 3225, and 3226. In order to serve traffic of users, the NR base station 3230 collects and schedules state information such as a buffer state, an available transmission power state, and a channel state of the terminals 3210 to support a connection between the terminals 3210 and the core network (CN).

In addition, the MME 3240 in the NR system may serve to perform various control functions as well as the mobility management function for the terminal 3210 and may be connected to the plurality of base stations 3230. Further, the S-GW 3240 is an apparatus providing a data bearer. Further, the MME and the S-GWs 3240 may further perform authentication, bearer management, etc., on the terminal 3210 connected to the network and may process packets arriving from the base station 3230 and packets to be transmitted to the base station 3230. Meanwhile, the MME/S-GW 3240 may be configured of an access and mobility management function (AMF), a user plane function (UPF), a session management function (SMF).

Figure 33:
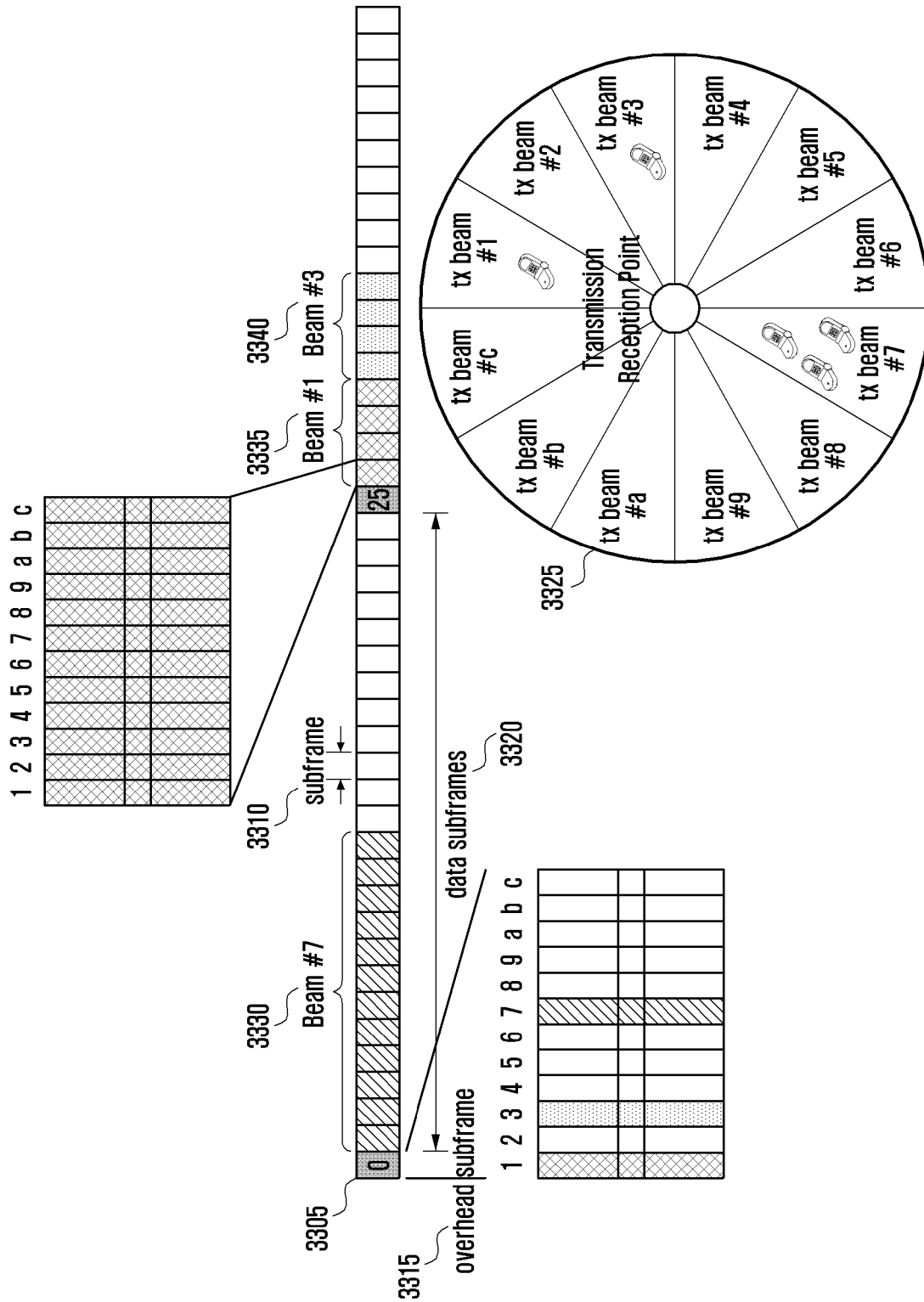
FIG. 33 illustrates a frame structure of an NR system operated in a beam-based manner according to an embodiment of the present disclosure.

FIG. 33 illustrates a frame structure of an NR system operated in a beam-based manner according to an embodiment of the present disclosure.

Referring to FIG. 33, a radio frame 3305 of the NR system is configured of a plurality of subframes 3310. In particular, the subframe 3310 of the NR system may be configured of two types of an overhead subframe (osf) 3315 and a data subframe (dsf) 3320.

The overhead subframe 3315 is a subframe in which an overhead signal required for beam selection is transmitted. The overhead subframe 3315 transmits different overhead signals for each symbol configuring the subframe in a beam sweeping manner. The overhead subframe 3315 includes a primary synchronization signal (PSS) for acquiring timing of an orthogonal frequency division multiplexing (OFDM) symbol, a secondary synchronization signal (SSS) for detecting a cell ID, an extended synchronization signal (ESS) for identifying subframe timing, and a beam reference signal (BRS) for identifying a beam. In addition, one or a plurality of overhead subframe 3315 may exist in a radio frame 3305. In the illustrated drawing, an overhead subframe 3315 is transmitted in the 0-th and 25-th subframes.

The data subframe 3320 is a sub-frame in which actual data transmitted to a specific terminal are transmitted, and different beam patterns may be applied according to a geographical distribution of the terminals.

The TRP 3325 performs beam sweeping indifferent directions for each symbol during the overhead subframe 3315, such that resources for transmitting/receiving to/from terminals are allocated within the data subframe 3320 for each beam (3330, 3335, and 3340). If the beam direction transmitted by the TRP 3325 does not match the location of the terminal, the terminal may not receive any signal of the corresponding data subframe. In addition, one TRP 3325 may transmit multiple data subframes during one radio frame 3305, and the terminal may receive multiple beams from multiple TRPs 3325 according to the terminal's own location.

Figure 34:
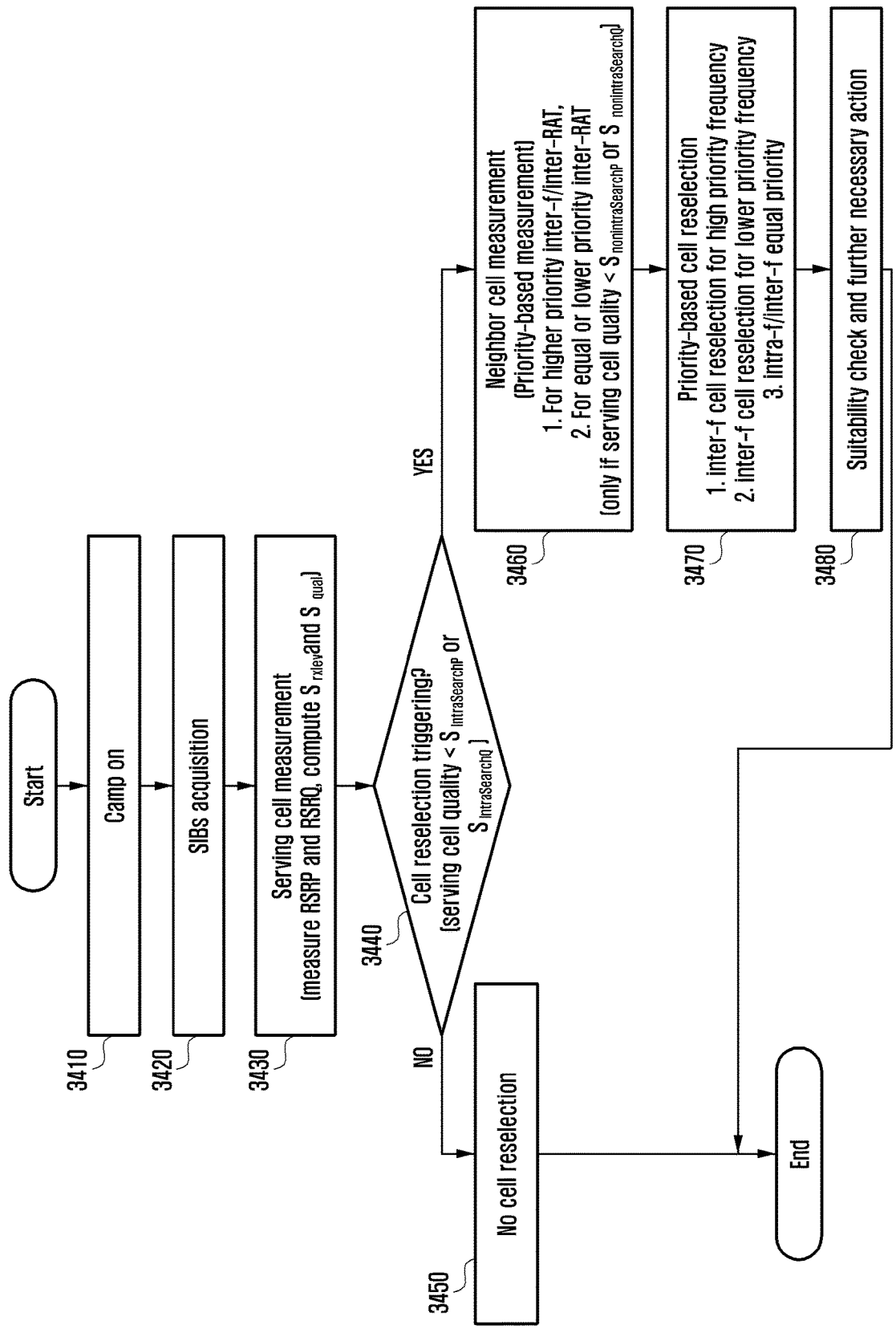
FIG. 34 illustrates a procedure for a terminal to reselect a cell in the LTE system according to an embodiment of the present disclosure.

FIG. 34 illustrates a procedure for a terminal to reselect a cell in the LTE system according to an embodiment of the present disclosure.

The cell reselection is a procedure for determining on which cell the terminal camps when the quality of service for a serving cell is lower than the quality of service for neighbor cells due to the movement of the terminal in the idle state. The handover determination is made by a network (MME or source eNB), whereas the cell reselection is determined by the terminal based on the measured value. In addition, a cell that is reselected while the terminal moves may be a cell that uses (inter-frequency) the same LTE frequency as the serving cell that is currently camping, a cell that uses (inter-frequency) different LTE frequencies, or a cell that uses (inter-RAT) other wireless access technologies.

Referring to FIG. 34, the terminal in the idle state performs a series of operation while camping the serving cell in step 3410. First, in step 3420, the terminal may receive a system information block (SIB) broadcast by the base station of the serving cell. For reference, MIB, SIB 1, and SIB 2 are system information commonly applied to all UEs, and SIB 3 to SIB 8 may include information necessary for a terminal in an idle state to reselect a cell. The system information may include a threshold used for determining whether to measure neighbor cell signals, a parameter used for calculating ranks of a serving cell and neighbor cells, and the like.

The terminal in the idle state may wake up every discontinuous reception (DRX) cycle in step 3430 to measure an absolute (reference signal received quality (RSRP)) ($Q_{rxlevmeas}$) and a relative reference signal received power (RSRP) ($Q_{qualmeas}$) of the serving cell. The terminal calculates a received level (Srxlev) and received quality (Squal) of the serving cell using measured values and parameters received from the base station, compares the values with threshold values to determine whether to re-select a cell. The received level Srxlev and received quality Squal of the serving cell may be obtained by the following Equation given by:

$$Srxlev = Q_{rxlevmeas} - (Q_{rxlevmin} + Q_{rxlevminoffset}) - Pcompensation - Qoffset_{temp}$$

$$Squal = Q_{qualmeas} - (Q_{qualmin} + Q_{qualminoffset}) - Qoffset_{temp}$$

The definitions of the parameters used here refer to the 3GPP standard document.

In step 3440, the terminal determines whether the cell reselection is triggered by determining whether the signal strength and quality of the serving cell obtained from the measured values are smaller than the threshold (e.g., Srxlev<$S_{IntraSearchP}$ or Squal<$S_{IntraSearchQ}$).

If the above conditions are not satisfied (i.e., if the signal strength and quality of the serving cell obtained from the measured values become smaller than the threshold), the terminal continuously camps-on the corresponding serving cell without the cell reselection in step 3450.

However, if the cell reselection is triggered by satisfying the above conditions (i.e., if the signal strength and quality of the serving cell obtained from the measured values become smaller than the threshold), in step 3460, the terminal ay measure the neighbor cells on a priority basis. According to the embodiment, for a high-priority inter-frequency/inter-RAT cell, neighbor cell measurement may start regardless of the quality of the serving cell. In addition, if for inter-frequency cells having the same priority or lower than the serving cell, the signal strength and quality of the serving cell become smaller than the thresholds ($S_{nonIntraSearchP}$, and $S_{nonIntraSearchQ}$) received as the system information, that is, if Srxlev<$S_{nonIntraSearchP}$ or Squal<$S_{nonIntraSearchQ}$ is satisfied, the measurement on the neighbor cells may start.

Upon completion of the measurement for the neighbor cells in step 3460, the terminal may perform the cell reselection based on the priority in step 3470. First, for the reselection of the high-priority inter-frequency/inter-RAT cell, if the signal quality of the corresponding cell is larger than the threshold $Thresh_{X,\ HighQ}$ for a specific time $Treselection_{RAT}$ (Squal>$Thresh_{X,\ HighQ}$), the terminal may perform the reselection to the corresponding cell. Secondly, for the low-priority inter-frequency cell reselection, first of all, it is determined whether the signal quality of the serving cell satisfies a condition (Squal<$Thresh_{Serving,\ LowQ}$) that is smaller than the threshold $Thresh_{Serving,\ LowQ}$, and if it is determined that the condition is satisfied, the signal quality of the inter-frequency cell is larger (Squal>$Thresh_{X,\ LowQ}$) than the threshold $Thresh_{X,\ LowQ}$ for a specific time $Treselection_{RAT}$. Thirdly, for the intra-frequency/inter-frequency cell reselection with the same priority, the cell-by-cell rank is determined based on the measured value (RSRP) from neighbor cells. The ranks of the serving cell and the neighbor cells may be calculated by following equation given by:

$$R_s = Q_{meas,s} + Q_{Hyst} - Qoffset_{temp}$$

$$R_n = Q_{meas,n} - Qoffset - Qoffset_{temp}$$

In the above Equation, $Q_{meas,\ s}$ is the RSRP measurement value of the serving cell, $Q_{meas,\ n}$ is the RSRP measurement value of the neighbor cells, QHyst is the hysteresis value of the serving cell, Qoffset is the offset between the serving cell and the neighbor cells, and $Qoffset_{temp}$ is the offset temporarily applied to the cell. The terminal may camp-on the best cell among neighbor cells when the rank of the neighbor cells obtained from the above equation is larger than the rank of the serving cell (Rn>Rs).

If the cell reselection is determined in the above process, the terminal receives the system information from the corresponding cell in step 2480 and performs a suitability check on whether a new serving cell may receive a service. If the tracking area identity (TAI) is not in the TAI list of the terminal, a tracking area update (TAU) procedure is performed. If the corresponding cell is determined as a new cell, operations (system information acquisition, paging monitoring, serving cell signal measurement, etc.) to the serving cell may be performed.

Meanwhile, the number of times of beam measurement in the beam-based NR system is larger than the measurement for the cell in the LTE. The beam group consists of at least one beam, in which the reference signals of each beam is transmitted in the same overhead subframe and scrambled by a code initialized by at least one same value. That is, the base station transmits a plurality of beams for each TRP by dividing the time domain in the overhead subframe, and the terminal measures the intensity of the beams which the TRP transmits in the overhead subframe for each reception beam of the terminal. The above-mentioned intra-TRP beam measurement costs less (here, the number of times required for measurement), but in the case of the inter-TRP beam measurement, the beam measurement needs to be performed from several TRPs and therefore the search cost is increased. In addition, the inter-frequency beam measurement is not performed simultaneously with the intra-frequency beam measurement, such that more RF resources are needed. That is, since a large difference occurs in the complexity of the beam measurement procedure depending on the type of cells performing the beam measurement, in the present disclosure, a procedure for differentially applying the conditions for performing the beam measurement according to the type of the neighbor cells will be described.

Figure 35:
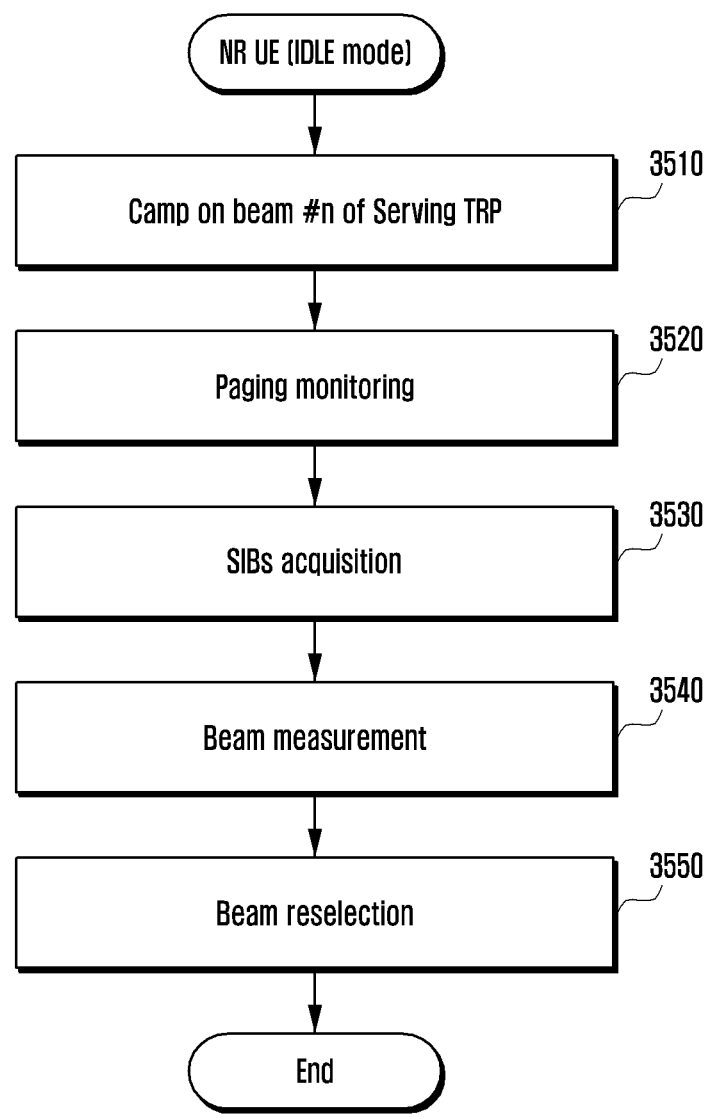
FIG. 35 illustrates a method for a terminal to reselect a serving beam in an NR system according to an embodiment of the present disclosure.

FIG. 35 illustrates a method for a terminal to reselect a serving beam in an NR system according to an embodiment of the present disclosure.

Referring to FIG. 35, in step 3510, the NR terminal in the idle state may camp-on an n-th beam of the serving TRP. In step 3520, the terminal may monitor the paging message.

In step 3530, the terminal receives the system information through the serving beam, and in step 3540, the terminal may measure the serving beam and the neighbor beams.

If the measurement result for the neighbor beam corresponds to the beam reselection, the terminal may reselect the beam in step 3550.

Figure 36:
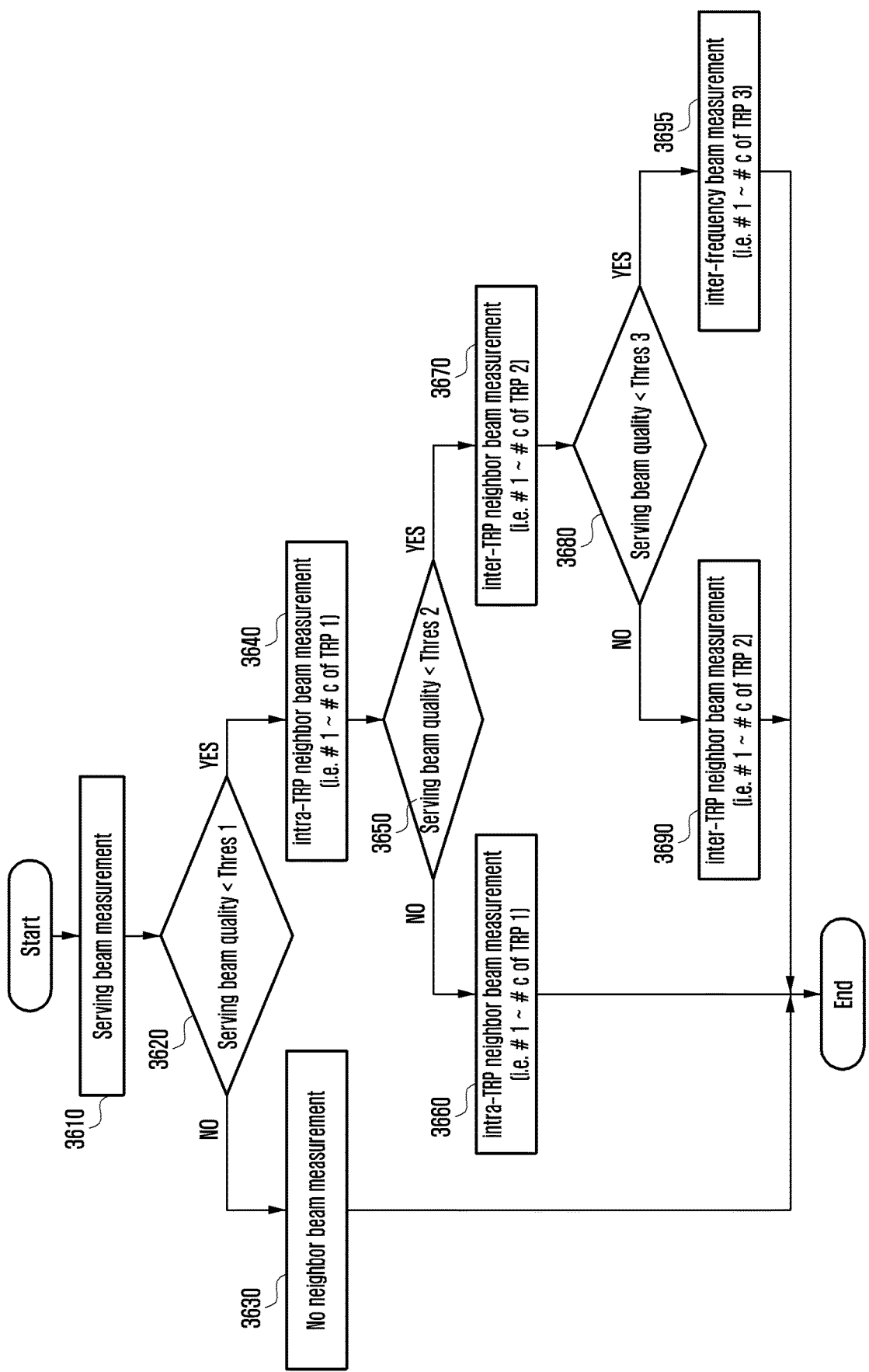
FIG. 36 illustrates an example 1 of beam measurement for the NR system according to the embodiment of the present disclosure.

FIG. 36 illustrates an example 1 of beam measurement for the NR system according to the embodiment of the present disclosure.

Referring to FIG. 36, the NR terminal includes a neighbor beam measurement procedure for measuring the signal strength and quality of the serving beam and determining the measurement for the neighbor beams sequentially. In particular, three thresholds (Thres 1>Thres 2>Thres 3) were introduced to define different beam measurements depending on the type of neighbor cells.

In step 3610, the NR terminal may measure the strength and quality of the downlink beam reference signal of the serving beam. According to the embodiment, the downlink beam reference signal may be transmitted/received through an overhead subframe of the corresponding TRP/BG.

In step 3620, the terminal compares the serving beam quality with a threshold value 1 (Thres 1) (first threshold value), and determines whether or not the serving beam quality<Thres 1 is satisfied.

If the serving beam quality<Thres 1 is not satisfied, the terminal may not perform the neighbor beam measurement in step 3630. That is, in this case, the beam reselection is not performed because the service quality of the serving beam is good.

However, if the serving beam quality<Thres 1 is satisfied, in step 3640, the terminal may start the neighbor beam measurement on the intra-TRP. That is, the terminal may start to measure other beams transmitted in the TRP (e.g., TRP 1) including the serving beam.

In step 3650, the terminal compares the serving beam quality with a threshold value 2 (Thres 2) (second threshold value), and determines whether or not the serving beam quality<Thres 2 is satisfied.

If the serving beam quality<Thres 2 is not satisfied, in step 3660, the terminal may start the neighbor beam measurement on the intra-TRP (for example, TRP1).

However, if the serving beam quality<Thres 2 is satisfied, in step 3670, the terminal may start the neighbor beam measurement on the inter-TRP. That is, the terminal may start to measure the beam transmitted in the TRPs (e.g., TRP 2) not including the serving beam.

In step 3680, the terminal compares the serving beam quality with a threshold value 3 (Thres 3) (third threshold value), and determines whether or not the serving beam quality<Thres 3 is satisfied.

If the serving beam quality<Thres 3 is not satisfied, in step 3690, the terminal may start the neighbor beam measurement on the inter-TRP (for example, TRP2).

However, if the serving beam quality<Thres 3 is satisfied, in step 3695, the terminal may start the neighbor beam measurement on the inter-TRP (for example, TRP3). That is, the terminal may start the beam measurement that is transmitted in neighbor beams having different center frequencies.

By the above procedure, the terminal may complete the measurement on the serving beam and the neighbor beams, and perform the beam reselection based on the measured values.

Figure 37:
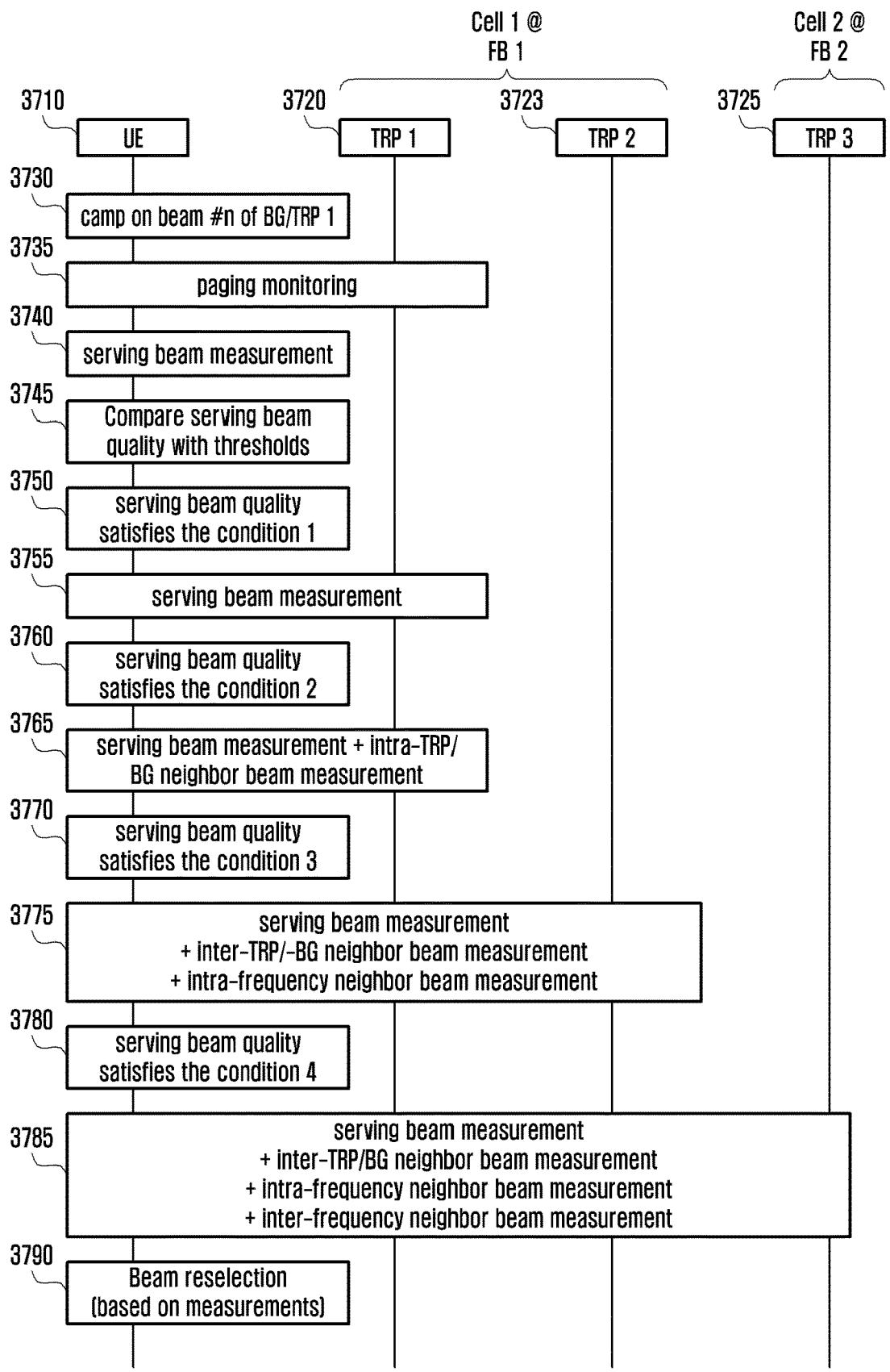
FIGS. 37 and 38 illustrate an example 2 of the beam measurement for the NR system according to the embodiment of the present disclosure.
Figure 38:
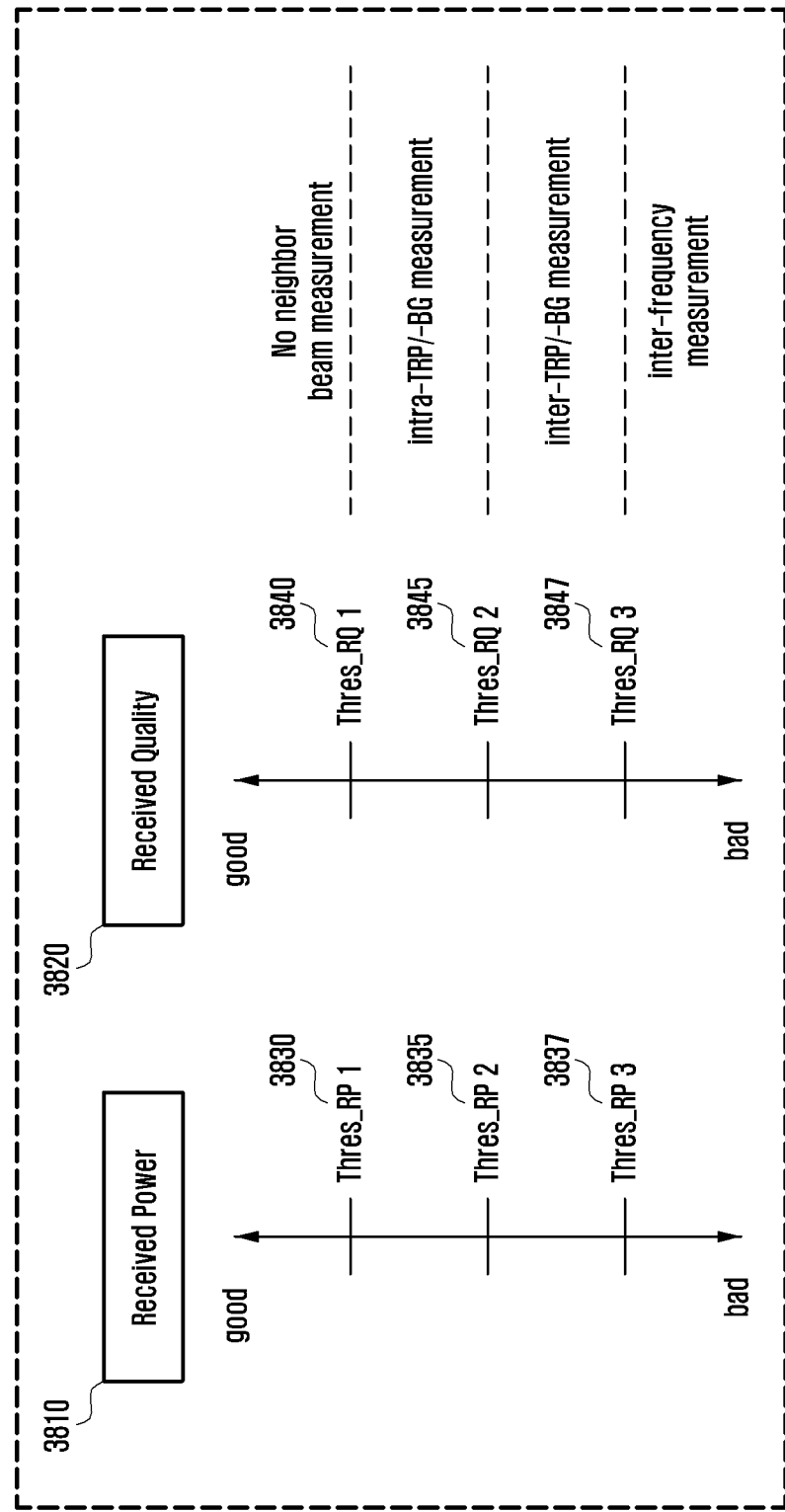

FIGS. 37 and 38 illustrate an example 2 of the beam measurement on the NR system according to the embodiment of the present disclosure.

According to the embodiment, conditions for setting up a differential threshold and determining a beam measurement according to the type of neighbor cells are defined.

Referring to FIG. 27, in step 3730, a terminal 3710 camps-on an n-th beam 3720 of any TRP/BG and in step 3735, the terminal 3710 may monitor a paging message.

In step 3740, the terminal 3710 may measure the strength and quality of the downlink beam reference signal of the serving beam. According to the embodiment, the downlink beam reference signal may be transmitted/received through an overhead subframe of the corresponding TRP/BG.

In step 3745, the terminal 3710 may compare the strength and quality of the downlink beam reference signal of the serving beam with a predetermined reference value. The terminal 3710 may determine the range of the beam to be measured based on the comparison result.

Referring to FIG. 38, three thresholds may be setup according to the strength 3810 of the received signal and the quality 3820 of the received signal, respectively, in order to determine the beam measurement range. For example, a threshold Thres_RP 1 (first received signal strength threshold) 3830, Thres_RP 2 (second received signal strength threshold) 3835, and Thres_RP 3 (third received signal strength threshold) 3837 may be defined depending on the strength 3810 of the received signal (Thres_RP 1>Thres_RP 2>Thres_RP 3). According to the embodiment, the number of thresholds may be equal to or less than 2 or equal to or greater than 4. For example, Thres_RQ 1 (first received signal quality threshold) 3840, Thres_RQ 2 (second received signal quality threshold) 3845, and Thres_RQ 3 (third received signal quality threshold) 3847 may be defined depending on the quality 3820 of the received signal (Thres_RQ 1>Thres_RQ 2>Thres_RQ 3). According to the embodiment, the number of thresholds may be equal to or less than 2 or equal to or greater than 4. The thresholds (Thres_RP 1, Thres_RP 2, Thres_RP 3, Thres_RQ 1, Thres_RQ 2, Thres_RQ 3) may be included in the system information, and the terminal 3710 may also receive them through the corresponding serving beam.

In addition, the terminal 3710 may determine the following four beam measurement ranges by comparing the measurement results with the received threshold values: (1) measure only for the serving beam (no neighbor beam measurement); (2) perform measurement on the neighbor beams belonging to the same; beam group as the serving beam (intra-TRP/BG measurement); (3) perform measurement on neighbor beams belonging to a different beam group than the serving beam and having the same center frequency as the serving beam (inter-TRP/BG measurement); and (4) perform measurement on the neighbor beams having different center frequencies from the serving beam (inter-frequency measurement).

Table mapping the condition and action to determine the range of the beam to be measured may be established as shown in the following [Table 1].

TABLE 1

| | Condition | | | Action |
|---|---|---|---|---|
| 1 | Measured RP > Thres_RP 1 | AND | Measured RQ > Thres_RQ 1 | Serving beam measurement |
| 2 | Thres_RP 1 > Measured RP > Thres_RP 2 | AND | Measured RQ > Thres_RQ 2 | Serving beam measurement & intra-TRP/-BG measurement |
| | Measured RP > Thres_RP 2 | AND | Thres_RQ 1 > Measured RQ > Thres_RQ 2 | |
| 3 | Thres_RP 2 > Measured RP > Thres_RP 3 | AND | Measured RQ > Thres_RQ 3 | Serving beam measurement & intra-TRP/BG measurement & inter-TRP/-BG measurement |
| | Measured RP > Thres_RP 3 | AND | Thres_RQ 2 > Measured RQ > Thres_RQ 3 | |
| 4 | Thres_RP 3 > Measured RP | OR | Measured RQ < Thres_RQ 3 | Serving beam measurement & intra-TRP/-BG measurement & inter-TRP/-BG measurement & inter-frequency measurement |

The following operation is a step of determining the range of the beam to be measured with reference to the above table.

Referring again to FIG. 37, if the serving beam reference signal strength and quality meet a first condition in step 3750, the terminal 3710 may measure only the serving beam (e.g., a serving beam of TRP 1 3720) in step 3755.

In step 3760, if the serving beam reference signal strength and quality meet the second condition, the terminal 3710 may measure the neighbor beams (e.g., neighbor beams of the serving beam of the TRP 1 3720) belonging to the same beam group as the serving beam (e.g., the serving beam of TRP 1 3720) in step 3765.

In step 3770, if the serving beam reference signal strength and quality meet the third condition, the terminal 3710 may measure the neighbor beams (e.g., beams of TRP 2 3723) that belong to beam groups different from the serving beam (e.g., the serving beam of TRP 1 3720) and have the same central frequency FB 1 as that of the serving beam in step 3775.

In step 3780, if the serving beam reference signal strength and quality meet the fourth condition, the terminal 3710 may measure the neighbor beams (e.g., beams of TRP 3 3725) that has a central frequency FB 2 different from that of the serving beam (e.g., the serving beam of TRP 1 3720) in step 3785.

Thereafter, a new serving beam may be reselected based on the measurement result of the terminal 3710 in step 3790.

Figure 39:
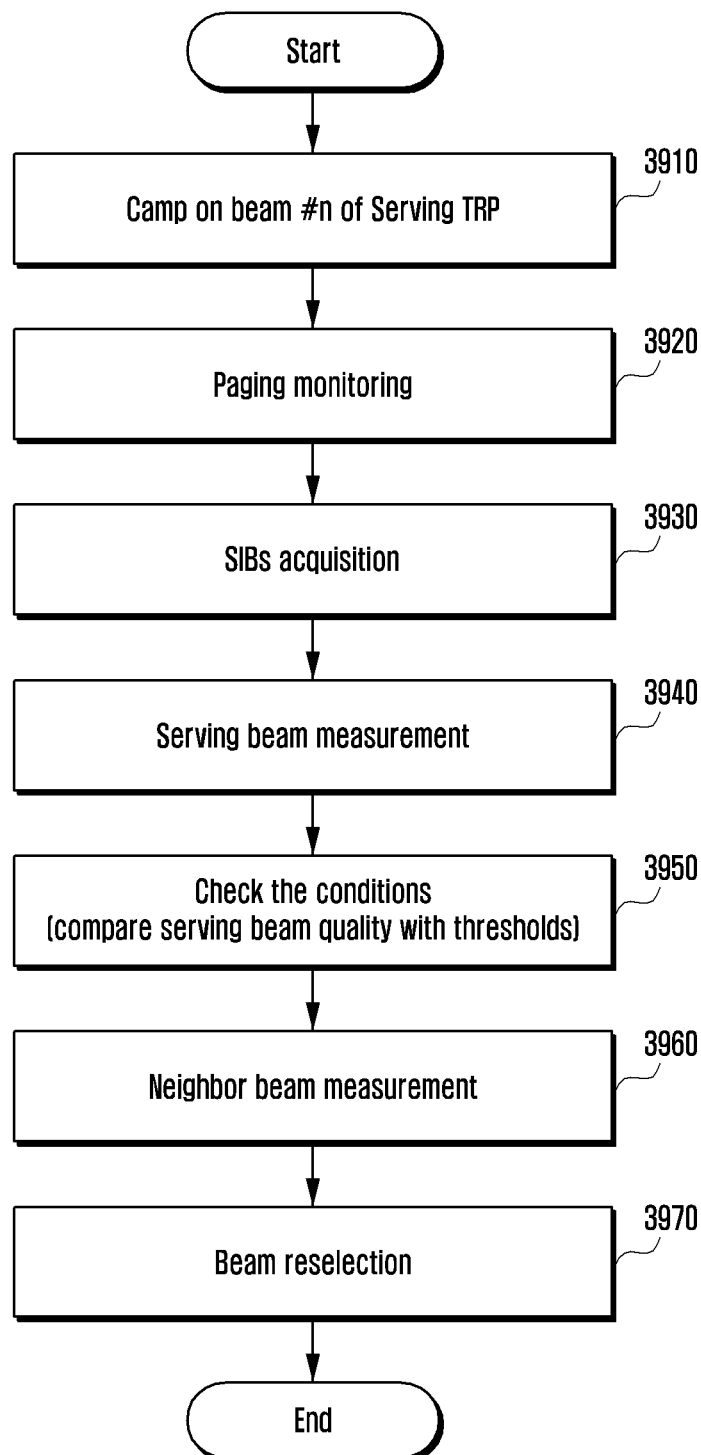
FIG. 39 illustrates an operation of a terminal of example 2 for a terminal to reselect a serving beam in the NR system according to the embodiment of the present disclosure.

FIG. 39 illustrates an operation of a terminal of Example 2 for a terminal to reselect a serving beam in the NR system according to the embodiment of the present disclosure.

Referring to FIG. 39, in step 3910, the NR terminal in the idle state may camp-on an n-th beam of the serving TRP and in step 3520, the terminal may monitor the paging message. In step 3930, the terminal may receive the system information through the serving beam, and in step 3940, the terminal may measure the serving beam.

In step 3950, the terminal may compare the measurement result of the serving beam with the threshold values for determining the beam measurement range to determine the operating conditions. At this time, the terminal may determine the beam to be measured by referring to the beam range determination table (Table 1) described above.

In step 3960, the beam of the corresponding TRP/BG may be measured according to the mapping rule determined in the previous step. In step 3970, the terminal may reselect the beam based on the measurement result of the neighbor beams.

Figure 40:
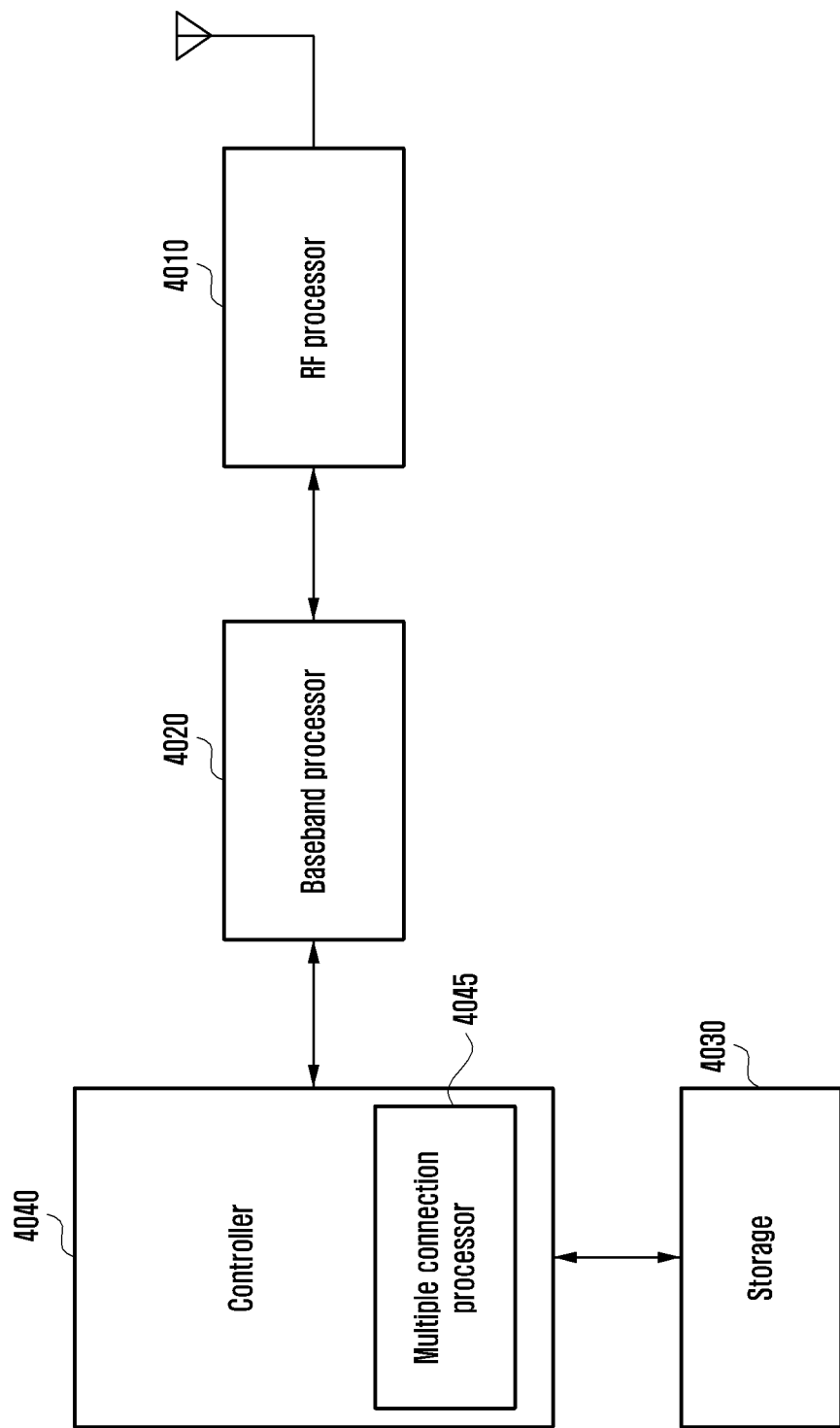
FIG. 40 illustrates a configuration of the terminal according to the embodiment of the present disclosure.

FIG. 40 illustrates a configuration of the terminal according to the embodiment of the present disclosure.

Referring to FIG. 40, the terminal according to the embodiment of the present disclosure may include a transceiver and a controller 3040. The terminal may further include a storage 4030. At this point, the transceiver may be a radio frequency (RF) processor 4010. According to the embodiment, the transceiver may include an RF processor 4010 and a baseband processor 4020.

The RF processor 4010 serves to transmit/receive a signal through a radio channel, such as band conversion and amplification of a signal. That is, the RF processor 4010 may up-convert a baseband signal provided from the baseband processor 4020 into an RF band signal and then transmit the RF band signal through an antenna and down-convert the RF band signal received through the antenna into the baseband signal. For example, the RF processor 4010 may include a transmitting filter, a receiving filter, an amplifier, a mixer, an oscillator, a digital to analog converter (DAC), an analog to digital converter (ADC), or the like. FIG. 40 illustrates only one antenna but the terminal may include a plurality of antennas. Further, the RF processor 4010 may include the plurality of RF chains. Further, the RF processor 4010 may perform the beamforming. For the beamforming, the RF processor 4010 may adjust a phase and a size of each of the signals transmitted and received through a plurality of antennas or antenna elements. In addition, the RF processor 4010 may perform MIMO and may receive a plurality of layers when performing a MIMO operation. The RF processor 4040 may perform reception beam sweeping by appropriately configuring a plurality of antennas or antenna elements under the control of the controller 4010 or adjust a direction and a beam width of the reception beam so that the reception beam is resonated with the transmission beam.

The baseband processor 4020 performs a conversion function between the baseband signal and the bit string according to a physical layer standard of the system. For example, when data are transmitted, the baseband processor 4020 generates complex symbols by coding and modulating a transmitted bit string. Further, when data are received, the baseband processor 4020 may recover the received bit string by demodulating and decoding the baseband signal provided from the RF processor 4010. For example, according to the OFDM scheme, when data are transmitted, the baseband processor 4020 may generate the complex symbols by coding and modulating the transmitted bit string, map the complex symbols to the sub-carriers, and then configure the OFDM symbols by the inverse fast Fourier transform (IFFT) operation and the CP (cyclic prefix) insertion. Further, when data are received, the baseband processor 4020 divides the baseband signal provided from the RF processor 4010 in an OFDM symbol unit and recovers the signals mapped to the sub-carriers by a fast Fourier transform (FFT) operation and then recovers the received bit string by the modulation and decoding.

The baseband processor 4020 and the RF processor 4010 may transmit and receive a signal as described above. Therefore, the baseband processor 4020 and the RF processor 4010 may be called a transmitter, a receiver, a transceiver, or a communicator. Further, at least one of the baseband processor 4020 and the RF processor 4010 may include a plurality of communication modules to support a plurality of different radio access technologies. Further, at least one of the baseband processor 4020 and the RF processor 4010 may include different communication modules to process signals in different frequency bands. For example, the different wireless access technologies may include an LTE network, an NR network, and the like. Further, the different frequency bands may include a super high frequency (SHF) (for example: 2.5 GHz, 5 GHz, or the like) band, a millimeter wave (for example, 60 GHz, or the like) band.

The storage 4030 stores data such as basic programs, application programs, and configuration information for the operation of the terminal. The storage 4030 may provide the stored data according to the request of the controller 4040.

The controller 4040 may control the overall operations of the terminal to perform any one operation of the above-described embodiments. For example, the controller 4040 may transmit/receive a signal through the baseband processor 4020 and the RF processor 4010. Further, the controller 4040 may record and read data in and from the storage 4030. For this purpose, the controller 4040 may include a circuit, an application-specific circuit, or at least one processor. For example, the controller 4040 may include a communication processor (CP) performing a control for communication and an application processor (AP) controlling a higher layer such as the application programs. In addition, the operations of the terminal may be realized by including a memory device storing the corresponding program code in any component of the terminal. That is, the controller 4040 may execute the above-described operations by reading and executing the program code stored in the memory device by a processor, a central processing unit (CPU) or the like. In addition, according to the embodiment of the present disclosure, the controller 4040 may include a multiple connection processor 4045 that performs processing to be operated in a multi connection mode. The controller 4040 may be electrically connected to other components, for example, the transceiver 4010.

Figure 41:
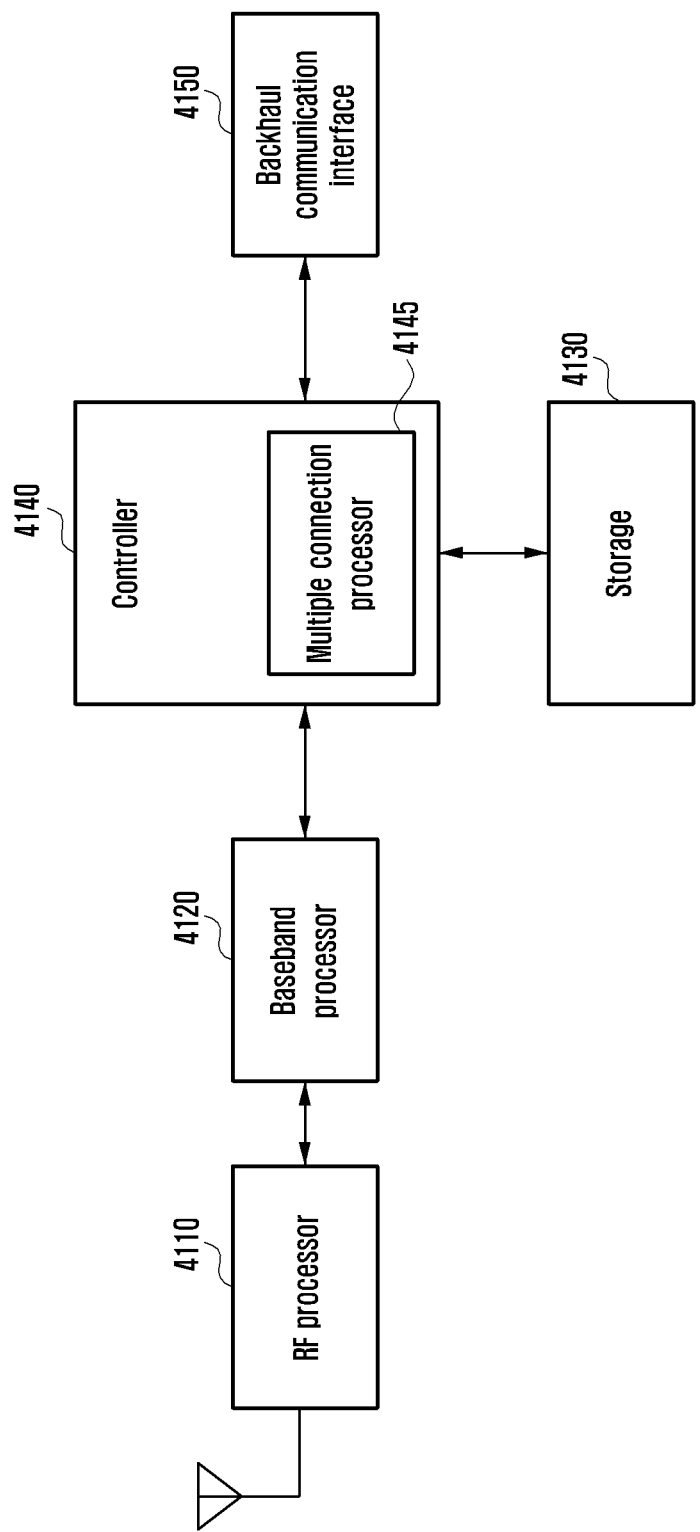
FIG. 41 illustrates a configuration of the base station according to the embodiment of the present disclosure.

FIG. 41 illustrates a configuration of the base station according to the embodiment of the present disclosure.

Referring to FIG. 41, the base station (or transmission reception point (TRP)) according to the embodiment of the present disclosure may include a transceiver and the controller 4140. The base station may further include a backhaul communication interface 4150 and a storage 4130. At this point, the transceiver may be a radio frequency (RF) processor 4110. According to the embodiment, the transceiver may include an RF processor 4110 and a baseband processor 4120.

The RF processor 4110 serves to transmit/receive a signal through a radio channel, such as band conversion and amplification of a signal. That is, the RF processor 4110 may up-convert a baseband signal provided from the baseband processor 4120 into an RF band signal and then transmit the RF band signal through an antenna and down-convert the RF band signal received through the antenna into the baseband signal. For example, the RF processor 4110 may include a transmitting filter, a receiving filter, an amplifier, a mixer, an oscillator, a DAC, an ADC, etc. FIG. 41 illustrates only one antenna but the base station may include a plurality of antennas. Further, the RF processor 4110 may include the plurality of RF chains. Further, the RF processor 4110 may perform the beamforming. For the beamforming, the RF processor 4110 may adjust a phase and a size of each of the signals transmitted and received through a plurality of antennas or antenna elements. The RF processor 4110 may perform a downlink MIMO operation by transmitting one or more layers.

The baseband processor 4120 performs a conversion function between the baseband signal and the bit string according to a physical layer standard of the system. For example, when data are transmitted, the baseband processor 4120 generates complex symbols by coding and modulating a transmitted bit string. Further, when data are received, the baseband processor 4120 recovers the received bit string by demodulating and decoding the baseband signal provided from the RF processor 4110. For example, according to the OFDM scheme, when data are transmitted, the baseband processor 4120 generates the complex symbols by coding and modulating the transmitting bit string, maps the complex symbols to the sub-carriers, and then performs the IFFT operation and the CP insertion to configure the OFDM symbols. Further, when data are received, the baseband processor 4120 divides the baseband signal provided from the RF processor 4110 in an OFDM symbol unit and recovers the signals mapped to the sub-carriers by an FFT operation and then recovers the received bit string by the modulation and decoding.

The baseband processor 4120 and the RF processor 4110 may transmit and receive a signal as described above. Therefore, the baseband processor 4120 and the RF processor 4110 may be called a transmitter, a receiver, a transceiver, a communication interface, or a wireless communication interface. Further, at least one of the baseband processor 4120 and the RF processor 4110 may include a plurality of communication modules to support a plurality of different radio access technologies. Further, at least one of the baseband processor 4120 and the RF processor 4110 may include different communication modules to process signals in different frequency bands. For example, different radio access technologies may include a wireless LAN (for example, IEEE 802.11 or the like), a cellular network (for example, LTE or the like), or the like. Further, the different frequency bands may include a super high frequency (SHF) (for example: 2.5 GHz, 5 GHz, or the like) band, a millimeter wave (for example, 60 GHz, or the like) band.

The backhaul communicator 4130 provides an interface for performing communication with other nodes within the network. That is, the backhaul communication interface 4130 may convert bit strings transmitted from the base station to other nodes, for example, an auxiliary base station (or other neighbor base stations), a core network, etc., into physical signals and converts the physical signals received from other nodes into bit strings.

The storage 4130 may store data such as basic programs, application programs, and configuration information for the operation of the base station. In particular, the storage 4130 may store the information on the bearer allocated to the accessed terminal, the measured results reported from the accessed terminal, etc. Further, the storage 4130 may store information that is a determination criterion on whether to provide a multiple connection to the terminal or stop the multiple connection to the terminal. The storage 4130 may provide the stored data according to the request of the controller 4140.

The controller 4140 may control the overall operations of the base station to perform any one operation of the above-described embodiments. For example, the controller 4140 may transmit/receive a signal through the baseband processor 4120 and the RF processor 4110 or the backhaul communication interface 4150. Further, the controller 4140 may record and read data in and from the storage 4130. For this purpose, the controller 4140 may include a circuit, an application-specific circuit, or at least one processor. For example, the controller 4140 may include a communication processor (CP) performing a control for communication and an application processor (AP) controlling a higher layer such as the application programs. In addition, the operations of the base station may be realized by including a memory device storing the corresponding program code in any component of the terminal. That is, the controller 4140 may execute the above-described operations by reading and executing the program code stored in the memory device by a processor, a central processing unit (CPU) or the like. In addition, according to the embodiment of the present disclosure, the controller 4140 may include a multiple connection processor 4145 that performs processing to be operated in a multi connection mode. The controller 4140 may be electrically connected to other components, for example, the transceiver 4110.

In the detailed embodiments of the present disclosure, components included in the present disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

Although the exemplary embodiments of the present disclosure have been disclosed for illustrative purposes, various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

Hereinafter, an operation principle of the present disclosure will be described in detail with reference to the accompanying drawings. Hereinafter, when it is determined that the detailed description of the known art related to the present disclosure may obscure the gist of the present disclosure, the detailed description thereof will be omitted. Further, the following terminologies are defined in consideration of the functions in the present disclosure and may be construed in different ways by the intention or practice of users and operators. Therefore, the definitions thereof should be construed based on the contents throughout the specification.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3rd generation partnership project long term evolution (3GPP LTE) that is the latest standard among the currently communication standards. However, the present disclosure is not limited to the terms and names but may also be identically applied to the system according to other standards. In particular, the present disclosure may be applied to 3GPP new radio (NR: 5G mobile communication standard).

Figure 42:
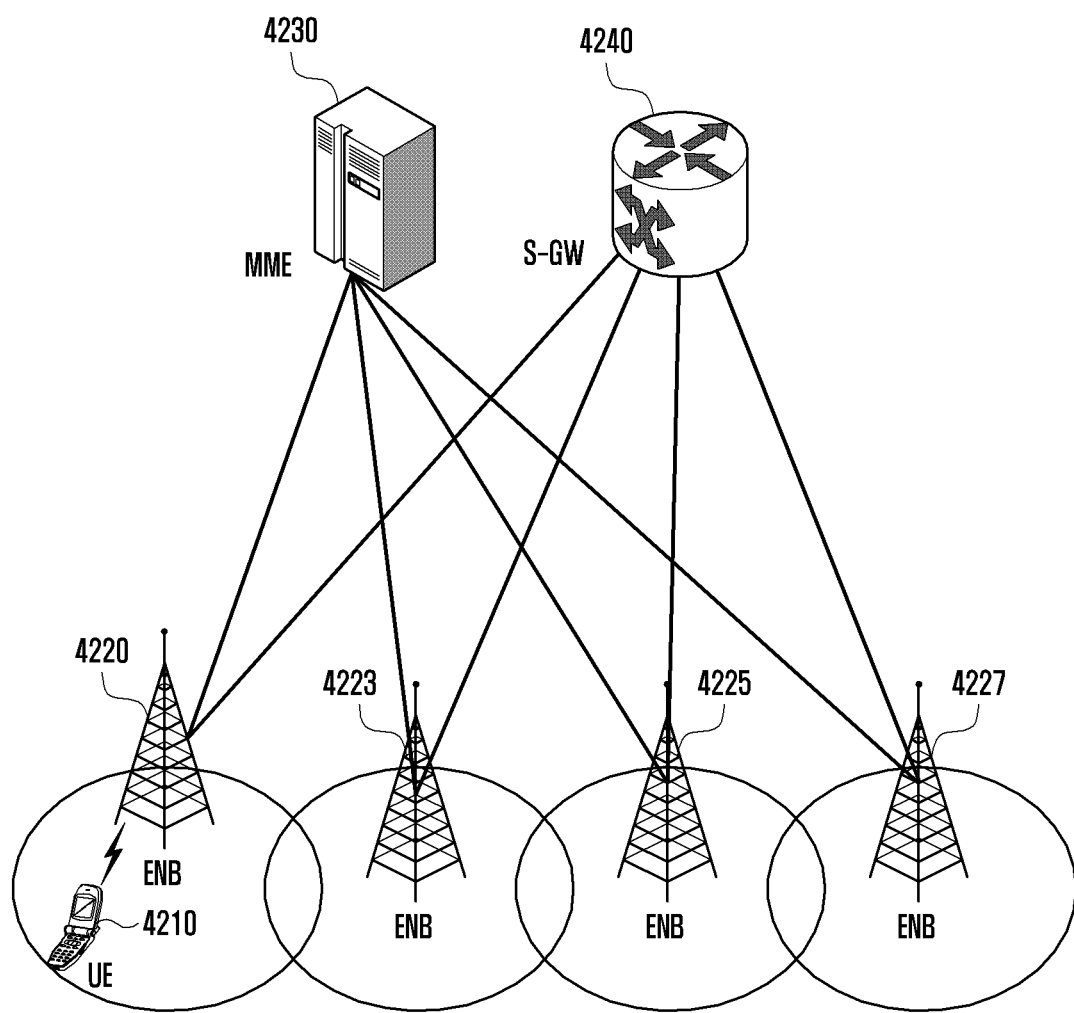
FIG. 42 illustrates an example of the network structure of the LTE system according to the embodiment of the present disclosure.

FIG. 42 illustrates an example of a network structure of an LTE system according to an embodiment of the present disclosure.

Referring to FIG. 42, a wireless communication system (e.g., an LTE system) may include a plurality of base stations (evolved node B (eNB)) 4220, 4223, 4225, and 4227, a mobility management entity (MME) 4230, and a serving gateway (S-GW) 4240. User equipment (UE) (or terminal) 4210 is connected to an external network through the base stations 4220, 4223, 4225, and 4227 and the S-GW 4240.

The base stations 4220, 4223, 4225, and 4227 are access nodes of a cellular network and provide a wireless access to terminals 4210 that are connected to the network. That is, in order to serve traffic of users, the BSs 4220, 4223, 4225, and 4227 collect and schedule state information such as a buffer state, an available transmission power state, and a channel state of the terminals 4210 to support a connection between the terminal 4210 and a core network (CN). The MME 4230 is an apparatus serving to perform various control functions as well as a mobility management function for the terminal 4210 and is connected to the plurality of base stations 4220, 4223, 4225, and 4227. Further, the S-GW 4240 is an apparatus providing a data bearer. Further, the MME 4230 and the S-GW 4240 may further perform authentication, bearer management, etc., on the terminal 4210 connected to the network and process packets arriving from the base stations 4220, 4223, 4225, and 4227 and packets to be transmitted to the base stations 4220, 4223, 4225, and 4227.

Figure 43:
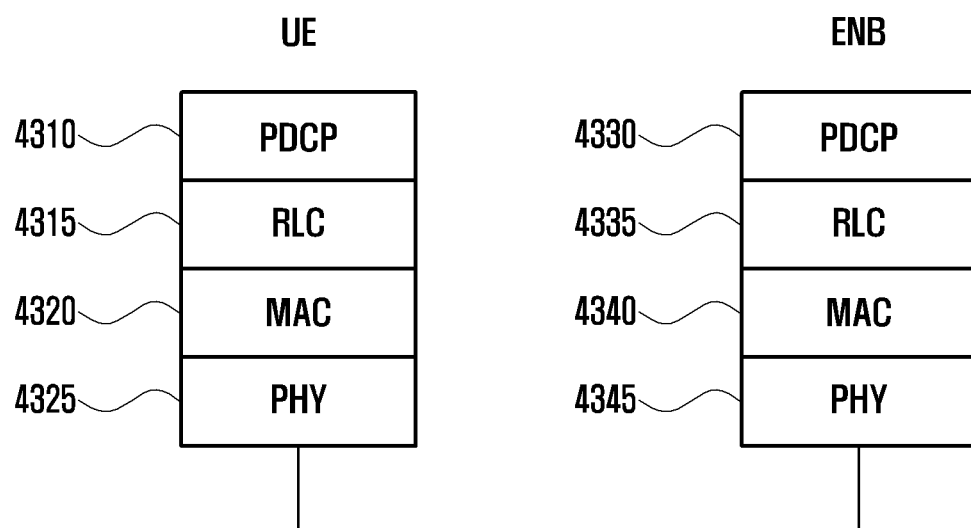
FIG. 43 illustrates a radio protocol structure of the LTE system according to the embodiment of the present disclosure.

FIG. 43 illustrates a radio protocol structure of the LTE system according to the embodiment of the present disclosure.

Referring to FIG. 43, a radio protocol of an LTE system consists of packet data convergence protocols (PDCPs) 4310 and 4330, radio link controls (RLCs) 4315 and 4335, and medium access controls (MMCs) 215 and 230 in the UE and the BS (ENB), respectively. The PDCPs 4310 and 4330 take charge of the operation of the IP header compression/recovery, etc., and the RLCs 4315 and 4335 reconfigure the PDCP packet data unit (PDU) at an appropriate size to perform an automatic repeat reQuest (ARQ) operation, or the like. The MACs 4320 and 4340 are connected to several RLC layer apparatuses configured in one terminal and performs an operation of multiplexing RLC PDUs in an MAC PDU and demultiplexing the RLC PDUs from the MAC PDU. Physical layers (PHYs) 4325 and 4345 perform an operation of channel-coding and modulating higher layer data; making the higher layer data into an OFDM symbol, and transmitting the higher layer data to the radio channel or an operation of demodulating the OFDM symbol received through the radio channel, channel-decoding the OFDM symbol, and transmitting the OFDM symbol to a higher layer. In addition, even the physical layers 4325 and 4345 also use a hybrid automatic repeat request (HARQ) for additional error correction and may transmit, in 1 bit, whether a receiving end receives packets transmitted from a transmitting end. This is called HARQ ACK/NACK information. Downlink HARQ ACK/NACK information on an uplink transmission may be transmitted through a physical channel of a physical hybrid-ARQ indicator channel (PHICH) and uplink HARQ ACK/NACK information on a downlink transmission may be transmitted through a physical channel of a physical uplink control channel (PUCCH) or a physical uplink shared channel (PUSCH).

As the HARQ transmission scheme, there are asynchronous HARQ and synchronous HARQ. The asynchronous HARQ is a scheme in which retransmission timing is not fixed when a (re)transmission fails and the synchronous HARQ is a scheme in which retransmission timing is fixed (e.g., 8 ms) when a (re)transmission fails. In addition, a plurality of transmission and reception may be performed in parallel for the downlink and the uplink to one terminal, and each transmission is divided into HARQ process identifiers.

On the other hand, since the retransmission timing is not defined in the asynchronous HARQ, the base station provides information on which HARQ process this transmission belongs to and whether this transmission is initial transmission or retransmission through the physical downlink control channel (PDCCH) physical channel every time the retransmission is performed. More specifically, the information on which HARQ process the transmission belongs to is transmitted through a HARQ process ID field in the PDCCH, and the information on the initial transmission or retransmission may be transmitted through a new data indicator (NDI) bit in the PDCCH. At this time, if the NDI bit is not changed with respect to the existing value, it means the retransmission, and if the NDI bit is changed to other values, it means a new transmission. Accordingly, the terminal may receive the resource allocation information in the PDCCH transmitted by the base station to understand the details of the corresponding transmission, receive the actual data through the physical downlink shared channel (PDSCH) physical channel in the case of the downlink, and transmit actual data transmitted through the physical uplink shared channel (PUSCH) physical channel in the case of the uplink.

Meanwhile, although not illustrated in the present drawings, a radio resource control (RRC) layer is present at a higher part of the PDCP layers 4310 and 4330 of the terminal and the base station, and the RRC layer may receive and transmit connection and measurement related control messages for a radio resource control.

Figure 44:
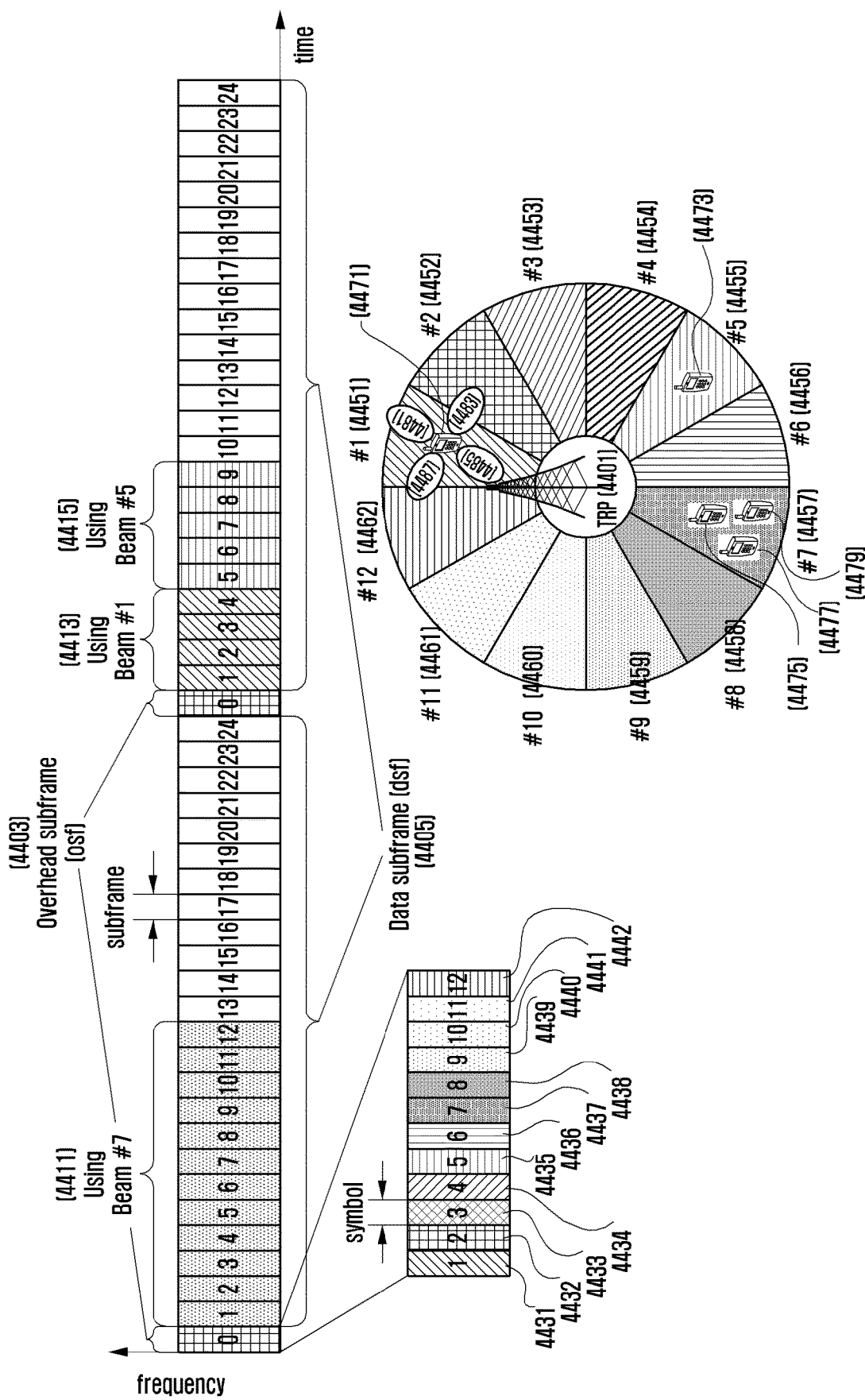
FIG. 44 illustrates an example of a frame structure in which a 5G system according to an embodiment of the present disclosure is used.

FIG. 44 illustrates an example of a frame structure in which a 5G system according to an embodiment of the present disclosure is used.

The 5G system may consider a scenario that is operated at a high frequency to secure a wide frequency bandwidth for a high transmission speed and a scenario that generates a beam to transmit data because of difficulty in a signal transmission at a high frequency.

Accordingly, it is possible to consider communicating scenarios using different beams when the base station or a transmission reception point (TRP) 4401 communicates with terminals 4471, 4473, 4475, and 4477 in a cell. That is, in the present exemplary drawing, scenarios in which the terminal 1 4471 perform communication using a beam #1 4451, a terminal 2 4473 performs communication using a beam #5 4455, and a terminal 3 4475, a terminal 4 4477, and a terminal 5 4479 perform communication using a beam #7 4457 are assumed.

In order to measure on what beam the terminals 4471, 4473, 4475 and 4477 communicate with the TRP 4401, an overhead subframe (osf) 4403 exists in time, and in the osf 4403, the base station 4401 may use different beams for each symbol (or over multiple symbols) to transmit a reference signal. In the present exemplary drawings, it is assumed that the beam transmitted by the base station 4401 includes 12 beams from a beam #1 4451 to a beam #12 4462 and in the osf 4403, different beams are transmitted while being swept every symbol. In other words, each beam is transmitted to each symbol (e.g., transmission of beam #1 4451 in the first symbol 4431 and transmission of beam #2 to beam #12 4452, 4453, 4454, 4455, 4456, 4457, 4458, 4459, 4460, 4461, and 4462, respectively, in second symbol to twelfth symbols 4432, 4433, 4434, 4435, 4436, 4437, 4438, 4439, 4440, 4441, and 4442), such that the terminal may measure the osf 4403 to measure which one of the signals from which beam transmitted in osf 4403 is strongest.

In the present exemplary drawing, a scenario in which the corresponding OSF 4403 is repeated every 25 subframes is assumed, and the remaining 24 subframes are a data subframe (dsf) 4405 through which general data are transmitted and received.

Accordingly, in accordance with the scheduling of the base station 4401, a scenario in which the terminal 3 (4475), the terminal 4 (4477), and the terminal 5 (4479) communicate with each other using beam 7 4457 in common (4411), the terminal 1 4471 performs communication 4413 using the beam #1 4451, and the terminal 2 4473 performs communication 4415 using the beam #5 4455 is assumed.

The present exemplary drawing mainly illustrates a transmission beam #1 4451 to a transmission beam #12 4462 of the base station 4401, but the reception beam (e.g., reception beam #1 to reception beam #4 4481, 4483, 4485, and 4487 of the terminal 1 4471) of the terminal for receiving the transmission beam of the base station 4401 may be further considered. In the present exemplary drawing, the terminal 1 4471 has four beams 4481, 4483, 4485, and 4487, and may perform beam sweeping to determine which beam has the best reception performance. At this time, if a plurality of beams may not be used at the same time, one reception beam may be used for each osf 4403 and thus a plurality of osf 4403 is received as many as the number of reception beams, such that the transmission beam and the reception beam may be found.

Figure 45:
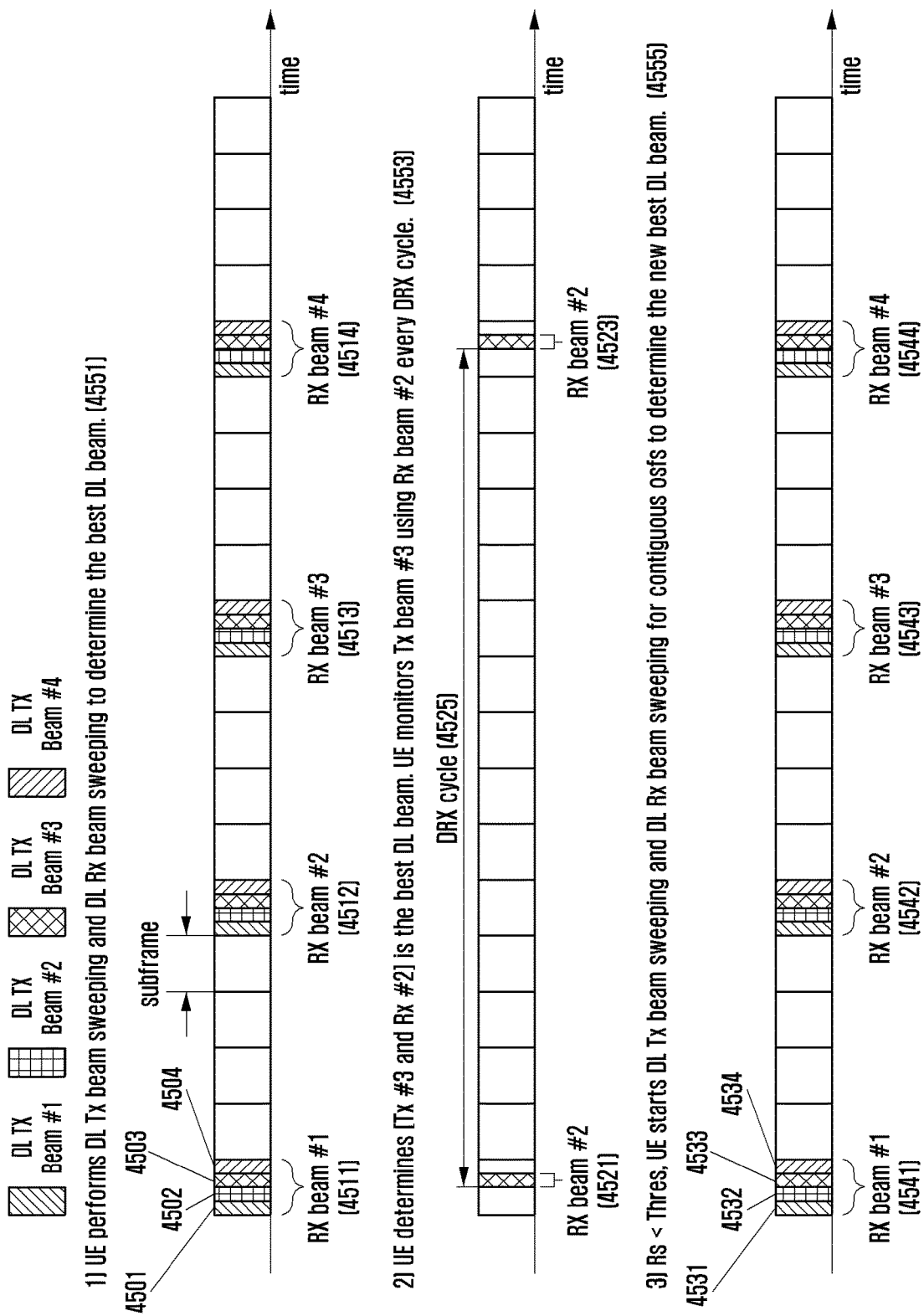
FIG. 45 illustrates a beam adjusting method according to an embodiment of the present disclosure.

FIG. 45 illustrates a beam adjusting method according to an embodiment of the present disclosure.

FIG. 45 illustrates an example of a frame structure as illustrated in FIG. 44, in which the downlink transmission beams (DL TX beams) 4501, 4502, 4503 and 4504 transmitted by the base station are swept in the osf which is a scenario repeated with a predetermined cycle.

The terminal is operated in the connected mode in which the terminal may be connected to the base station to perform communication that may transmit/receive data between the terminal and the base station and a sleep/idle mode in which the terminal monitors (which is referred to as paging) only when there is the downlink traffic in a set cycle (if there is no data to be transmitted/received) and does not transmit/receive data in the remaining cycle. To receive the paging even in the sleep state, the terminal needs to continuously search for neighbor base stations. If the beam is used as in the present disclosure, the terminal needs to search for and select an optimal base transmission beam and a terminal reception beam even in the selected base station.

In this manner, if the terminal fails to monitor and determine the base station transmission beam and the terminal reception beam in the sleep mode, the terminal may perform the measurement on all combinations at the corresponding base station. For example, it is assumed in the present scenario that the base station has four TX beams, and even the terminal may also have four downlink received beams (DL RX beams) for the downlink. In this case, the terminal may perform all measurements 4511, 4512, 4513, and 4514 by changing the reception beam of the terminal every osf using each reception beam of the terminal. For the measurements 4511, 4512, 4513, and 4514, the terminal may synchronize the downlink according to the synchronization signal from the base station to acquire the timing of each subframe, such that it may be known whether the specific subframe is osf or dsf. The terminal determines whether the downlink reference signal of the base station transmitted to the TX Beam of the base station satisfies the predetermined conditions through the measurement procedures 4511, 4512, 4513, and 4514. If it is determined that the downlink reference signal satisfies the predetermined conditions, the terminal may consider the corresponding beam as a suitable beam. The terminal may camp-on the appropriate beam and then monitor the paging from the corresponding beam. Through the above procedure, the terminal may find the combination the best TX Beam from the base station and the RX Beam of the terminal (4551).

In the example illustrated in FIG. 45, it may be assumed that the TX Beam #3 and the RX Beam #2 are found by the procedure 4551. Then, the terminal no longer updates the measurement using each RX Beam for every osf as in the above-described 4551 procedure, and may have a predetermined discontinuous reception (DRX) cycle 4525 proposed by the present disclosure and use the current best RX beam (RX Beam #2 in the present example) to measure the current best TX beam (TX beam #3 in the present example) (4521, 4523). By doing so, the terminal may determine whether the signal strength/quality measured from the combination of TX Beam and RX Beam found in the 4551 procedure is equal to or greater than a predetermined level (for example, the first threshold) while reducing power consumption.

In the above example, it is assumed that only one selected RX Beam (RX Beam #2) is measured for convenience of explanation. However, in another embodiment, in order to further increase the reliability of reception, even the case in which other neighbor RX beams are additionally measured may be considered. That is, the number of downlink reception beams (reception beam width or sweeping length) in the downlink reception beam configuration may be determined by a combination (or the lower value of two) of information related to the number of reception beams supported by the terminal and a predetermined integer set in advance for each frequency band. If it is determined that the level is equal to or higher than the predetermined level, it may be determined by an equation using the downlink reference signal strength, the uplink correction factor, and a predetermined constant as inputs. The uplink correction factor may be determined by an equation using the uplink transmission beam configuration capability of the terminal and the power class of the terminal and the uplink transmission beam configuration capability of the terminal may be defined for each NR band supported by the terminal.

Meanwhile, according to the embodiment, the base station may transmit the configuration information for performing the measurement according to the DRX cycle to the terminal by broadcast. Alternatively, the base station may transmit the configuration information to the terminal through a control signal transmitted to a specific terminal. According to the embodiment, the configuration information may be transmitted to the terminal together with the reference signal BRS or may be transmitted as a separate signal. At this time, an example of the configuration information may include a DRX cycle, how many RX Beams are used to perform the measurement (i.e., RX Beam sweeping frequency), how many TX Beams the base station uses to transmit the BRS, a first threshold to be compared with the measured signal strength/quality, and the like.

If the measurement result in the 4553 procedure is equal to or less than a predetermined level, the terminal stops the DRX operation (i.e., 4553 procedure) to find a new combination of optimal TX Beam and RX Beam and perform the Rx Beam sweeping on n continuous osf to determine a new DL Tx Beam and DL Rx Beam That is, the base station may transmit the reference signal while changing the RX Beams 4531, 4532, 4533, and 4534 every osf. The terminal measures (4541, 4542, 4543, 4544) reference signals from all TX Beams of the terminal every osf to find a new combination of optimal TX beam and RX Beam (4555). If a predetermined reference or greater beam is found from the measurement result, the terminal returns to the DRX operation (that is, 4553 procedure), but if any combination of beams does not satisfy the above conditions, the terminal may search for other base stations or a TRP signal to find an appropriate combination of beams of the appropriate base station.

Figure 46:
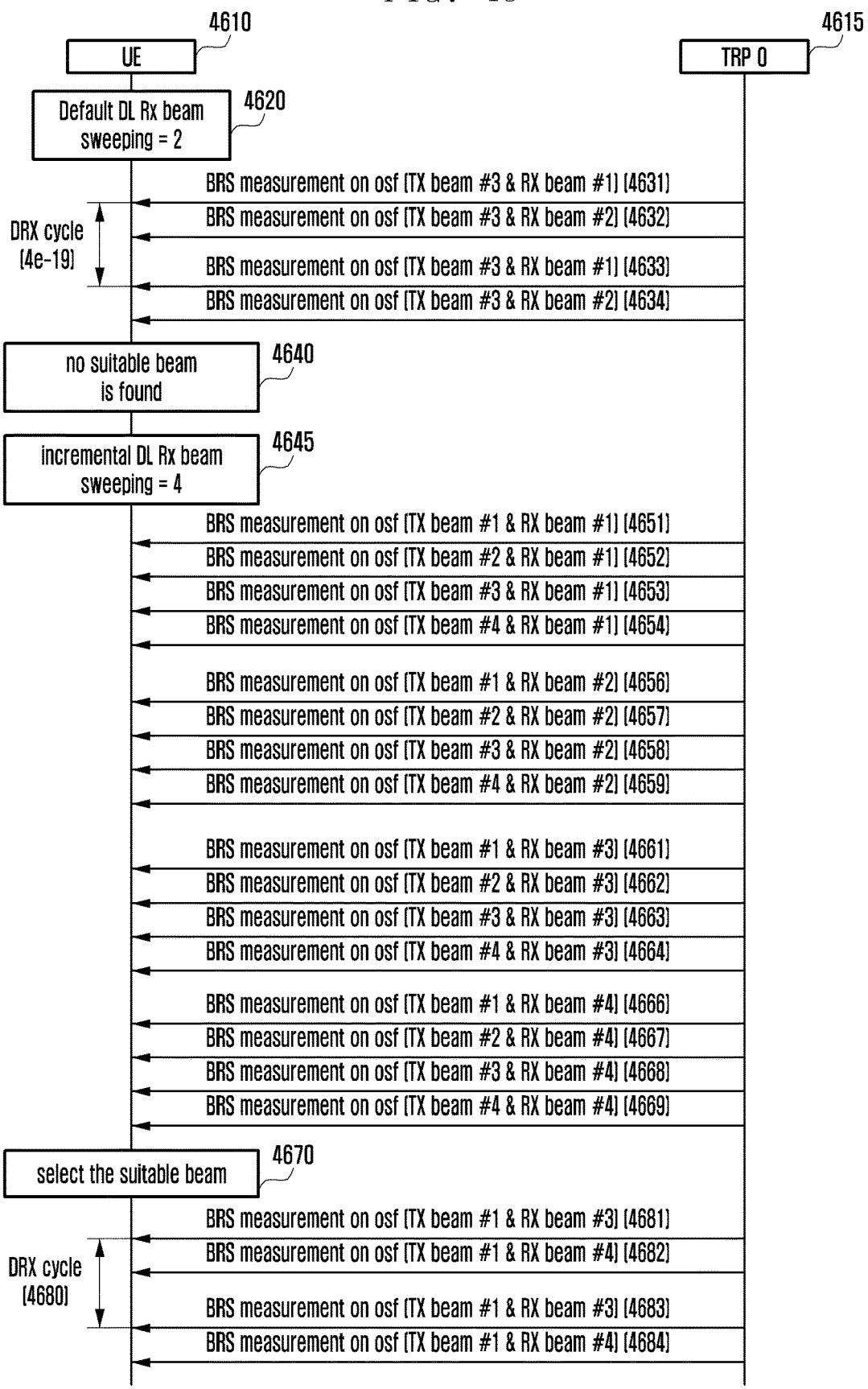
FIG. 46 illustrates a message flow between a terminal and a base station when the beam adjusting method according to an embodiment of the present disclosure is used.

FIG. 46 illustrates a message flow between a terminal and a base station when the beam adjusting method according to an embodiment of the present disclosure is used.

In FIG. 46, for convenience of description, it is assumed that the TX Beam of the optimal base station and the RX Beam (e.g., TX Beam #3, RX Beam #2) of the terminal are found in advance as in steps 4551 and 4553 of FIG. 45.

In this case, instead of measuring the reference signal from the base station 4615 using all the RX beams, the terminal 4610 may use a limited number of RX Beams (e.g., two (RX Beam #1 and RX Beam #2)) may be used to measure the reference signal from the base station 4615. That is, the terminal 4610 may set the default DL RX beam sweeping frequency is set to be 2 in step 4620 and may be set to measure the reference signal from the base station 4615 using the RX Beam #1 and the RX Beam #2.

Accordingly, in steps 4631 and 4631, the terminal 4610 may measure a beam reference signal (BRS) from the base station 4615 using Rx Beam #1 and RX Beam #2 for the previously measured TX Beam #3 as in the assumption. As described above in the part related to FIG. 45, the terminal may measure the corresponding beam in steps 4633 and 4634 according to the predetermined discontinuous reception (DRX) cycle 4630 without measuring every osf. That is, the terminal may measure the BRS from the base station 4615 using Rx Beam #1 and RX Beam #2 for TX Beam #3 in steps 4633 and 4634 according to the DRX cycle.

Thereafter, all the measurement results by the limited number of RX beams (e.g., Rx Beam #1 and RX Beam #2) may not satisfy the predetermined conditions. Accordingly, the terminal 4610 may not find an appropriate beam in step 4640.

Accordingly, in step 4645, the terminal 4610 may additionally measure the number of RX beams by increasing the number of RX beams. At this time, according to the embodiment, the terminal 4610 may perform measurement with a cycle of a number smaller than the DRX cycle 4630 or perform measurement on the continuous osf. In the present exemplary drawing, it is assumed that the number of RX Beams is increased to 4 (for example, RX Beam #1, RX Beam #2, RX Beam #3, and RX Beam #4). At this time, according to the embodiment, it is possible to perform the additional measurement by increasing the number of TX beams at the time of measurement every RX beam. In the present exemplary drawing, the case in which the measurement is performed by increasing the TX Beam reception from one (for example, TX Beam #3) to four (for example, TX Beams #1, TX Beams #2, TX Beams #3, and TX Beams #4). Accordingly, steps 4651, 4652, 4653, 4654, 4656, 4657, 4658, 4659, 4661, 4662, 4663, 4664, 4666, 4667, 4668 and 4669, the terminal 4610 may measure the BRSs of TX Beams (TX Beams #1, TX Beams #2, TX Beams #3, and TX Beams #4) that the base station 4615 transmits to each RX Beam (RX Beam #1, RX Beam #2, RX Beam #3, RX Beam #4).

The terminal 4610 measures the BRS according to the above procedure to find the combination of the optimal TX Beam and RX Beam satisfying the predetermined conditions. Although not illustrated in the exemplary drawing, if the optimal combination of TX Beam and RX Beam satisfying the predetermined conditions is not found from the corresponding BS 4615, the terminal 4610 may also find the beams of other base stations.

In the present exemplary drawing, in step 4670, it nay be assumed that the terminal 4610 finds the TX Beam #1 and the RX Beam #3 in an optimal combination. In this case, in steps 4681 and 4682, the terminal 4610 may again measure the signal strength/quality of the corresponding TX Beam (e.g., TX Beam #1) with the reduced number of RX Beams (e.g., two RX Beams (RX Beam #3, RX Beam #4)). The terminal 4610 may adjust the measurement cycle by using the DRX cycle 4680 to perform the measurement of the corresponding beam in steps 4683 and 4684, thereby reducing the power consumption of the terminal 4610.

Figure 47:
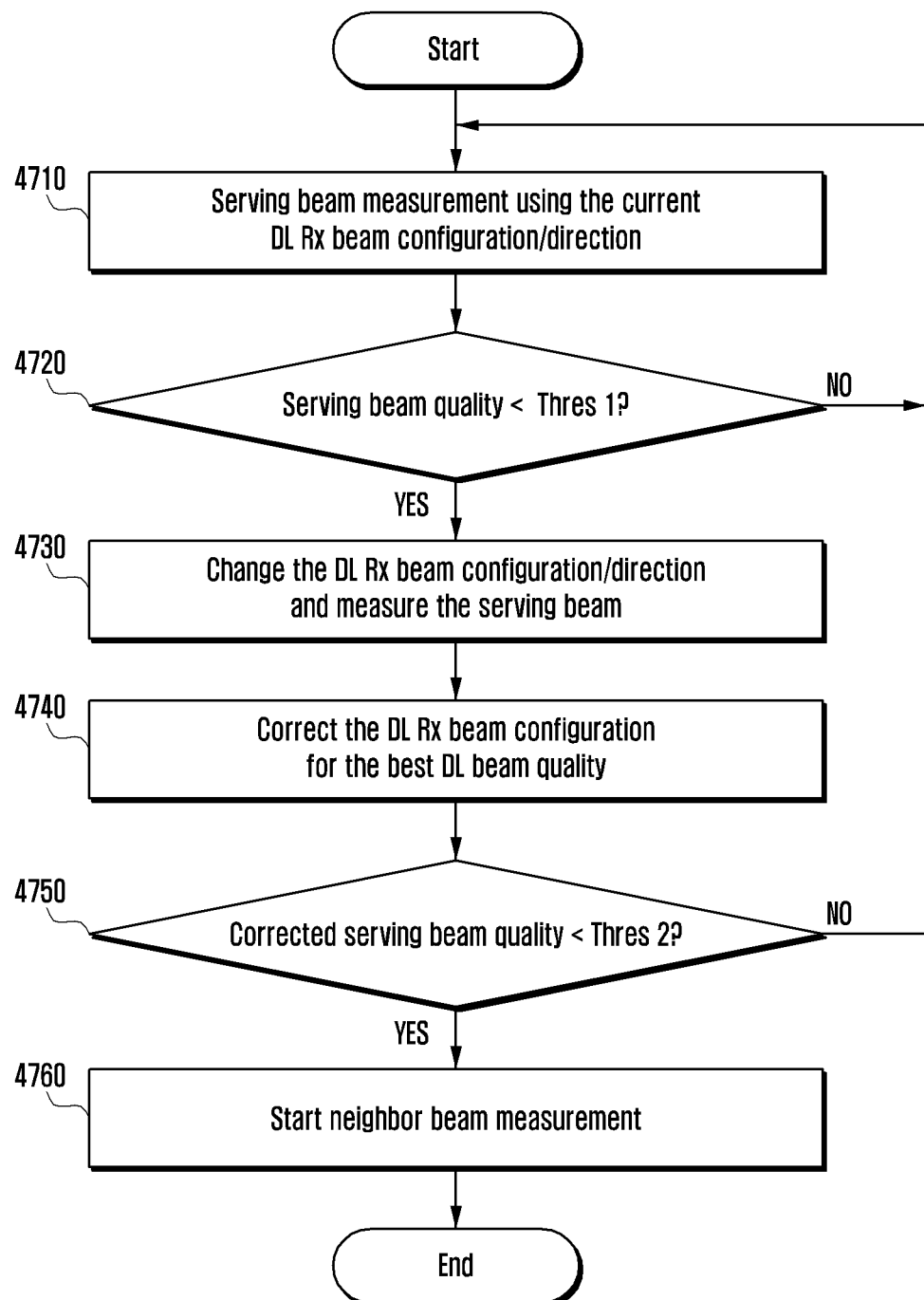
FIG. 47 illustrates a flow of the operation of the terminal according to the embodiment of the present disclosure.

FIG. 47 illustrates a flow of the operation of the terminal according to the embodiment of the present disclosure.

Referring to FIG. 47, in step 4710, the terminal may measure a reference signal according to the current downlink reception beam configuration from the base station that is currently camping-on or connected. In the present exemplary drawing, for convenience of explanation, as in step 4553 of FIG. 45, it is assumed that the terminal has already found the optimal TX Beam and RX Beam. Accordingly, a scenario in which the measurement is performed with a predetermined DRX cycle is assumed.

Thereafter, in step 4720, the terminal may determine whether all of the reference signal measurement results do not satisfy the predetermined condition according to the current configuration. For example, the terminal may determine whether the quality of the serving beam is smaller than a preset first threshold value Thres 1. If the quality of the serving beam is not less than the preset first threshold Thres 1, the terminal may return to step 4710 and perform the measurements with a predetermined DRX cycle.

On the other hand, if the quality of the serving beam is smaller than a preset first threshold value Thres 1, in step 4730, the terminal may additionally perform the measurement by adjusting the reception beam configuration and direction. The reception beam configuration includes a method for additionally measuring by increasing the number of reception beams.

At this time, in step 4740, the terminal may perform a measurement with a period of a number smaller than the DRX period or perform a measurement on a continuous osf to find a combination of optimal TX beam and RX beam. In step 4750, the terminal can determine whether the combination of optimal TX beam and the RX beam is found. For example, the terminal may determine whether the modified quality of the serving beam, that is, the measured reception quality of the beam is smaller than a preset second threshold value Thres 2. If the measured reception quality of beam is not smaller than the second threshold Thres 2, the terminal may determine the measured reception quality of beam as the combination of optimal TX Beam and RX Beam. The terminal returns to step 4710 and may perform the measurement with the predetermined DRX period.

If the beam combination of the base station satisfying the predetermined conditions is not found by the above procedure, the terminal may start to find beams of other base stations in step 4760.

Figure 48:
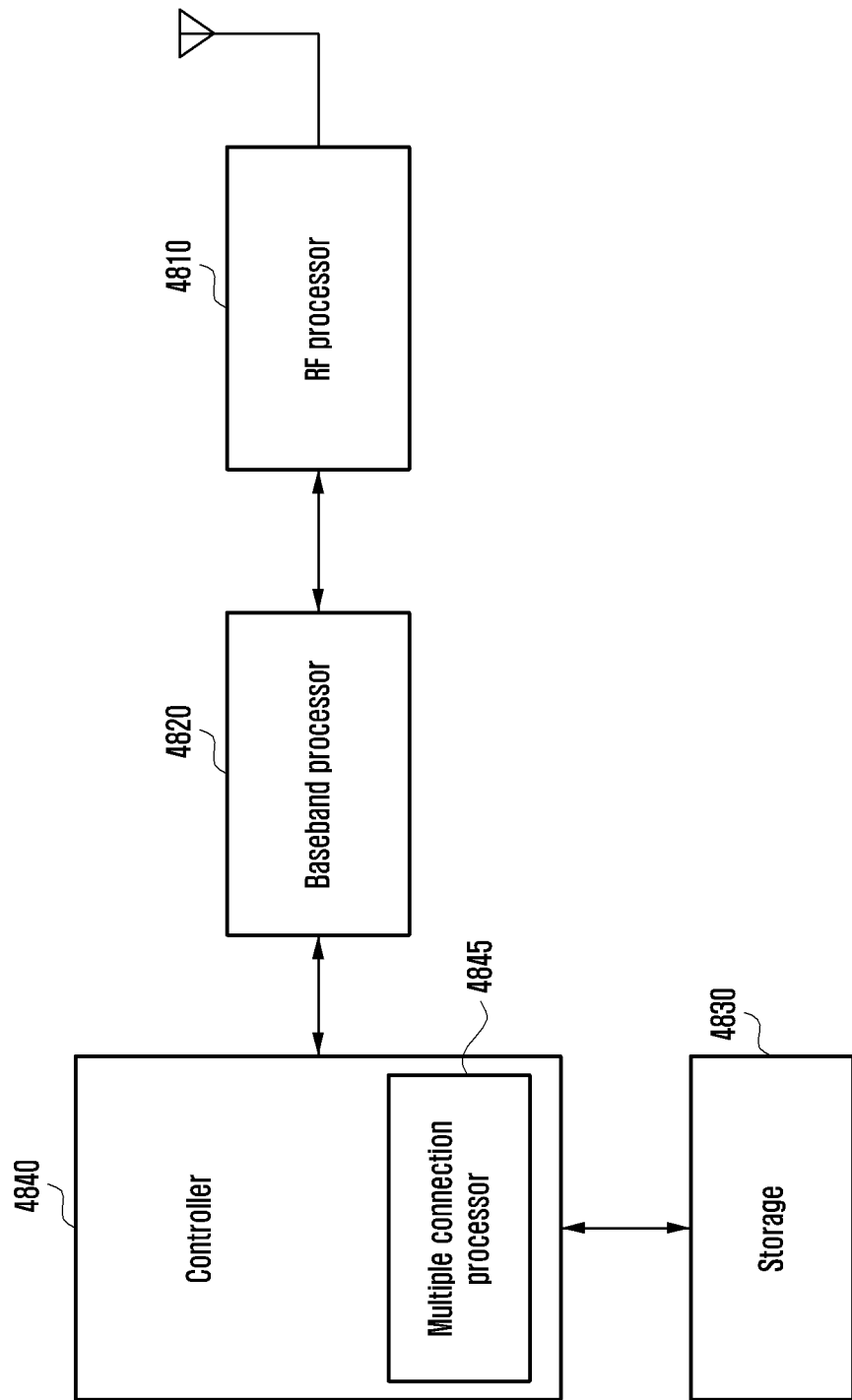
FIG. 48 illustrates a configuration of the terminal according to the embodiment of the present disclosure.

FIG. 48 illustrates a configuration of the terminal according to the embodiment of the present disclosure.

Referring to FIG. 48, the terminal according to one embodiment of the present disclosure may include a transceiver and a controller 4840. The terminal may further include a storage 4830. At this point, the transceiver may be a radio frequency (RF) processor 4810. According to the embodiment, the transceiver may include an RF processor 4810 and a baseband processor 4820.

The RF processor 4810 serves to transmit/receive a signal through a radio channel, such as band conversion and amplification of a signal. That is, the RF processor 4810 may up-convert a baseband signal provided from the baseband processor 4820 into an RF band signal and then transmit the RF band signal through an antenna and down-convert the RF band signal received through the antenna into the baseband signal. For example, the RF processor 4810 may include a transmitting filter, a receiving filter, an amplifier, a mixer, an oscillator, a digital to analog converter (DAC), an analog to digital converter (ADC), or the like. FIG. 48 illustrates only one antenna but the terminal may include a plurality of antennas. Further, the RF processor 4810 may include the plurality of RF chains. Further, the RF processor 4810 may perform beamforming. For the beamforming, the RF processor 4810 may adjust a phase and a size of each of the signals transmitted and received through a plurality of antennas or antenna elements. In addition, the RF processor 4810 may perform MIMO and may receive a plurality of layers when performing a MIMO operation. The RF processor 4810 may perform reception beam sweeping by appropriately configuring a plurality of antennas or antenna elements under the control of the controller 4840 or adjust a direction and a beam width of the reception beam so that the reception beam is resonated with the transmission beam.

The baseband processor 4820 performs a conversion function between the baseband signal and the bit string according to a physical layer standard of the system. For example, when data are transmitted, the baseband processor 4820 generates complex symbols by coding and modulating a transmitting bit string. Further, when data are received, the baseband processor 4820 may recover a received bit string by demodulating and decoding the baseband signal provided from the RF processor 4810. For example, according to an orthogonal frequency division multiplexing (OFDM) scheme, when data are transmitted, the baseband processor 4820 may generate the complex symbols by coding and modulating the transmitted bit string, map the complex symbols to sub-carriers, and then configure OFDM symbols by an inverse fast Fourier transform (IFFT) operation and a cyclic prefix (CP) insertion. Further, when data are received, the baseband processor 4820 may segment the baseband signal provided from the RF processor 1410 in an OFDM symbol unit, recover the signals mapped to the sub-carriers by the fast Fourier transform (FFT) operation, and then recover the received bit string by the modulation and decoding.

The baseband processor 4820 and the RF processor 4810 may transmit and receive a signal as described above. Therefore, the baseband processor 4820 and the RF processor 4810 may be called a transmitter, a receiver, a transceiver, or a communicator. Further, at least one of the baseband processor 4820 and the RF processor 4810 may include different communication modules to process signals in different frequency bands. The different frequency bands may include a super high frequency (SHF)(for example: 0.5 GHz, 5 GHz, or the like) band, a millimeter wave (for example, 60 GHz, or the like) band.

The storage 4830 may store data such as basic programs, application programs, and configuration information for the operation of the terminal. The storage 4830 may provide the stored data according to the request of the controller 4840.

The controller 4840 may control the overall operations of the terminal to perform any one operation of the above-described embodiments. For example, the controller 4840 may transmit/receive a signal through the baseband processor 4820 and the RF processor 4810. Further, the controller 4840 may record and read data in and from the storage 4830. For this purpose, the controller 4840 may include a circuit, an application-specific circuit, or at least one processor. For example, the controller 4840 may include a communication processor (CP) performing a control for communication and an application processor (AP) controlling a higher layer such as the application programs. In addition, the operations of the terminal may be realized by including a memory device storing the corresponding program code in any component of the terminal. That is, the controller 4840 may execute the above-described operations by reading and executing the program code stored in the memory device by a processor, a central processing unit (CPU) or the like. The controller 1240 may be electrically connected to other components, for example, the transceiver 1210. According to the embodiment of the present disclosure, the controller 4840 includes a multiple connection processor 4845 that performs the processing to be operated in a multiple connection mode. For example, the controller 4840 may control the terminal to perform the procedure illustrated in the operation of the terminal illustrated in FIG. 47.

According to the embodiment of the present disclosure, the controller 4840 of the terminal may instruct the RF processor 4810 and the baseband processor 4820 of the terminal to measure different transmission beams transmitted by a specific base station using different beams of the terminal and find the optimal transmission beam and reception beam and then use the scheme proposed by the present disclosure to instruct the measurement using the specific transmission beam and reception beam at the predetermined DRX cycle.

The methods according to the embodiments described in claims or specification of the present disclosure may be implemented in hardware, software, or a combination of hardware and software.

When the methods are implemented in the software, a computer readable storage medium storing at least one program (software module) may be provided. At least one programs stored in the computer readable storage medium is configured to be executed by at least one processor within an electronic device. At least one program includes instructions that allow the electronic device to execute the methods according to the embodiments described in the claims or specification of the present disclosure.

The program (software module, software) may be stored a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage apparatuses, and a magnetic cassette. Alternatively, the programs may be stored in the memory that is configured of a combination of some or all of the memories. Further, each memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access an apparatus performing the embodiment of the present disclosure through an external port. Further, a separate storage device on the communication network may also access the apparatus performing the embodiment of the present disclosure.

In the detailed embodiments of the present disclosure, components included in the present disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

Although the exemplary embodiments of the present disclosure have been disclosed for illustrative purposes, various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

Hereinafter, if it is determined that the detailed description of the known art related to the present disclosure may obscure the gist of the present disclosure, the detailed description thereof will be omitted. Hereinafter, embodiments of the present disclosure will be described in detail with reference to the accompanying drawings.

The present disclosure relates to a method and apparatus for selecting, by a terminal including an NR communication apparatus and an LTE communication apparatus capable of communicating with an NR network and an LTE network, a network performing a wireless mobile communication, and the terminal operation may include the following steps of: applying a first method to acquire a public land mobile network (PLMN) identifier in the LTE network; applying a second method to acquire a PLMN identifier in the NR network; selecting a PLMN based on the acquired PLMN identifier; and initiating a mobile communication service in the selected PLMN.

The first method detects a carrier by scanning all RF channels, and acquires the PLMN identifier by receiving system information of a cell having the strongest signal strength among the cells of the detected carrier.

The second method detects the carrier by scanning the RF channels satisfying the condition A and acquiring the system information of the downlink beam satisfying the condition B among the downlink beams of the detected carriers to acquire the PLMN identifier.

In addition, the RF channel of the LTE is configured of a frequency domain having a first bandwidth and is specified by a predetermined integer called EARFCN. In addition, the RF channel of the NR is configured of a frequency domain having a second bandwidth and is specified by a predetermined integer called NARFCN.

An RF channel satisfying the condition A means an RF channel having a frequency lower than a predetermined value among the RF channels that may be scanned by the terminal or an RF channel having a frequency band in which an idle mode operation.

A downlink beam satisfying the condition B means a beam in which reference signal strength of the downlink beam is equal to or greater than a predetermined value or predetermined system information of the downlink beam can be received. At this time, the system information may not be the system information accommodating the PLMN identifier but may be system information transmitted at the same time as the beam reference signal, that is, the system information transmitted through the PBCH.

Figure 49:
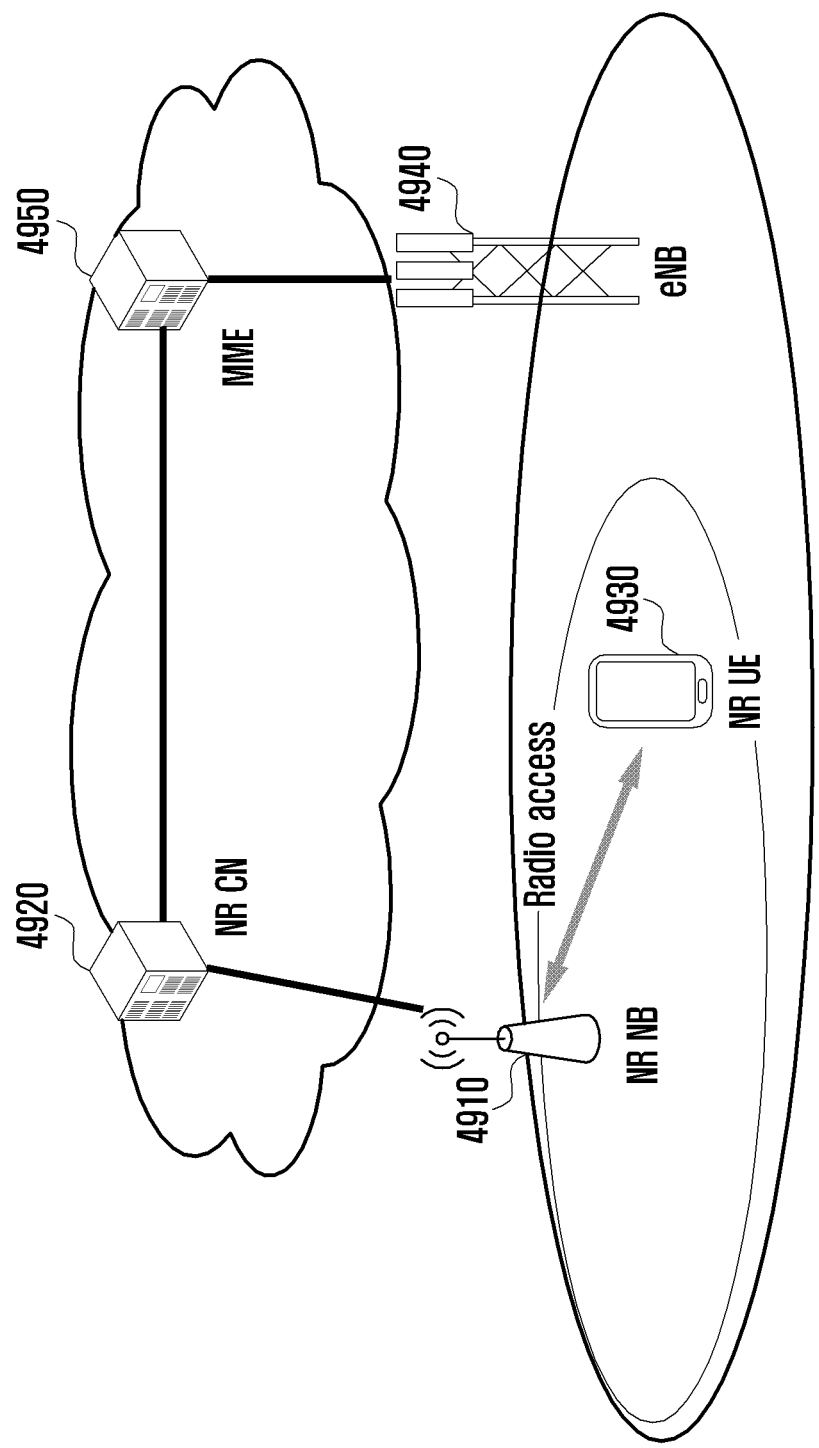
FIG. 49 illustrates a structure of a next generation mobile communication system according to an embodiment of the present disclosure.

FIG. 49 illustrates a structure of a next generation mobile communication system according to an embodiment of the present disclosure.

Referring to FIG. 49, as illustrated, a radio access network of a next generation mobile communication system includes a next generation base station (new radio node B (NR NB)) 4910 and a next generation core network (new radio core network (NR CN), access and mobility management function (AMF), a user plane function (UPF), a session management function (SMF), and the like) 4920. A user terminal (new radio user equipment (NR UE) or mobile station, terminal, UE) 4930 may be connected to an external network via the NR NB 4910 and the NR CN 4920.

Meanwhile, in FIG. 49, the NR NB 4910 may correspond to abase station (evolved node B (eNB)) 4940 of the existing LTE system. The NR NB 4910 is connected to the NR UE 4930 via a radio channel and may provide a service superior to the existing node B (base station) 4940. In the next generation mobile communication system, since all user traffics are served through a shared channel, an apparatus for collecting state information such as a buffer state, an available transmission power state, and a channel state of the UEs 4930 to perform scheduling is required. The NR NB 4910 may play a role of the apparatus. One NR NB 4910 may typically control multiple cells.

In order to realize super-high speed data transmission compared to the existing LTE, the next generation mobile communication system may have a bandwidth equal to or greater than a maximum bandwidth of the existing LTE, and may additionally apply a beamforming technique using orthogonal frequency division multiplexing (OFDM) as a radio access technology. Further, an adaptive modulation & coding (hereinafter, called AMC) scheme for determining a modulation scheme and a channel coding rate depending on a channel status of the terminal 4930 may be applied. The NR CN 4920 may perform functions such as mobility support, bearer setup, QoS setup, and the like. The NR CN 4920 is an apparatus that serves to perform various control functions as well as a mobility management function for the terminal 4930 and may be connected to the plurality of base stations 4910.

Also, the next generation mobile communication system may interwork with even the existing LTE system, and the NR CN 4920 may be connected to the MME 4950 through a network interface according to the embodiment. The MME 4950 is connected to the eNB 4940 which is the existing base station.

Figure 50:
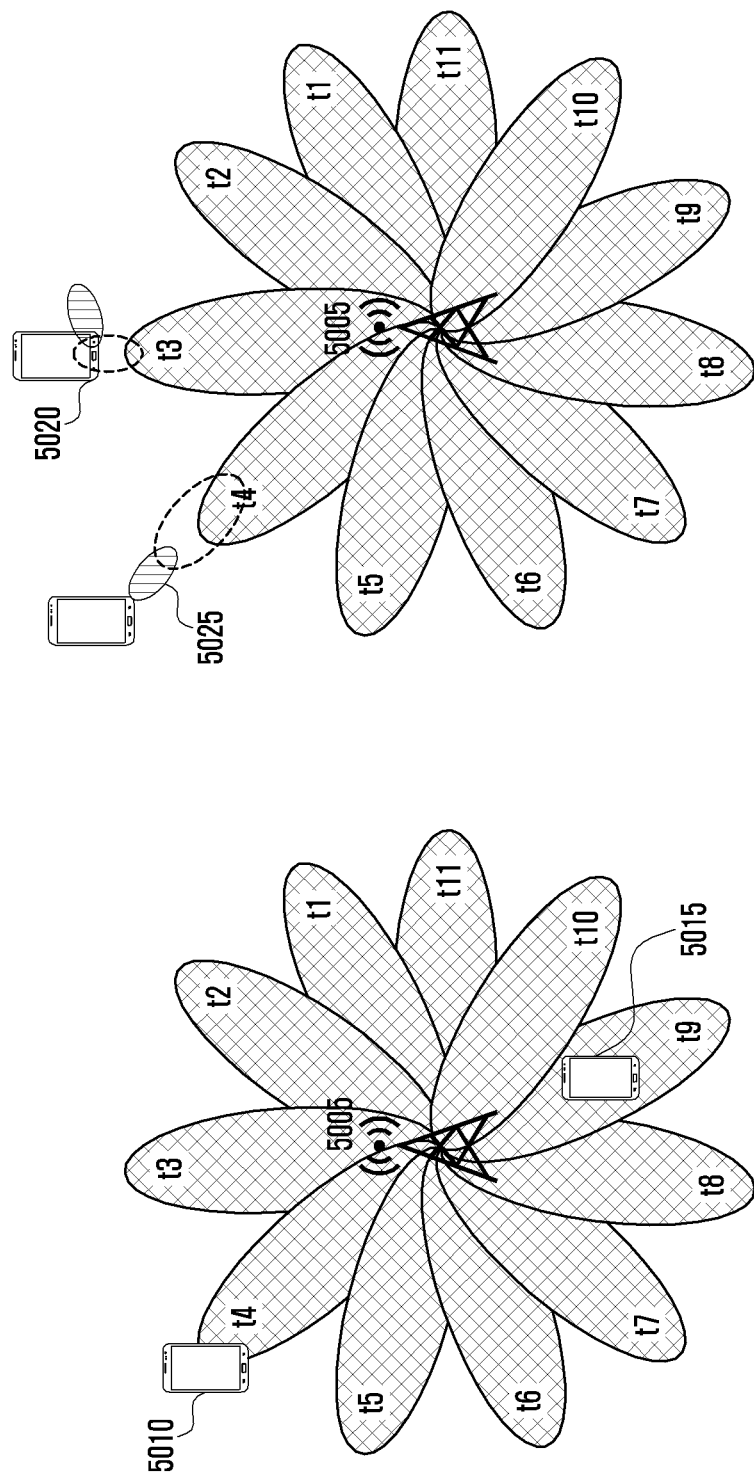
FIG. 50 illustrates a beam sweeping of the NR system according to the embodiment of the present disclosure.

FIG. 50 illustrates a beam sweeping of the NR system according to the embodiment of the present disclosure.

The NR aims to support the more increased data rate than the existing LTE. As a method for increasing a data transmission speed in NR, a method of transmitting a signal using a wide frequency band existing in a frequency band of 6 GHz or more is considered. That is, it is considered to increase the transmission rate by using a millimeter wave (mmWave) band like the 28 GHz band or the 60 GHz band. Since the frequency band considered for mmWave is relatively large in a magnitude of signal attenuation per distance, a directional beam-based transmission generated by using multiple antennas is required to ensure coverage. The directional beam-based transmission has a problem of difficulty in transmitting or receiving a signal at a location where no beam is formed, and a technique called beam sweeping is used to overcome the above problem. The beam sweeping is a technique that allows a transmitting apparatus to transmit a directional beam while sequentially sweeping or rotating a directional beam having a constant beam width and a receiving apparatus to receive a beam within a beam arrival distance of the transmitting apparatus.

For example, a transmission reception point (TRP) 5005 (which is an apparatus for transmitting and receiving a radio signal in a network, may be a 5G NB, and an apparatus connected to a 5G NB) may cover the beam in all directions for a predetermined period (e.g., t1 to t11) in which a directional beam having a predetermined width is transmitted in a predetermined direction at any time t1 and a directional beam having the same width is transmitted in different directions at time t2. As a result, for example, the downlink signal transmitted by the base station 5005 may reach the first terminal 5015 at t9 and reach the second terminal 5010 at t4.

The beam sweep is mainly used when the base station 5005 does not know the direction of the directional beams to be applied to the terminals 5010 and 5015. A common overhead signal to be transmitted to the idle state terminal may be transmitted through the beam sweeping.

In order to increase the efficiency of the beam, not only the transmitting directional beam but also the receiving directional beam may be used. If the receiving directional beam is used, the directivity/direction of the transmission beam and the directivity/direction of the reception beam need to be tuned with each other.

For example, even if the terminal is located in the area of the transmission beam, as illustrated as 5020, the terminal does not receive the transmission beam unless the directivity of the reception beam of the terminal is tuned with the directivity of the transmission beam of the base station. On the other hand, as illustrated in 5025, if the directivity of the transmission beam of the base station and the directivity of the reception beam of the terminal are tuned with each other, the terminal may transmit and receive data at much higher efficiency than the case where the terminal does not have the reception beam.

In order to find the reception beam that synchronizes the transmission beam, the receiving apparatus searches for the reception beam that provides the best reception quality by applying different reception beams for the same transmission beam. This process is called reception beam sweeping.

Figure 51:
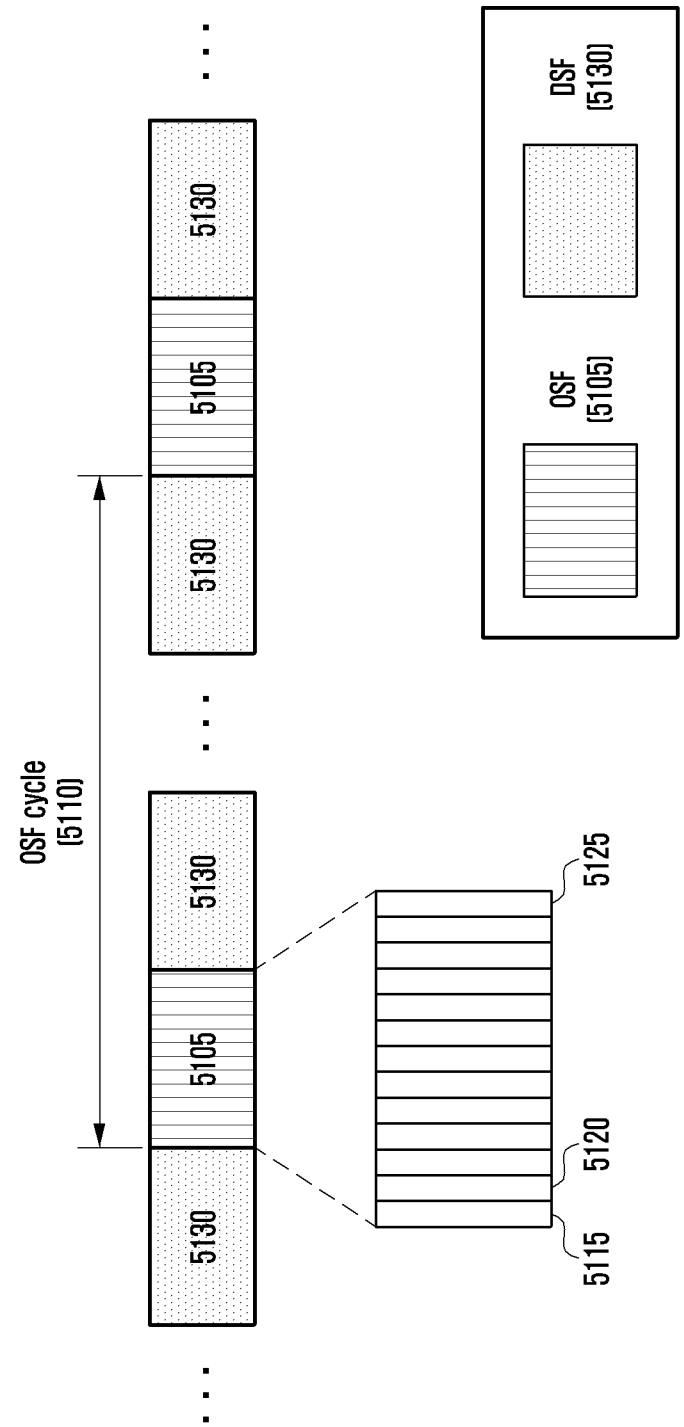
FIG. 51 illustrates a subframe structure of the NR system according to the embodiment of the present disclosure.

FIG. 51 illustrates a subframe structure of the NR system according to the embodiment of the present disclosure.

In a mobile communication system in which a directional beam, an analog beam or a hybrid beam is used, the common overhead signal suffers from beam sweeping transmission in a specific subframe, while in another subframe, a directional beam in a unidirectional direction is used to transmit/receive user data to/from the specific terminal.

An overhead subframe (OSF) 5105 which is a subframe in which the overhead signal is received may be repeatedly transmitted in a predetermined cycle 5110. One subframe consists of a plurality of symbols, and one directional beam per symbol may be transmitted in the OSF. For example, a first symbol 5115 of the OSF may correspond to t1, a second symbol 5120 may correspond to t2, an eleventh symbol 5125 may correspond to t11, and a directional beam (or analog beam) having the same beam width for each symbol but covering other areas and having directivity setup in different directions may be transmitted. On the other hand, the transmission of the beam may have the same meaning as the transmission of the reference signal using the corresponding beam The following overhead signal may be transmitted for each symbol of the OSF 5105: signal for establishing downlink synchronization, such as a primary synchronization signal (PSS) and a secondary synchronization signal (SSS); beam reference signal (BRS) capable of measuring the received signal strength or the received signal quality for each beam; system information, a master information block (MIB), or a physical broadcast channel (PBCH); and the PBCH may include information necessary for the terminal to access the system, for example, the bandwidth of the downlink beam, the system frame number, and the like.

For reference, the PLMN identifier may be broadcast over a channel other than the MIB.

In a subframe other than the periodically transmitted OSF 5105, the same beam may be transmitted over a plurality of consecutive symbols, and the user data for a specific connected terminal may be transmitted through the beam. Hereinafter, the subframe may be referred to as a data subframe (DSF) 5130.

Meanwhile, in order to receive a desired service in the mobile communication system, the terminal performs a procedure of selecting an operator or a public land mobile network (PLMN), which is called a PLMN selecting procedure. If the terminal has a plurality of radio access technologies (RATs), the terminal acquires PLMN identifiers of available operators for each radio access technology, and selects one of the available PLMNs. A terminal having both the LTE and the NR may also perform the PLMN selecting procedure, and the terminal may acquire system information in a predetermined cell of the LTE frequency to acquire the PLMN identifier included in the system information and acquire the system information from the predetermined downlink beam of the NR frequency to acquire the PLMN identifier included in the system information. At this time, the terminal applies differential search operations to LTE and NR to improve the efficiency of the PLMN selecting procedure.

Figure 52:
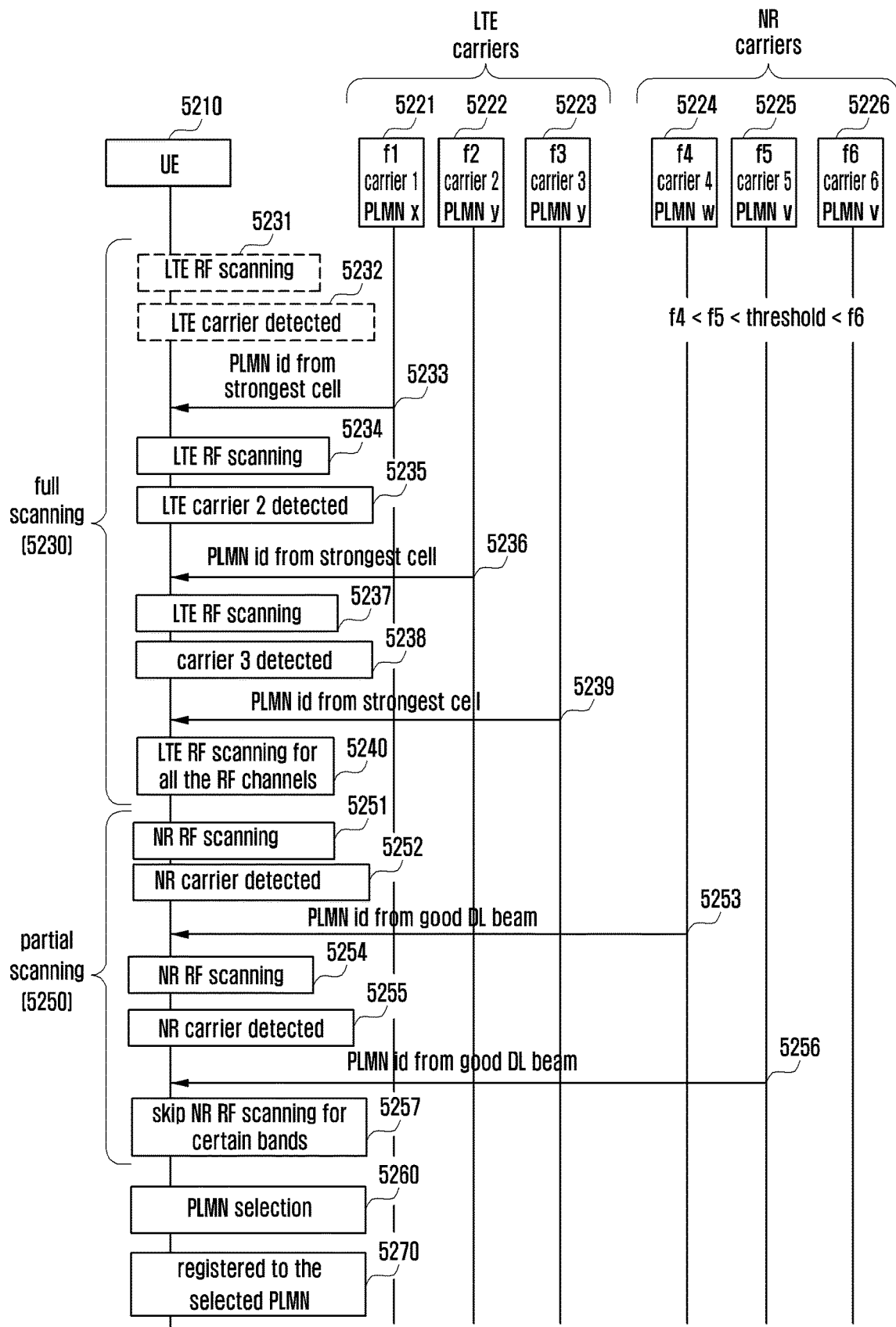
FIG. 52 illustrates an entire operation according to the embodiment in the present disclosure.

FIG. 52 illustrates an entire operation according to the embodiment in the present disclosure.

In a mobile communication system including a terminal 5210 capable of communicating with both the NR network and the LTE network, one or more LTE carriers 5221, 5222 and 5223, and one or more NR carriers 5224, 5225 and 5226, the terminal 5210 may initiate the PLMN selection process. The PLMN selection is a process of being mainly performed when the terminal 5210 is newly powered on, identifying operators providing the mobile communication service in the corresponding region at the corresponding time, and selecting one of the operators is selected to receive a mobile communication service.

The radio access technology of the LTE is called E-UTRA, and the radio access technology of the NR is called NR-UTRA. In the present disclosure, the LTE, the E-UTRA, the NR, and the NR-UTRA may be interchangeably used with each other.

The terminal 5210 that initiates the PLMN selecting process may scan a radio frequency (RF) channel to determine accessible operators in the corresponding region of the corresponding time. At this time, the terminal 5210 may perform full scanning 5230 for the LTE and partial scanning 5250 for the NR. The RF channel scanning is performed on a frequency band basis. Performing a full scanning on any frequency band means that all the RF channels of the corresponding frequency band are fully scanned over all directions. The partial scanning means that the RF channels of the corresponding frequency band are scanned only in some directions. In other words, in the full scanning, the terminal 5210 performs reception beam sweeping for each RF channel, and in the partial scanning, the terminal 5210 does not perform reception beam sweeping for each RF channel. In addition, the terminal 5210 may perform an RF channel scan for all frequency bands supported by the terminal 5210 (full scanning), or may perform an RF channel scan only for some frequency bands that satisfy a predetermined condition (partial scanning). This will be described in more detail.

In step 5231, the terminal 5210 may perform RF channel scanning from a frequency band that is most likely to be served in the corresponding region among the LTE frequency bands supported by the terminal 5210. As a result of the RF channel scanning, if the LTE carrier is detected in step 5232 (for example, a first carrier (carrier 1)), in step 5233, the terminal 5210 may receive the predetermined system information in the strongest cell (the cell having the strongest received strength of the cell reference signal CRS) of the corresponding carrier. The system information includes the operator information of the cell, that is, the PLMN identifier (e.g., PLMN x). The terminal 5210 performs the RF channel scan on all the LTE frequency supported by the terminal to identify the available PLMNs. That is, if the terminal 5210 performs RF channel scanning in step 5234 and detects a second carrier (carrier 2) in step 5235, in step 5236, the terminal 5210 may receive the system information including the PLMN identifier (e.g., PLMN y) in the strongest cell of the corresponding carrier. If the terminal 5210 performs RF channel scanning in step 5237 and detects a third carrier (carrier 3) in step 5238, in step 5239, the terminal 5210 may receive the system information including the PLMN identifier (e.g., PLMN y) in the strongest cell of the corresponding carrier. In step 5240, the terminal 5210 may perform the RF channel scanning on all remaining RF channels.

In step 5250, the terminal 5210 may perform the partial scanning on the NR. That is, in step 5251, the terminal 5210 may perform the RF channel scanning only on some bands satisfying the predetermined conditions among all the NR frequency bands supported by the terminal 5210. Instead of performing the downlink reception beam sweeping to find the downlink reception beam resonated with the downlink transmission beam in performing the RF channel scanning, the downlink reception beam may perform the RF channel scanning by being formed into a predetermined beam width in a predetermined direction.

In step 5252, when the terminal 5210 detects the NR carrier (e.g., a fourth carrier (carrier 4)), in step 5253, the terminal 5210 may a good DL beam satisfying the predetermined conditions among the downlink beams of the corresponding carrier to receive the system information. The system information includes the operator information of the cell, that is, the PLMN identifier (e.g., PLMN w). The downlink beam satisfying the predetermined conditions may be, for example, a downlink beam having the received strength of the beam reference signal exceeding a predetermined reference. If the terminal 5210 performs the NR RF channel in step 5254 and detects a fifth carrier (carrier 5) in step 5255, in step 5256, the terminal 5210 may select a good DL beam satisfying the predetermined conditions among the downlink beams of the corresponding carrier to receive the system information including the PLMN identifier (e.g., PLMN v). Meanwhile, as described above, the terminal 5210 may perform the RF channel scanning only on some bands satisfying the predetermined conditions among all the NR frequency bands supported by the terminal 5210. Next, like step 5257, the terminal 5210 may skip some of the NR RF scanning.

Meanwhile, the terminal 5210 recognizing at least one available PLMN may proceed to step 5260 to select the PLMN. In step 5270, the terminal 5210 may perform a registration process in the selected PLMN and receive a mobile communication service.

Figure 53:
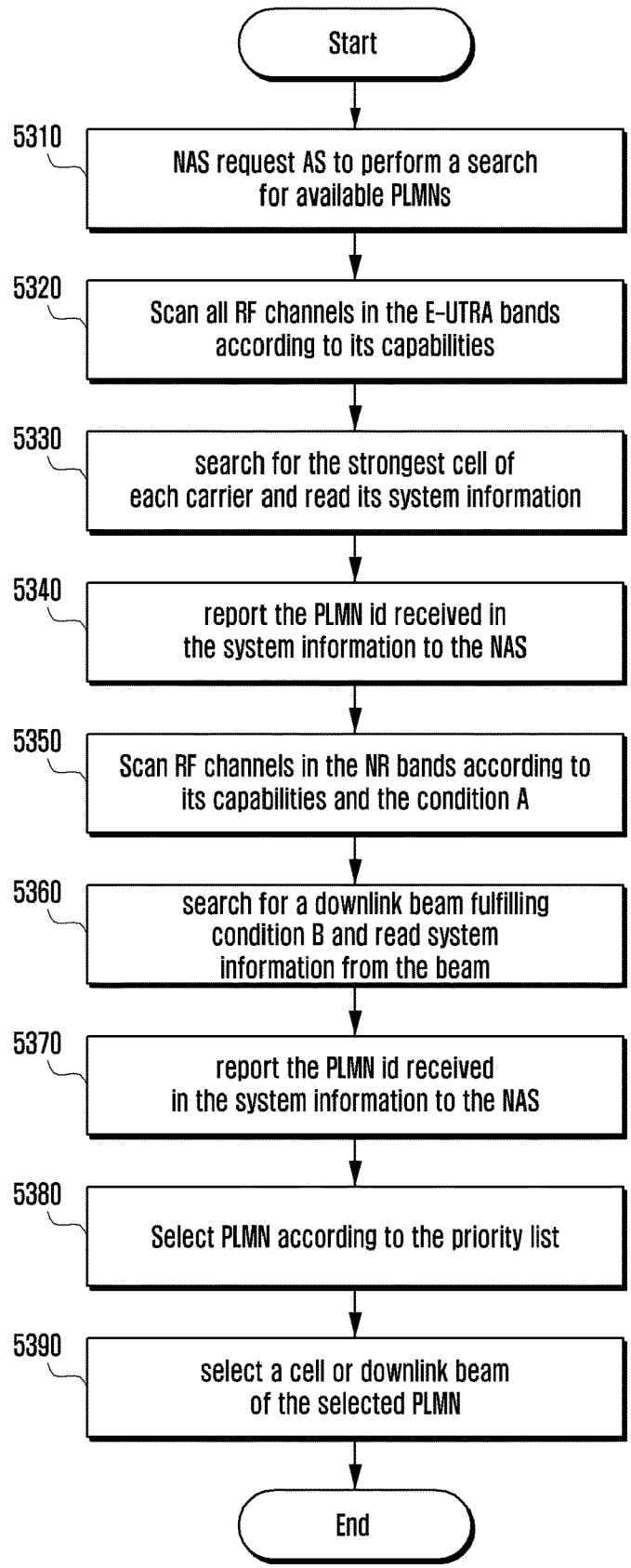
FIG. 53 illustrates an operation of the terminal according to the embodiment of the present disclosure.

FIG. 53 illustrates an operation of the terminal according to the embodiment of the present disclosure.

Referring to FIG. 53, in step 5310, the terminal may instruct a non-access stratum (NAS) to search for a PLMN available to the wireless access apparatus. The above operation may be performed in a specific event, for example, when the terminal is powered on or when the terminal reenters the service area.

In step 5320, the radio access apparatus of the terminal, e.g., an E-UTRA radio access apparatus may scan RF channels of E-UTRA frequency bands. In selecting the E-UTRA frequency band to be scanned, the terminal may consider the terminal's capability, for example, the E-UTRA band supported by the terminal, and may also consider the acquired information during the previous same process.

The terminal may identify the E-UTRA carrier of the E-UTRA frequency band through the RF channel scan for any E-UTRA frequency band. The RF channel scan is a process of sequentially checking RF channels to determine whether a carrier exists in the corresponding channel. The RF channel of E-UTRA is 100 KHz in size, and is sequentially formed starting from the lowest frequency of any frequency band to the highest frequency, and may be specified by an integer called EARFCN ranging from 0 to 262134.

In step 5330, the terminal identifies a cell having the best received state among the cells detected in the identified carrier and receives the predetermined system information of the corresponding cell. The PLMN identifier of the cell may be stored in the predetermined system information.

In step 5340, the access apparatus of the terminal transmits the acquired PLMN identifier to the non-access stratum.

At this time, in steps 5320 to 5340, the terminal may be performed on all the E-UTRA frequency bands supported by the terminal until the terminal instructs the non-access stratum to stop the operation.

Steps 5320 to 5340 are a process of determining, by a terminal, which PLMN exists in the E-UTRA. Steps 5350 to 5370 to be described later may be performed in parallel with the steps 5320 to 5340 or after the completion of the steps 5320 to 5340. Steps 5350 to 5370 are processes for determining which PLMN exists in the NR-UTRA.

In step 5350, the NR-UTRA apparatus of the terminal may scan the RF channels of the NR-UTRA band satisfying the condition A. The band satisfying the predetermined condition A may mean, for example, the NR-UTRA bands in which the idle mode operation is permitted among the NR-UTRA bands supported by the terminal. At this time, the information related to whether or not the idle mode operation is permitted may be stored in the storage device of the terminal in advance.

According to the embodiment, in scanning all the RF channels of the NR-UTRA band, the terminal may fix and scan the downlink reception beam in a predetermined direction instead of sweeping the downlink receive beam. This is because carriers capable of providing seamless coverage may receive a signal from at least one TRP even if the terminal fixes the downlink reception beam in one direction.

The RF channel of the NR-UTRA has a size larger than that of the E-UTRA, for example, 500 KHz. At this time, the N R-UTRA is specified by an integer called NRFCN and may have the same range (range of 0 to 262134) as EARFCN. Therefore, the RF channel of the E-UTRA and the RF channel of the NR-UTRA may be specified by the same signaling parameter or the information element (IE) and may be signaled to the same IE in the RRC control message.

In step 5360, the terminal may identify the downlink beam satisfying the condition B among the downlink beams of the identified carriers and may receive predetermined system information in a predetermined frequency/time domain of the corresponding beam. The PLMN identifier of the cell may be stored in the predetermined system information. According to the embodiment, the downlink beam satisfying the condition B may mean the downlink beam capable of successfully receiving the predetermined system information from the downlink beam having the received strength of the beam reference signal higher than the predetermined reference value or the corresponding downlink beam without an error. The predetermined system information may be the system information including the PLMN identifier or the system information transmitted in the same time domain or the same symbol as the beam reference signal of the corresponding beam. For example, the downlink beam satisfying the above condition B may mean the downlink beam capable of receiving the system information (e.g., system information transmitted through a PBCH) that does not include the PLMN identifier. That is, the terminal may confirm whether the downlink beam is the downlink beam capable of receiving system information that does not include the PLMN identifier, and then receive system information including the PLMN identifier in the corresponding downlink beam if possible.

In step 5370, the access apparatus of the terminal may transmit the acquired PLMN identifier to the non-access stratum.

According to the embodiment, the steps 5340 to 5360 may be performed on all the NR-UTRA frequency bands satisfying the condition A while being supported by the terminal until the non-access stratum performs an instruct to stop the operation. In addition, according to the embodiment, the NR-UTRA frequency channel satisfying the condition A may mean the remaining channel when the terminal has not yet scanned the channel capable of reading the system information. For example, if the terminal performs the channel scanning from a lower frequency (or higher frequency) among the RF channels of the NR-UTRA band and if the terminal may not read the system information among the scanned channels, the terminal may perform the scan of the next RF channel. However, if the terminal may read the system information among the scanned channels, the terminal may stop the scanning for the NR-UTRA frequency channel.

In step 5370, the non-access stratum of the terminal may select one of the PLMNs reported by the access apparatus. The terminal may select the PLMN based on the PLMN preference list stored in the storage device.

In step 5390, the non-access stratum of the terminal may notify the access apparatus of the identifier of the selected PLMN and the radio access technology. The access apparatus of the terminal may camp-on the cell of the selected PLMN if the instructed radio access technology is E-UTRA and camp-on the downlink beam of the selected PLMN if the instructed radio access technology is NR-UTRA. Camping-on a cell or beam means receiving the system information from the corresponding cell or beam and monitoring whether a paging message is received.

Figure 54:
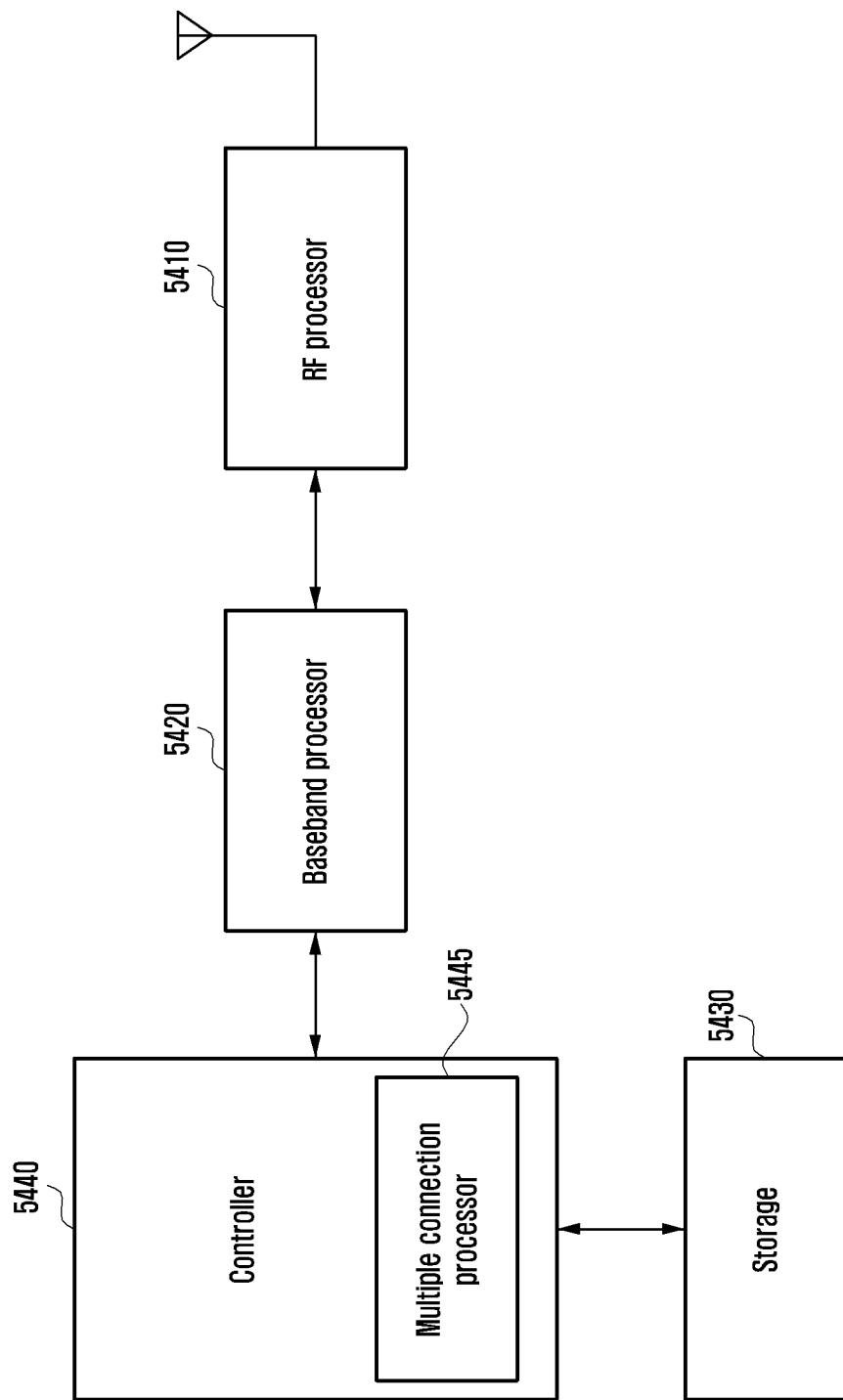
FIG. 54 illustrates a configuration of the terminal according to the embodiment of the present disclosure.

FIG. 54 illustrates a configuration of the terminal according to the embodiment of the present disclosure.

Referring to FIG. 54, the terminal according to one embodiment of the present disclosure may include a transceiver and a controller 5440. The terminal may further include a storage 5430. At this point, the transceiver may be a radio frequency (RF) processor 5410. According to the embodiment, the transceiver may include an RF processor 5410 and a baseband processor 5420.

The RF processor 5410 serves to transmit/receive a signal through a radio channel, such as band conversion and amplification of a signal. That is, the RF processor 5410 may up-convert a baseband signal provided from the baseband processor 5420 into an RF band signal and then transmit the RF band signal through an antenna, and down-convert the RF band signal received through the antenna into the baseband signal. For example, the RF processor 5410 may include a transmitting filter, a receiving filter, an amplifier, a mixer, an oscillator, a digital to analog converter (DAC), an analog to digital converter (ADC), or the like. FIG. 54 illustrates only one antenna but the terminal may include a plurality of antennas. Further, the RF processor 5410 may include the plurality of RF chains. Further, the RF processor 5410 may perform beamforming. For the beamforming, the RF processor 5410 may adjust a phase and a size of each of the signals transmitted and received through a plurality of antennas or antenna elements. In addition, the RF processor may perform MIMO and may receive a plurality of layers when performing a MIMO operation. The RF processor 5410 may perform reception beam sweeping by appropriately configuring a plurality of antennas or antenna elements under the control of the controller 5440 or adjust a direction and a beam width of the reception beam so that the reception beam is resonated with the transmission beam.

The baseband processor 5420 performs a conversion function between the baseband signal and a bit string according to a physical layer standard of the system. For example, when data are transmitted, the baseband processor 5420 generates complex symbols by coding and modulating a transmitting bit string. Further, when data are received, the baseband processor 5420 may recover a received bit string by demodulating and decoding the baseband signal provided from the RF processor 5410. For example, according to an orthogonal frequency division multiplexing (OFDM) scheme, when data are transmitted, the baseband processor 5420 may generate the complex symbols by coding and modulating the transmitted bit string, map the complex symbols to sub-carriers, and then configure OFDM symbols by an inverse fast Fourier transform (IFFT) operation and a cyclic prefix (CP) insertion. Further, when data are received, the baseband processor 5420 may segment the baseband signal provided from the RF processor 5410 in an OFDM symbol unit, recover the signals mapped to the sub-carriers by the fast Fourier transform (FFT) operation, and then recover the received bit string by the modulation and decoding.

The baseband processor 5420 and the RF processor 5410 may transmit and receive a signal as described above. Therefore, the baseband processor 5420 and the RF processor 5120 may be called a transmitter, a receiver, a transceiver, or a communicator. Further, at least one of the baseband processor 5420 and the RF processor 5410 may include a plurality of communication modules to support a plurality of different radio access technologies. Further, at least one of the baseband processor 5420 and the RF processor 5410 may include different communication modules to process signals in different frequency bands. For example, the different wireless access technologies may include an LTE network, an NR network, and the like. Further, the different frequency bands may include a super high frequency (SHF) (for example: 2.5 GHz, 5 GHz, or the like) band, a millimeter wave (for example, 60 GHz, or the like) band.

The storage 5430 stores data such as basic programs, application programs, and configuration information for the operation of the terminal. The storage 5430 may provide the stored data according to the request of the controller 5440.

The controller 5440 may control the overall operations of the terminal to perform any one operation of the above-described embodiments. For example, the controller 5440 may transmit/receive a signal through the baseband processor 5420 and the RF processor 5410. Further, the controller 5440 may record and read data in and from the storage 5430. For this purpose, the controller 5440 may include a circuit, an application-specific circuit, or at least one processor. For example, the controller 5440 may include a communication processor (CP) performing a control for communication and an application processor (AP) controlling a higher layer such as the application programs. In addition, the operations of the terminal may be realized by including a memory device storing the corresponding program code in any component of the terminal. That is, the controller 5440 may execute the above-described operations by reading and executing the program code stored in the memory device by a processor, a central processing unit (CPU) or the like. In addition, according to the embodiment of the present disclosure, the controller 5440 may include a multiple connection processor 5445 that performs processing to be operated in a multi connection mode. The controller 5440 may be electrically connected to other components, for example, the transceiver 5410.

FIG. 55 illustrates a configuration of the base station according to the embodiment of the present disclosure.

Referring to FIG. 13, the base station according to one embodiment of the present disclosure may include a transceiver and a controller 5540. Further, the base station may further include a backhaul communication interface 5550 and a storage 5530. At this point, the transceiver may be a radio frequency (RF) processor 5510. According to the embodiment, the transceiver may include an RF processor 5510 and a baseband processor 5520.

The RF processor 5510 serves to transmit/receive a signal through a radio channel, such as band conversion and amplification of a signal. That is, the RF processor 5510 up-converts a baseband signal provided from the baseband processor 5520 into an RF band signal and then transmits the baseband signal through an antenna and down-converts the RF band signal received through the antenna into the baseband signal. For example, the RF processor 5510 may include a transmitting filter, a receiving filter, an amplifier, a mixer, an oscillator, a DAC, an ADC, etc. FIG. 55 illustrates only one antenna but the base station may include a plurality of antennas. Further, the RF processor 5510 may include the plurality of RF chains. Further, the RF processor 5510 may perform the beamforming. For the beamforming, the RF processor 5510 may adjust a phase and a size of each of the signals transmitted and received through a plurality of antennas or antenna elements. The RF processor 5510 may perform a downlink MIMO operation by transmitting one or more layers.

The baseband processor 5520 performs a conversion function between the baseband signal and the bit string according to the physical layer standard of the first radio access technology. For example, when data are transmitted, the baseband processor 5520 generates complex symbols by coding and modulating a transmitting bit string. Further, when data are received, the baseband processor 5520 recovers the receiving bit string by demodulating and decoding the baseband signal provided from the RF processor 5510. For example, according to the OFDM scheme, when data are transmitted, the baseband processor 5520 may generate the complex symbols by coding and modulating the transmitted bit string, map the complex symbols to the sub-carriers, and then configure the OFDM symbols by the IFFT operation and the CP insertion. Further, when data are received, the baseband processor 5520 divides the baseband signal provided from the RF processor 5510 in an OFDM symbol unit and recovers the signals mapped to the sub-carriers by an FFT operation and then recovers the received bit string by the modulation and decoding.

The baseband processor 5520 and the RF processor 5510 may transmit and receive a signal as described above. Therefore, the baseband processor 5520 and the RF processor 5510 may be called a transmitter, a receiver, a transceiver, a communication interface, or a wireless communication interface. Further, at least one of the baseband processor 5520 and the RF processor 5510 may include a plurality of communication modules to support a plurality of different radio access technologies. Further, at least one of the baseband processor 5520 and the RF processor 5510 may include different communication modules to process signals in different frequency bands. For example, different radio access technologies may include a wireless LAN (for example, IEEE 802.11 or the like), a cellular network (for example, LTE or the like), or the like. Further, the different frequency bands may include a super high frequency (SHF) (for example: 2.5 GHz, 5 GHz, or the like) band, a millimeter wave (for example, 60 GHz, or the like) band.

The communication interface 5550 provides an interface for performing communication with other nodes within the network.

The storage 5530 stores data such as basic programs, application programs, and setting information for the operation of the base station. In particular, the storage 5530 may store the information on the bearer allocated to the accessed terminal, the measured results reported from the accessed terminal, etc. Further, the storage 5530 may store information that is a determination criterion on whether to provide a multiple connection to the terminal or stop the multiple connection to the terminal. The storage 5530 may provide the stored data according to the request of the controller 5540.

The controller 5540 may control the overall operations of the base station to perform any one operation of the above-described embodiments. For example, the controller 5540 may transmit/receive a signal through the baseband processor 5520 and the RF processor 5510 or the backhaul communication interface 5550. Further, the controller 5540 may record and read data in and from the storage 5530. For this purpose, the controller 5540 may include a circuit, an application-specific circuit, or at least one processor. For example, the controller 5540 may include a communication processor (CP) performing a-control for communication and an application processor (AP) controlling a higher layer such as the application programs. In addition, the operations of the base station may be realized by including a memory device storing the corresponding program code in any component of the terminal. That is, the controller 5540 may execute the above-described operations by reading and executing the program code stored in the memory device by a processor, a central processing unit (CPU) or the like. In addition, according to the embodiment of the present disclosure, the controller 5540 may include a multiple connection processor 5545 that performs processing to be operated in a multi connection mode. The controller 5540 may be electrically connected to other components, for example, the transceiver 5510.

The embodiments of the present disclosure disclosed in the present specification and the accompanying drawings have been provided to easily describe and assist in understanding the described content and do not limit the scope of the present disclosure. It is obvious to those skilled in the art to which the present disclosure pertains that various modifications may be made without departing from the scope of the present disclosure, in addition to the embodiments disclosed herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a base station in a wireless communication system, the method comprising:
   receiving, from a next generation core network (NGCN), a downlink (DL) packet including information for identifying a quality of service (QoS) based on a flow;
   identifying whether a data radio bearer (DRB) to which to map the flow exists among established at least one DRB, wherein the flow to the DRB mapping is based on the information for identifying the QoS based on the flow;
   in case that the DRB to which to map the flow does not exist among the established at least one DRB, establishing the DRB;
   transmitting, to a terminal, the DL packet over the DRB, the DL packet including the information for identifying the QoS based on the flow and an indication associated with a reflective QoS; and
   receiving, from the terminal, an uplink (UL) packet over the DRB, the UL packet being associated with the flow.

2. The method for claim 1, wherein the flow to the DRB mapping of the DL packet is applied to a flow to a DRB mapping of an UL packet based on the indication associated with the reflective QoS.

3. The method for claim 1, further comprising:
   in case that the DRB to which to map the flow exists among the established at least one DRB, transmitting, to the terminal, the DL packet over the established at least one DRB, and
   wherein the method further comprises:
   transmitting, to the terminal, a control message including information on mapping between flows and DRBs,
   wherein the UL packet is received from the terminal over a DRB identified based on the information on mapping.

4. The method of claim 1, further comprising:
   in case that another DRB to which to map another flow associated with another UL packet does not exist among the established at least one DRB, receiving, from the terminal, the other UL packet over a default DRB among the established at least one DRB, the other UL packet including information for identifying another QoS based on the other flow; and
   establishing the other DRB to which to map the other flow associated with the other UL packet with the terminal.

5. The method of claim 1, wherein the identifying of whether the DRB to which to map the flow exists is performed by an upper layer of a packet data convergence protocol (PDCP) layer.

6. A method performed by a terminal in a wireless communication system, the method comprising:
   establishing a DRB to which to map a flow associated with a downlink (DL) packet, in case that the DRB to which to map the flow associated with the DL packet does not exist among established at least one DRB, wherein the flow to the DRB mapping is based on information for identifying a quality of service (QoS) based on the flow;
   receiving, from a base station, the DL packet over the DRB, the DL packet including the information for identifying the QoS based on the flow and an indication associated with a reflective QoS; and
   transmitting, to the base station, an uplink (UL) packet over the DRB, the UL packet being associated with the flow.

7. The method for claim 6, wherein the flow to the DRB mapping of the DL packet is applied to a flow to a DRB mapping of an UL packet based on the indication associated with the reflective QoS.

8. The method for claim 6, further comprising:
   in case that the DRB to which to map the flow exists among the established at least one DRB, receiving, from the base station, the DL packet over the established at least one DRB, and wherein the method further comprises:
receiving, from the base station, a control message including information on mapping between flows and DRBs; and
transmitting, to the base station, the UL packet over a DRB identified based on the information on mapping.

9. The method of claim 6, further comprising:
in case that another DRB to which to map another flow associated with another UL packet does not exist, transmitting, to the base station, the other UL packet over a default DRB among the established at least one DRB, the other UL packet including information for identifying another QoS based on the other flow; and
establishing the other DRB to which to map the other flow associated with the other UL packet with the base station.

10. The method of claim 9, further comprising:
identifying, by an upper layer of a packet data convergence protocol (PDCP) layer, whether the other DRB to which to map the other flow associated with the other UL packet exists.

11. A base station in a wireless communication system, the base station comprising:
a transceiver; and
a controller coupled with the transceiver and configured to:
receive, from a next generation core network (NGCN), a downlink (DL) packet including information for identifying a quality of service (QoS) based on a flow,
identify whether a data radio bearer (DRB) to which to map the flow exists among established at least one DRB, wherein the flow to the DRB mapping is based on the information for identifying the QoS based on the flow,
in case that the DRB to which to map the flow does not exist among the established at least one DRB, establish the DRB,
transmit, to a terminal, the DL packet over the DRB, the DL packet including the information for identifying the QoS based on the flow and an indication associated with a reflective QoS, and
receive, from the terminal, an uplink (UL) packet over the DRB, the UL packet being associated with the flow.

12. The base station of claim 11, wherein the flow to the DRB mapping of the DL packet is applied to a flow to a DRB mapping of an UL packet based on the indication associated with the reflective QoS.

13. The base station of claim 11, wherein the controller is further configured to:
in case that the DRB to which to map the flow exists among the established at least one DRB, transmit, to the terminal, the DL packet over the established at least one DRB, and
wherein the controller is further configured to:
transmit, to the terminal, a control message including information on mapping between flows and DRBs,
wherein the UL packet is received from the terminal over a DRB identified based on the information on mapping.

14. The base station of claim 11, wherein the controller is further configured to:
in case that another DRB to which to map another flow associated with another UL packet does not exist among the established at least one DRB, receive, from the terminal, the other UL packet over a default DRB among the established at least one DRB, the other UL packet including information for identifying another QoS based on the other flow, and
establish the other DRB to which to map the other flow associated with the other UL packet with the terminal.

15. The base station of claim 11, wherein the controller is configured to identify whether the DRB to which to map the flow exists by an upper layer of a packet data convergence protocol (PDCP) layer.

16. A terminal in a wireless communication system, the terminal comprising:
a transceiver; and
a controller coupled with the transceiver and configured to:
establish a DRB to which to map a flow associated with a downlink (DL) packet, in case that the DRB to which to map the flow associated with the DL packet does not exist among established at least one DRB, wherein the flow to the DRB mapping is based on information for identifying a quality of service (QoS) based on the flow,
receive, from a base station, the DL packet over the DRB, the DL packet including the information for identifying the QoS based on the flow and an indication associated with a reflective QoS, and
transmit, to the base station, an uplink (UL) packet over the DRB, the UL packet being associated with the flow.

17. The terminal of claim 16, wherein the flow to the DRB mapping of the DL packet is applied to a flow to a DRB mapping of an UL packet based on the indication associated with the reflective QoS.

18. The terminal of claim 16, wherein the controller is further configured to:
in case that the DRB to which to map the flow exists among the established at least one DRB, receive, from the base station, the DL packet over the established at least one DRB, and
wherein the controller is further configured to:
receive, from the base station, a control message including information on mapping between flows and DRBs, and
transmit, to the base station, the UL packet over a DRB identified based on the information on mapping.

19. The terminal of claim 16, wherein the controller is further configured to:
in case that another DRB to which to map another flow associated with another UL packet does not exist, transmit, to the base station, the other UL packet over a default DRB among the established at least one DRB, the other UL packet including information for identifying another QoS based on the other flow, and
establish the other DRB to which to map the other flow associated with the other UL packet with the base station.

20. The terminal of claim 19, wherein the controller is configured to: identify, by an upper layer of a packet data convergence protocol (PDCP) layer, whether the other DRB to which to map the other flow associated with the other UL packet exists.

* * * * *